(12) United States Patent
Greenwald et al.

(10) Patent No.: US 10,464,181 B2
(45) Date of Patent: Nov. 5, 2019

(54) METHOD, SYSTEM, AND APPARATUS FOR REPORTING DATA PERTAINING TO ACTIONABLE CONDITION OF ELECTRICAL SHOP TOOL

(71) Applicant: Snap-on Incorporated, Kenosha, WI (US)

(72) Inventors: Christopher L. Greenwald, Waban, MA (US); Jeffrey P. Hastings, Hanover, NH (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 15/662,329

(22) Filed: Jul. 28, 2017

(65) Prior Publication Data

US 2018/0029184 A1    Feb. 1, 2018

Related U.S. Application Data

(60) Provisional application No. 62/367,852, filed on Jul. 28, 2016.

(51) Int. Cl.
    *G08B 21/18*      (2006.01)
    *G01M 99/00*      (2011.01)
    (Continued)

(52) U.S. Cl.
    CPC ......... *B23Q 17/008* (2013.01); *G01M 99/005* (2013.01); *G06Q 10/0631* (2013.01);
    (Continued)

(58) Field of Classification Search
    CPC ............ B23Q 17/008; H04Q 2209/10; H04Q 2209/84; H04Q 9/02; G01M 99/005; G08B 21/182
See application file for complete search history.

(56) References Cited

U.S. PATENT DOCUMENTS 6,189,432 B1    2/2001    Colarelli et al.
6,286,629 B1    9/2001    Saunders
(Continued)

FOREIGN PATENT DOCUMENTS

EP      1973077 A2    9/2008
WO   2015005772 A1    1/2015

OTHER PUBLICATIONS

International Search Report, International Application No. PCT/US2017/044406, dated Sep. 28, 2017 (4 pages).
(Continued)

*Primary Examiner* — Sisay Yacob
(74) *Attorney, Agent, or Firm* — McDonnell Boehnen Hulbert & Berghoff LLP

(57) ABSTRACT

A measurement device (MD) includes a processor to sample electrical signals of a circuit connected to a sensor, such as a current transformer, and to provide measurement data to a processing system (PS) based on the sampled electrical signals. An electrical circuit carrying AC electricity to and from an electrical shop tool (EST) can pass through the sensor. The measurement data can represent use or non-use of the EST. An EST, such as a vehicle lift or wheel balancer, can comprise an electrical motor connected to the electrical circuit. An EST, such as an air compressor, can comprise an electrical pump connected to the electrical circuit. The PS can determine an actionable condition based on a single measurement value or an aggregate of measurement values and determine a notification to send to a destination regarding the actionable condition. The destination can be a user account, a smartphone, or another destination.

32 Claims, 26 Drawing Sheets

(51) Int. Cl.

| | |
|---|---|
| B23Q 17/00 | (2006.01) |
| H04Q 9/02 | (2006.01) |
| G06Q 10/06 | (2012.01) |
| G06Q 30/00 | (2012.01) |
| G07C 3/10 | (2006.01) |
| G07C 3/00 | (2006.01) |

(52) U.S. Cl.
CPC ............. *G06Q 30/012* (2013.01); *G07C 3/00* (2013.01); *G07C 3/10* (2013.01); *G08B 21/182* (2013.01); *H04Q 9/02* (2013.01); *H04Q 2209/10* (2013.01); *H04Q 2209/84* (2013.01)

(56) References Cited

U.S. PATENT DOCUMENTS

| | | | |
|---|---|---|---|
| 6,459,995 B1* | 10/2002 | Collister | G01N 27/221 702/104 |
| 7,191,038 B2 | 3/2007 | Green et al. | |
| 7,295,297 B2 | 11/2007 | Burns et al. | |
| 8,180,480 B2* | 5/2012 | Greenwald | B23Q 17/12 700/164 |
| 8,474,793 B2 | 7/2013 | Penenburgh | |
| 8,708,107 B2 | 4/2014 | Finkbeiner | |
| 8,798,871 B2* | 8/2014 | Lugash | G07C 5/008 701/29.1 |
| 8,904,653 B1 | 12/2014 | Miaskiewicz | |
| 8,904,654 B2 | 12/2014 | Rogers | |
| 9,061,872 B2* | 6/2015 | Finkbeiner | B66F 3/46 |
| 9,193,572 B2 | 11/2015 | Finkbeiner et al. | |
| 9,300,864 B2 | 3/2016 | Cerruti et al. | |
| 9,601,872 B2 | 3/2017 | Yan | |
| 2004/0149520 A1 | 8/2004 | Taylor et al. | |
| 2005/0060899 A1 | 3/2005 | Jackson et al. | |
| 2005/0171662 A1 | 8/2005 | Strege et al. | |
| 2008/0116012 A1 | 5/2008 | Ferguson | |
| 2009/0240402 A1* | 9/2009 | Lugash | G07C 5/008 701/49 |
| 2011/0144794 A1* | 6/2011 | Greenwald | B23Q 17/12 700/160 |
| 2013/0001486 A1* | 1/2013 | Finkbeiner | B66F 3/25 254/1 |
| 2013/0041499 A1* | 2/2013 | Simonetti | B66F 7/20 700/213 |
| 2014/0070924 A1* | 3/2014 | Wenger | B25F 5/00 340/10.1 |
| 2014/0161568 A1 | 6/2014 | De Jong | |
| 2014/0240125 A1 | 8/2014 | Burch et al. | |
| 2015/0070491 A1 | 3/2015 | Rogers | |
| 2015/0112640 A1* | 4/2015 | Niro | G01D 15/00 702/183 |
| 2015/0114760 A1 | 4/2015 | Fagan et al. | |

OTHER PUBLICATIONS

Written Opinion of the International Searching Authority, International Application No. PCT/US2017/044406, dated Sep. 28, 2017 (8 pages).
AliBaba.com, Four-wheel alignment operate by android cell phone, technical specifications, downloaded Apr. 5, 2016 from the world wide web at http://www.alibaba.com/product-detail/Four-wheel-alignment-operate-by-android_60006897065.html (7 pages).
AliBaba.com, High efficiency and better value Launch KWA-300 3d manual car target plates laser wheel alignment, technical specifications, downloaded Apr. 5, 2016 from the world wide web at http://www.alibaba.com/product-detail/High-efciency-and-better-value-LAUNCH_60155591886.html?spm=a2700.7724857.29.1.0cEyw4 (5 pages).
Autocare Association, Motor Information Systems & Auto Care Association, Developer Kit, VCdb Change Log and ID Retention, Revision 2.0, Mar. 5, 2015 (10 pages).
Autocare Association, login page for vehicle configuration database product detail, downloaded Apr. 28, 2016 from the world wide web at http://www.autocare.org/ProductDetail.aspx?id=1123&gmssopc=1 (3 pages).
Blackhawk, Collision Frame Racks, technical specifications for Power-Pro SL, Power-Pro SL HD and Power-Pro SLT, Apr. 2015 (8 pages).
CR Magnetics Inc., CR8349 Vertical Mounting, PCB Current Transformers .350" Window catalog page, downloaded Feb. 25, 2016 from the world wide web at http://www.crmagnetics.com/ansi-metering-class-current-transformers/wire-lead/voltage-output/solid-core/cr8349 (1 page).
CR Magnetics Inc. and Digi-Key Electronics, CR8349-2000-F technical product detail, downloaded Feb. 25, 2016 from the world wide web at http://www.digikey.com/product-detail/en/cr-magnetics-inc/CR8349-2000-F/CR8349-2000-F-ND/2500056 (1 page).
CR Magnetics Inc., High Ratio Vertical PCB Mount Current Transformer, CR8300 Series, technical specification, downloaded Feb. 25, 2016 from the world wide web at www.crmagnetics.com/Assets/ProductPDFs/8300 Series.pdf (1 page).
CR Magnetics Inc., Low Cost Fan Control with Hysteresis information sheet, downloaded Feb. 25, 2016 from the world wide web at www.crmagnetics.com/Assets/ProductPDFs/Low Cost Fan Control with Hysteresis.pdf (1 page).
CR Magnetics Inc., Precision Rectifier Circuit for CT Signal Conditioning information sheet, downloaded Feb. 25, 2016 from the world wide web at www.crmagnetics.com/Assets/ProductPDFs/Precision Rectifier Circuit for CT Signal Conditioning.pdf (1 page).
DesignSpark, 11 Internet of Things (IoT) Protocols You Need to Know About article, downloaded Jul. 8, 2016 from the world wide web at https://www.rs-online.com/designspark/electronics/knowledge-item/eleven-internet-of-things-iot-protocols-you-need-to-know-about (8 pages).
Electric Imp, Inc., imp002, Highly integrated Internet-of-Things node with 2.4GHz WiFi product brief, Rev1, Jun. 22, 2015 (1 page).
Electric Imp, Inc., imp003 [Type1CD], Highly integrated Internet-of-Things node with 2.4GHz WiFi product brief, Rev1, Jun. 22, 2015 (1 page).
Electric Imp, Inc., imp005 [Type1GC], Highly integrated Internet-of-Things node with dual band WiFi & Ethernet product brief, Rev1, Jun. 22, 2015 (1 page).
Electric Imp, Inc. Major Appliances platform, downloaded Feb. 25, 2016 from the world wide web at https://electricimp.com/businesssolutions/appliances (2 pages).
Electric Imp, Inc., Specification: imp002 Wireless network node in a module product specification, Version 20150716, Jul. 16, 2015 (20 pages).
Hunter Engineering Company, Hawkeye Alignment Systems, Greater profit and productivity through innovation brochure, Form 6321-T, Jan. 2015 (16 pages).
Hunter Engineering Company, Hawkeye Elite Alignment Systems, Greater profit and productivity through innovation brochure, Form 6320-T, Mar. 2016 (20 pages).
Hunter Engineering Company, HunterNet, Your online database for vehicle information and shop statistics brochure, Form 6508-T, Feb. 2014 (8 pages).
Hunter Engineering Company, WinAlign Console Upgrades for 211/311/411/511/611/811 Systems brochure, Form 5759-T, Oct. 2011 (2 pages).
Hunter Engineering Company, WinAlign WA300 Series Consoles, Compact Standard Console and Column/Wall Console, specification sheet, Form 6735-T, Oct. 2013 (2 pages).
Infineon Technologies AG, Sensor Solutions for Automotive, Industrial and Consumer Applications brochure and technical specifications, 2015 (52 pages).
Infineon Technologies AG, TLI4970-D050T4, High precision miniature coreless magnetic current sensor for AC and DC measurements with digital interface and fast overcurrent detection data sheet, Rev. 1.0, Nov. 2014 (29 pages).
Ingersoll-Rand, Owner's Manual, Installation, Operation and Maintenance Instructions for Models 2340, 2475, 2545, 7100, 15T & 3000 Two-Stage Reciprocating Air Compressors, Rev. A, Feb. 2005 (17 Pages).

(56) References Cited

OTHER PUBLICATIONS

JohnBean, Shift Every Alignment Into High Gear, The Fast, Flexible Way to Rev Up Your Alignment Revenue, Introducing the V3300 Diagnostic Wheel Alignment System brochure, downloaded Apr. 19, 2016 from the world wide web at http://www.raequipagency.ca/PDF_Files/JBCV3300.pdf (4 pages).
Lin, Jessica et al., A Symbolic Representation of Time Series, with Implications for Streaming Algorithms, 8th ACM SIGMOD Workshop on research issues in data mining and knowledge discovery, DMKD'03, San Diego, CA, Jun. 13, 2003 (10 pages).
Mean Well, 5W Single Output Encapsulated Type Power Supply, IRM-05 series, technical specifications, Oct. 2014 (3 pages).
Mouser Electronics and Mean Well Power Supplies, ULP Series 150W U-Bracket Single Output With PFC, technical specifications, downloaded Feb. 25, 2016 from the world wide web at http://www.mouser.com/catalog/648/usd/2247.pdf (1 page).
Murata Manufacturing Co., Ltd., WiFi Module Data Sheet, Broadcom BCM43362 WiFi + ST Micro STM32F405 MCU, Tentative P/N: LBWA1ZV1CD-716, product specification, Jan. 2016 (25 pages).
Murata Manufacturing Co., Ltd., W-LAN Module Data Sheet, Broadcom WLAN Chipset BCM43907 for 802.11a/b/g/n, Tentative P/N: LBWA1UZ1GC-TEMP-IMP, preliminary datasheet, Dec. 2015 (26 pages).
Novatel Wireless, MiFi 3352, Intelligent Mobile Hotspot with Applications, datasheet, downloaded Mar. 26, 2016 from he world wide web at http://www.nvtl.com/files/4413/6218/5812/MiFi3352NVTLDatasheetRev1.pdf (2 pages).
Wikipedia free encyclopedia entry for MiFi, downloaded Mar. 26, 2016 from the world wide web at https://en.wikipedia.org/wiki/MiFi (7 pages).
Wikipedia free encyclopedia entry for Root mean square, downloaded Mar. 25, 2016 from the world wide web at https://en.wikipedia.org/wiki/Root_mean_square (10 pages).

* cited by examiner

| MD ID | EST ID | MD Version ID | Location ID | Territory ID | Person ID |
|---|---|---|---|---|---|
| 1 | AA56 | H1, S1 | L1 | T1 | 1 |
| 2 | DJ13 | H1, S4 | L2 | T2 | 2 |
| 3 | DJ13 | H2, S3 | L2 | T2 | 2 |
| 4 | RT08 | H4, S2 | L3 | T5 | 3 |
| 5 | LL34 | H1, S3 | L4 | T7 | 4 |
| 6 | OU81 | H3, S7 | L4 | T7 | 4 |
| 7 | FE14 | H1, S4 | L5 | T4 | 5 |
| 7 | FE14 | H1, S4 | L5 | T4 | 3 |
| 7 | FE14 | H1, S4 | L5 | T4 | 5 |
| 7 | FE14 | H1, S4 | L5 | T4 | 2 |

| EST ID | EST TYPE | EST Brand | Model ID | Cur. EST HW | Cur. EST SW |
|---|---|---|---|---|---|
| AA56 | Vehicle lift | ACME | Pro-Lift 778 | H1 | S2 |
| AA57 | Vehicle lift | ACME | Pro-Lift 780A | H3 | S4 |
| AA59 | Vehicle lift | Lift-up | VL-101 | H2 | S6 |
| DJ13 | Brake lathe | ACME | BL-1X3 | H1 | S5 |
| DJ16 | Brake lathe | Brake-cut | 45899 | H4 | S7 |
| LL34 | Tire changer | ACME | TC-450 | H1 | S7 |
| OU81 | Wheel Bal. | A1 Tools | 7784S | H1 | S2 |
| OU84 | Wheel Bal. | ACME | WB-1X3 | H3 | S7 |
| RT07 | Air Compr. | ACME | AC-550 | H1 | S2 |
| RT08 | Air Compr. | A1 Tools | A74112 | H4 | S4 |
| FE14 | Fluid Exchanger | Top Tools | FE X1 | H1 ← 165 | S4 |

| MD Hardware | Current MD SW |
|---|---|
| H1 | S4 ← 166 |
| H2 | S4 |
| H3 | S7 |
| H4 | S2 |

FIG. 6

| MD ID ↙91 | Date(s) ↙92 | Start Time ↙93 | End Time ↙94 | Data Value ↙95 | Online ↙96 ↙97 |
|---|---|---|---|---|---|
| 1 | 29-MAR-2016 | 13:00:00 | 13:00:04 | 2048 | Yes |
| 1 | 29-MAR-2016 | 13:00:05 | 13:01:59 | 2040 | Yes |
| 1 | 29-MAR-2016 | 13:02:00 | 20:04:14 | 0 | Yes |
| 1 | 29-MAR-2016 | 20:04:15 | 20:04:45 | 125 | Yes |
| 1 | 29-MAR-2016 | 20:04:46 | ---- | ---- | No |

↙90

| MD ID ↙191 | Date(s) ↙192 | Time ↙193 | Data Value ↙195 | Online ↙196 ↙197 |
|---|---|---|---|---|
| 2 | 29-MAR-2016 | 07:15:20 | 1024 | Yes |
| 2 | 29-MAR-2016 | 07:15:22 | 2048 | Yes |
| 2 | 29-MAR-2016 | 07:15:25 | 0 | Yes |
| 2 | 29-MAR-2016 | 10:04:15 | 0 (or null) | No |
| 2 | 29-MAR-2016 | 10:30:00 | 0 | Yes |

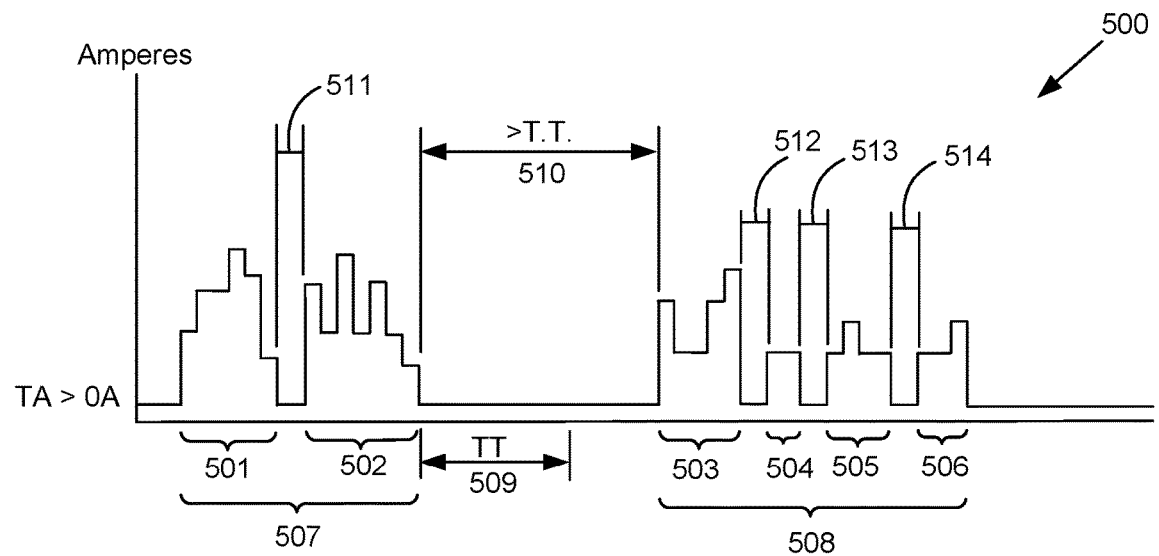
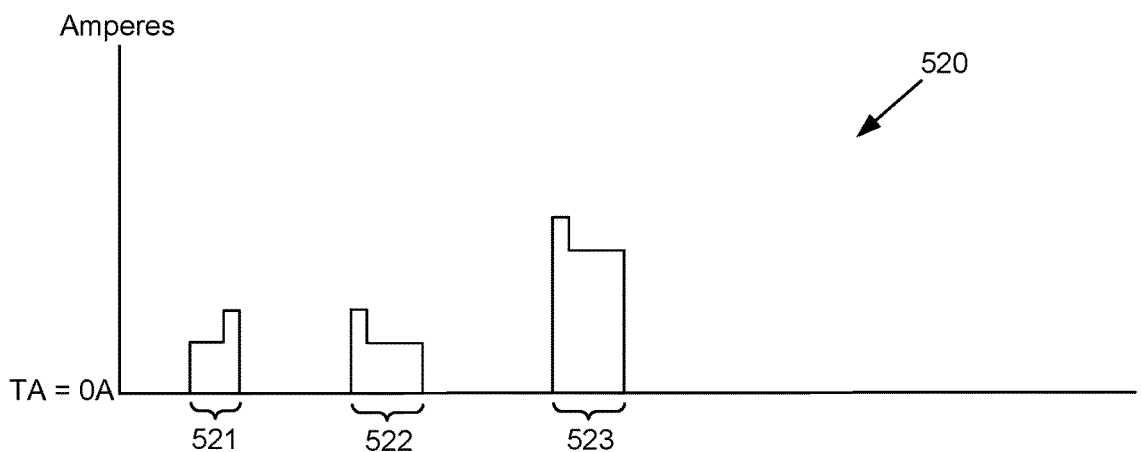
FIG. 8

| Not. ID | EST Type | EST Brand | EST Model | Condition | Role |
|---|---|---|---|---|---|
| 1 | Vehicle Lift | Acme | Pro-Lift 778 | Usage > Threshold % of Life Exp | Sales Person |
| 2 | Vehicle Lift | Acme | Pro-Lift 778 | Usage > Threshold % of Life Exp | Shop Owner |
| 3 | Vehicle Lift | Acme | Pro-Lift 778 | Usage > Threshold % of Ser. Int. | Service Tech. |
| 4 | Vehicle Lift | Acme | Pro-Lift 778 | Usage > Threshold % of Ser. Int. | Shop Owner |
| 5 | Vehicle Lift | Acme | Pro-Lift 778 | Fault Detected | Shop Owner or Tech |
| 6 | Vehicle Lift | Acme | Pro-Lift 778 | Fault Detected | Service Tech. |
| 7 | Vehicle Lift | Acme | Pro-Lift 778 | EST Available | Shop Tech. |
| 8 | Vehicle Lift | Acme | Pro-Lift 778 | Lack of Use | Service Tech. |
| 9 | Vehicle Lift | Acme | Pro-Lift 778 | Usage Up | Service Tech. |
| 10 | Vehicle Lift | Acme | Pro-Lift 778 | Usage Down | Service Tech. |
| 11 | Brake Lathe | Brake-Cut | 45899 | Usage > Threshold % of Life Exp | Sales Person |
| 12 | Brake Lathe | Brake-Cut | 45899 | Usage > Threshold % of Life Exp | Shop Owner |
| 13 | Brake Lathe | Brake-Cut | 45899 | Usage > Threshold % of Ser. Int. | Service Tech. |
| 14 | Brake Lathe | Brake-Cut | 45899 | Usage > Threshold % of Ser. Int. | Shop Owner |
| 15 | Brake Lathe | Brake-Cut | 45899 | Fault Detected | Shop Owner or Tech |
| 16 | Brake Lathe | Brake-Cut | 45899 | Fault Detected | Service Tech. |
| 17 | Brake Lathe | Brake-Cut | 45899 | EST Available | Shop Tech. |
| 18 | Brake Lathe | Brake-Cut | 45899 | Lack of Use | Service Tech. |
| 19 | Brake Lathe | Brake-Cut | 45899 | Usage Up | Service Tech. |
| 20 | Brake Lathe | Brake-Cut | 45899 | Usage Down | Service Tech. |
| 21 | Null | Null | Null | Amperage > Expected Value | Service Tech |
| 22 | Air Compressor | A1 Tools | 7784S | Amperage > Expected Value | Service Tech |
| 23 | Null | Null | Null | Current SW Level < Newest SW Level | Service Tech |
| 24 | Null | Null | Null | MD Offline > Offline Threshold | Service Tech |
| 25 | Null | Null | Null | All Shop MD Offline > Offline Threshold | Service Tech |

| NOTIFICATION ID | NOTIFICATION TEMPLATES |
|---|---|
| 1 | VEHICLE LIFT AT [P1]% OF EXPECTED LIFE. YOUR LAST VISIT TO SHOP WAS ON [P2]. |
| 2 | VEHICLE LIFT AT [P1]% OF EXPECTED LIFE. |
| 3 | VEHICLE LIFT WAS LAST SERVICE ON [P3]. CALL [P4] AT SHOP [P5]. |
| 4 | VEHICLE LIFT WAS LAST SERVICE ON [P3]. SCHEDULE SERVICE TODAY BY CALLING [P6] AT [P7]. |
| 5 | FAULT DETECTED WITH VEHICLE LIFT. SCHEDULE SERVICE TODAY BY CALLING [P6] AT [P7]. |
| 6 | FAULT DETECTED WITH VEHICLE LIFT. CALL [P4] AT SHOP [P5]. |
| 7 | VEHICLE LIFT AVAILABLE FOR USE. |
| 8 | VEHICLE LIFT LAST USED [P8]. CALL [P4] AT SHOP [P5] TO CHECK ON NEED FOR SERVICE OR TRAINING. |
| 9 | [P9] JOBS PERFORMED USING VEHICLE LIFT DURING [P10]. INCREASE OF [P11]%. |
| 10 | [P9] JOBS PERFORMED USING VEHICLE LIFT DURING [P10]. DECREASE OF [P11]%. |
| 11 | BRAKE LATHE AT [P1]% OF EXPECTED LIFE. YOUR LAST VISIT TO SHOP WAS ON [P2]. |
| 12 | BRAKE LATHE AT [P1]% OF EXPECTED LIFE. |
| 13 | BRAKE LATHE WAS LAST SERVICE ON [P3]. CALL [P4] AT SHOP [P5]. |
| 14 | BRAKE LATHE WAS LAST SERVICE ON [P3]. SCHEDULE SERVICE TODAY BY CALLING [P6] AT [P7]. |
| 15 | FAULT DETECTED WITH BRAKE LATHE. SCHEDULE SERVICE TODAY BY CALLING [P6] AT [P7]. |
| 16 | FAULT DETECTED WITH BRAKE LATHE. CALL [P4] AT SHOP [P5]. |
| 17 | BRAKE LATHE AVAILABLE FOR USE. |
| 18 | BRAKE LATHE LAST USED [P8]. CALL [P4] AT SHOP [P5] TO CHECK ON NEED FOR SERVICE OR TRAINING. |
| 19 | [P9] JOBS PERFORMED USING BRAKE LATHE DURING [P10]. INCREASE OF [P11]%. |
| 20 | [P9] JOBS PERFORMED USING BRAKE LATHE DURING [P10]. DECREASE OF [P11]%. |
| 21 | OPERATING CURRENT FOR [P12] EXCEED EXPECTED AVERAGE CURRENT VALUE. |
| 22 | OPERATING CURRENT FOR YOUR A1 TOOLS AIR COMPRESSOR EXCEEDED EXPECTED AVERAGE CURRENT VALUE. |
| 23 | A SOFTWARE UPDATE IS AVAILABLE FOR THE MEASUREMENT DEVICE AT SHOP [P5]. |
| 24 | A MEASUREMENT DEVICE CONNECTED TO EST [P12] HAS BEEN OFFLINE SINCE [P13]. CALL [P7] FOR SERVICE. |
| 25 | ALL MEASUREMENT DEVICES CONNECTED TO EST AT SHOP [P5] OFFLINE SINCE [P13]. CALL [P7] FOR SERVICE. |

| Person ID | Name | Role | Location ID | Territory ID | Est Brand | Est Type | Est Model |
|---|---|---|---|---|---|---|---|
| 1 | Jane Doe | Sales Person | NULL | T1 | ACME | Vehicle Lift | AA56 |
|   |   |   |   |   |   |   | AA57 |
| 2 | Jenny Doe | Service Tech. | NULL | T2 | ACME | Vehicle Lift | AA56 |
|   |   |   |   |   |   |   | AA57 |
|   |   |   |   |   |   | Brake Lathe | DJ13 |
| 3 | Butch Hamilton | Shop Owner | L1 | NULL | ACME | Vehicle Lift | AA56 |
| 4 | John Doe | Shop Tech. | L4 | NULL | Brake Cut | Brake Lathe | 45899 |
| 5 | Jasper Doe | Shop Manager | L4 | NULL | A1 Tools | Wheel Bal. | 7784S |
| 6 | Jake Doe | Sales Manager | NULL | T3 | ACME | Vehicle Lift | AA56 |
|   |   |   |   |   | ACME | Vehicle Lift | AA57 |
|   |   |   |   |   | ACME | Tire Changer | TC-450 |
|   |   |   |   |   | ACME | Wheel Bal. | WB-1X3 |
| 7 | Jimmy Johns | Sales Person | NULL | T4 | Top Tools | Fluid Exch. | FE X1 |

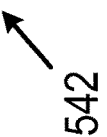

| PERSON ID | NOTIFICATION HIERARCHY | DESTINATION ID | NOT. ID | MAX. NOT. PER PERIOD | PERIOD | NOT. COUNT |
|---|---|---|---|---|---|---|
| 1 | SMS<br>E-MAIL | 555-123-3458<br>JANE@E-MAIL.COM | 1 | 1 | WEEKLY | 0 |
| 2 | SMS<br>E-MAIL | 555-867-5309<br>JENNY@E-MAIL.COM | 2, 3, 6, 23 | 10<br>1 | DAILY<br>2 DAYS BEFORE SERVICE CALL | 4<br>0 |
| 3 | E-MAIL | NOTICE_AB@E-MAIL.COM | 2<br>6 | 1<br>UNLIMITED | WEEKLY<br>WEEKLY | 0<br>1 |
| 4 | SMS<br>SM APP. | BEST-TECH@FIX.COM<br>@BEST-TECH-HANDLE | 7 | 1 | 1 HR. AFTER REQUEST | 1 |
| 5 | E-MAIL | SHOP-BOSS@FIX-IT.COM | 21, 22 | 15 | DAILY | 0 |
| 6 | E-MAIL | NOTICE_SALESMAN_5@EMAIL.COM | 1, 3, 6, 8, 9, 10 | 50 | DAILY | 16 |
| 7 | SMS<br>WEB APP. | 555-805-3799<br>WEB APP ID AND PASSWORD 1 | 24, 25 | 25 | DAILY | 12 |

FIG. 12

| EST Type | EST Mfg. | EST Model | Service Interval | Life Expectancy |
|---|---|---|---|---|
| Brake Lathe | Null | Null | 500 Hours | 10,000 Hours |
| Brake Lathe | Acme | BL-1X3 | 600 Hours | 12,000 Hours |
| Brake Lathe | Brake-Cut | 45899 | 550 Hours | 14,000 Hours |
| Brake Lathe | A1 Tools | Null | 550 Hours | 13,000 Hours |
| Vehicle Lift | Null | Null | 2,000 Uses | 40,000 Uses |
| Vehicle Lift | Acme | Pro-Lift 778 | 3,000 Uses | 50,000 Uses |
| Vehicle Lift | Acme | Pro-Lift 780A | 3,000 Uses | 50,000 Uses |
| Vehicle Lift | Lift-Up | VL-101 | 2,500 Uses | 60,000 Uses |
| Air Compressor | Null | Null | 3 Months | 3 Years |
| Air Compressor | Acme | AC-550 | 4 Months | 4 Years |
| Air Compressor | A1 Tools | 7784S | 4 Months | 3.5 Years |

FIG. 13

| | | | | | |
|---|---|---|---|---|---|
| T₀, ID₁, 0 | T₁, ID₁, 5 | T₂, ID₁, 2 | T₃, ID₁, 0 | T₄, ID₁, 6 | T₅, ID₁, 2 |
| T₆, ID₁, 0 | T₁₀, ID₁, 6 | T₁₁, ID₁, 3 | T₁₃, ID₁, 0 | T₁₄, ID₁, X | T₁₈, ID₁, 6 |
| T₁₉, ID₁, 3 | T₂₀, ID₁, 0 | T₂₁, ID₁, 6 | T₂₂, ID₁, 3 | T₂₃, ID₁, 0 | T₂₄, ID₁, 7 |
| T₂₅, ID₁, 3 | T₂₆, ID₁, 0 | T₂₇, ID₁, 7 | T₂₈, ID₁, 3 | T₂₉, ID₁, 0 | T₃₀, ID₁, X |
| T₃₁, ID₁, 7 | T₃₂, ID₁, 3 | T₃₃, ID₁, 0 | T₃₄, ID₁, 7 | T₃₅, ID₁, 4 | T₃₆, ID₁, 0 |
| T₃₇, ID₁, 7 | T₃₈, ID₁, 4 | T₃₉, ID₁, 0 | T₄₀, ID₁, 7 | T₄₁, ID₁, 4 | T₄₂, ID₁, 0 |
| T₄₃, ID₁, 8 | T₄₄, ID₁, 4 | T₄₅, ID₁, 4 | T₄₆, ID₁, 4 | T₄₇, ID₁, 0 | T₄₈, ID₁, X |
| T₄₉, ID₁, 8 | T₅₀, ID₁, 4 | T₅₁, ID₁, 4 | T₅₂, ID₁, 0 | T₅₃, ID₁, 7 | T₅₄, ID₁, 4 |
| T₅₅, ID₁, 0 | T₅₅, ID₁, 7 | T₅₆, ID₁, 4 | T₅₇, ID₁, 0 | T₅₈, ID₁, 7 | T₅₉, ID₁, 4 |
| T₆₀, ID₁, 0 | T₆₁, ID₁, 8 | T₆₂, ID₁, 4 | T₆₃, ID₁, 0 | T₆₄, ID₁, 8 | T₆₅, ID₁, 4 |
| T₆₆, ID₁, 0 | T₆₇, ID₁, 8 | T₆₈, ID₁, 4 | T₆₉, ID₁, 0 | T₇₀, ID₁, 8 | T₇₁, ID₁, 4 |
| T₇₂, ID₁, 0 | T₇₃, ID₁, 0 | T₇₄, ID₁, 4 | T₇₅, ID₁, 0 | T₇₆, ID₁, X | T₇₉, ID₁, X |
| T₈₀, ID₁, 8 | T₈₁, ID₁, 4 | T₈₂, ID₁, 0 | T₈₃, ID₁, 8 | T₈₄, ID₁, 4 | T₈₅, ID₁, 4 |
| T₈₆, ID₁, 0 | T₈₇, ID₁, 7 | T₈₈, ID₁, 4 | T₈₉, ID₁, 0 | T₉₀, ID₁, 7 | T₉₁, ID₁, 4 |
| T₉₂, ID₁, 0 | T₉₃, ID₁, 7 | T₉₄, ID₁, 4 | T₉₅, ID₁, X | T₉₆, ID₁, 0 | T₉₇, ID₁, 7 |
| T₉₈, ID₁, 4 | T₉₉, ID₁, 0 | T₁₀₀, ID₁, 10 | T₁₀₁, ID₁, 10 | T₁₀₂, ID₁, 10 | T₁₀₃, ID₁, 0 |
| T₁₀₄, ID₁, X | | | | | |

FIG. 19

METHOD, SYSTEM, AND APPARATUS FOR REPORTING DATA PERTAINING TO ACTIONABLE CONDITION OF ELECTRICAL SHOP TOOL

CROSS REFERENCE TO RELATED APPLICATION

This application claims the benefit of U.S. Patent Application No. 62/367,852, filed Jul. 28, 2016. U.S. Patent Application No. 62/367,852 is incorporated herein by reference in its entirety.

BACKGROUND

Most vehicles are serviced at least once during their useful life. In many instances, a vehicle is serviced at a repair shop by a professional mechanic (e.g., a technician). The technician can use any of a variety of mechanical hand tools to service (e.g., repair) any of the wide variety of mechanical components on a vehicle. While servicing vehicles, a technician sometimes needs to use an electrical shop tool (EST). A typical repair shop can invest a significant amount of money to acquire the EST. The EST can include one or more electrical motors or one or more parts that require periodic maintenance.

In many instances, after an EST is installed or placed at a repair shop, the maintenance of the EST is not carried out properly or often enough. For any number of reasons, a repair shop manager may not be familiar with maintaining an EST or with the prior maintenance history of an EST at his or her repair shop. The lack of maintaining the EST can shorten a life-span of the EST or lead to the EST failing such that the EST cannot be used until it has been repaired.

Furthermore, repair shops continue to use and purchase EST that do not provide any reports regarding use of the EST. It would be beneficial for a repair shop or a person affiliated with the repair shop to receive a notification regarding use of its EST. Such notifications can lead to improved maintenance of the EST and, in turn, a longer life-span of the EST. Such notifications can prevent injury to a technician, damage to an EST, damage to a repair shop, or damage to a vehicle.

OVERVIEW

In one aspect, the example embodiments take the form of a system for reporting data pertaining to an actionable condition of an electrical shop tool (EST), the system comprising: (i) a sensor to output or generate a sensor signal pertaining to use of the EST, (ii) at least one processor to periodically sample the sensor signal, (iii) a non-transitory computer-readable medium to store data values based on the sensor signal sampled by the at least one processor, and (iv) a first network transceiver to transmit the data values based on the sensor signal sampled by the processor to a network for transmission to a processing system for determining an actionable condition of the EST based on the transmitted data values.

In another aspect, the example embodiments take the form of a method for reporting data pertaining to an actionable condition of an EST, the method comprising: (i) sampling, periodically by at least one processor, a sensor signal generated or output by a sensor pertaining to use of the EST, (ii) storing, at a non-transitory computer-readable medium, data values based on the sensor signal sampled by the at least one processor, and (iii) transmitting, by a transceiver, the data values based on the sensor signal sampled by the at least one processor to a network for transmission to a processing system for determining an actionable condition of the EST based on the transmitted data values.

In yet another aspect, the example embodiments take the form of a computer readable medium having stored thereon instructions executable by at least one processor to cause a computing system to perform functions comprising: (i) sampling, periodically, a sensor signal generated or output by a sensor pertaining to use of an EST, (ii) storing data values based on the sensor signal sampled by the at least one processor, and (iii) transmitting the data values based on the sensor signal sampled by the at least one processor to a network for transmission to a processing system for determining an actionable condition of the EST based on the transmitted data values.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

FIG. 5 shows example registration data regarding measurement devices and electrical shop tools.

FIG. 6 shows example reference data regarding electrical shop tools and measurement devices.

FIG. 7 shows example measurement data.

FIG. 8 depicts graphs indicative of grouped measurement data.

FIG. 9, FIG. 10, FIG. 11, FIG. 12, and FIG. 13 are tables of example mapped data.

FIG. 18 and FIG. 19 show examples of measurement data.

DETAILED DESCRIPTION

I. Introduction

Figure 1:
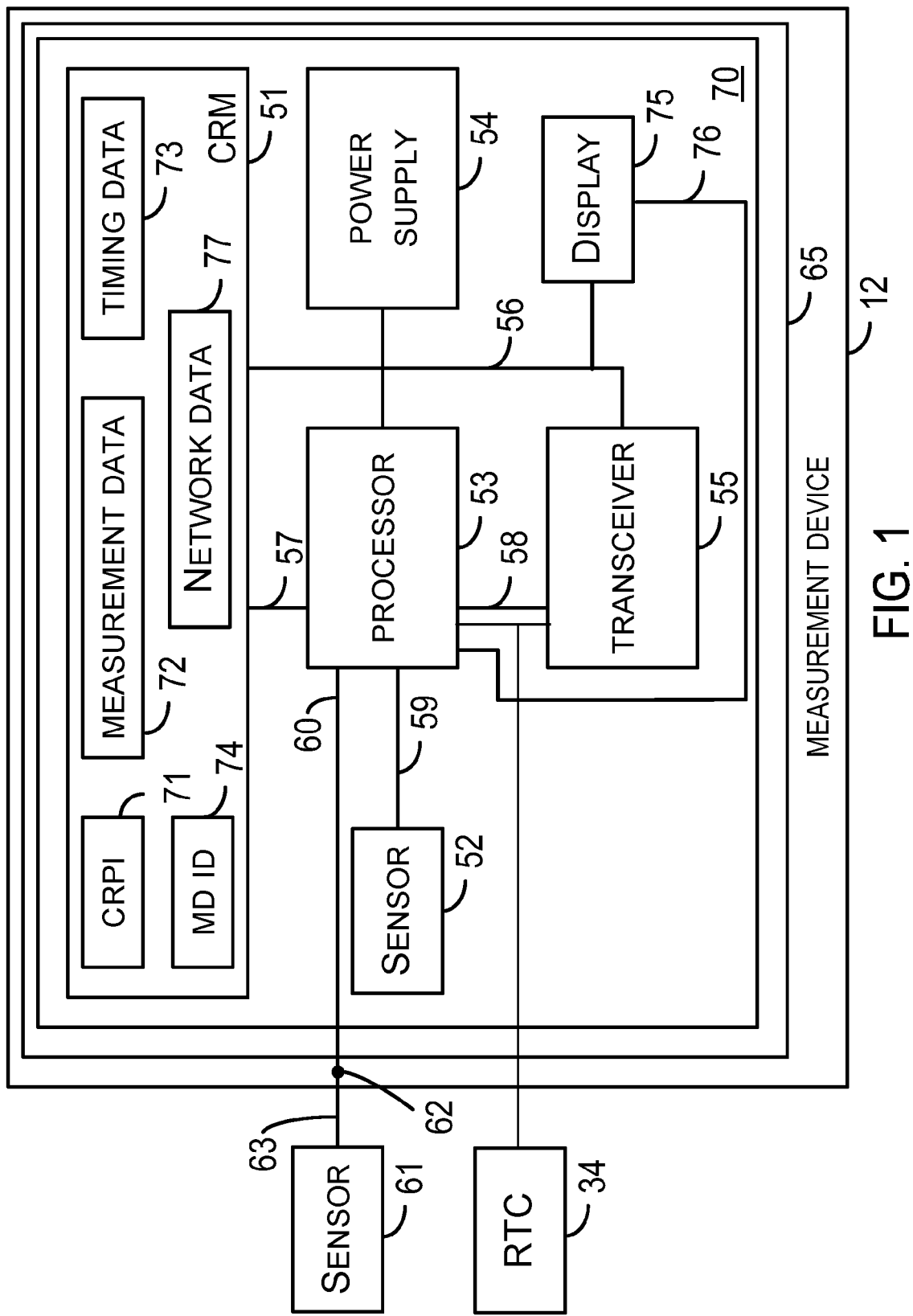
FIG. 1 is a block diagram of an example measurement device.

This description describes several example embodiments including, but not limited to, example embodiments that pertain to at least one of reporting data pertaining to use of an electrical shop tool (EST), determining actionable conditions of the EST, and providing notifications regarding an actionable condition of the EST. A measurement device can determine the data to be reported to a processing system and subsequently report the data to the processing system by transmitting the data over a communication network. The processing system can determine the actionable conditions based at least in part on the date reported by the measurement device. As an example, an actionable condition can include a maintenance condition of the EST, a sales phone call, an email of return-on-investment data to the owner of the EST, or a warranty issue regarding the EST. Other examples of the actionable condition are also possible.

The processing system can be configured to receive data reported by multiple measurement devices, each measurement device reporting data regarding one or more EST. The processing system can determine and provide a notification regarding an actionable condition associated with each of those electrical shop tools.

The measurement device can transmit the measurement data to the processing system as a stream of measurement data over time. The processing system can analyze the measurement data stream from a measurement device to determine individual jobs performed using the EST connected to the measurement device. The processing system can analyze the jobs to determine a summary of jobs. The processing system can compare the summary of jobs to rules defining actionable conditions. The processing system can transmit a notification regarding an actionable condition based on a person (i.e., a registrant) registered to receive the notification based on that person's attributes, preferences, or preferred schedule, for example.

The rules the processing system uses to determine which notification to send and the destination of the notification can be based on characteristics of the type of EST (e.g., a particular brand or model) connected to the measurement device or a particular instance of the type of EST (e.g., particular serial number), as well as preferences of the person registered to receive a notification and a role of each person registered to receive a notification. The role may refer to an occupation or title of a person.

The EST can be arranged in any of a variety of configurations. For example, an EST discussed in the example embodiments can include an electrical motor or a pump (e.g., a hydraulic fluid pump). As another example, an EST discussed in the example embodiments can comprise an EST without any electrical motor and without any pump. Furthermore, any EST discussed in the example embodiments can include mechanical components that are moved, controlled, or otherwise used during normal use of the EST.

In one respect, the measurement device of an example embodiment can be installed at a repair shop for performing measurements with respect to an EST that does not include a measurement device that reports measurement data to a processing system that determines and reports actionable conditions. This type of EST can be referred to as legacy EST. As an example, the installation of the measurement device for use with a legacy EST can occur after installation and use of the legacy EST at a repair shop or at a time the legacy EST is being installed at the repair shop. In another respect, the measurement device of an example embodiment can be part of the EST.

The diagrams, flow charts, and data shown in the figures are provided merely as examples and are not intended to be limiting. Many of the elements illustrated in the figures or described herein are functional elements that can be implemented as discrete or distributed elements, individually or in conjunction with other element(s), and in any suitable combination or location. Those skilled in the art will appreciate that other arrangements and elements (e.g., machines, interfaces, functions, orders, or groupings of functions) can be used instead. Furthermore, the functions described as being performed by one or more elements can be carried out by a combination of hardware, firmware, or software (e.g., a processor that executes computer-readable program instructions).

II. Example System and Devices

A. Example Measurement Devices

FIG. 1 is a block diagram of a measurement device (MD) 12. The MD 12 can comprise at least one of a computer-readable medium (CRM) 51, a processor 53, a power supply 54, a transceiver 55, and a display 75. The MD 12 can include a substrate 70 (e.g., a printed circuit board) with at least one of electrical circuits 56, 57, 58, 76, sensor connections 59, 60, and a connector 62. The MD 12 can comprise a housing 65. The housing 65 can surround at least a portion of the substrate 70 or a portion of one or more of the components shown in FIG. 1 as being on the substrate 70. Any MD described in this description can be referred to as a "computing system."

FIG. 1 shows the MD 12 with a sensor 52. The sensor 52 can be mounted on the substrate 70 or within the housing 65. Accordingly, the sensor 52 can be referred to as an "on-board sensor" or a "local sensor." The sensor 52 connects to the processor 53 via the sensor connection 59. The sensor connection 59 can be arranged in various configurations. As an example, the sensor connection 59 can include a single electrical circuit that connects to the processor 53. As another example, the sensor connection 59 can include multiple (e.g., two) electrical circuits that connect to the processor 53. The processor 53 can measure a voltage differential associated with one or more electrical circuits connected to one or more sensors. As another example, the sensor connection 59 can include an analog-to-digital converter and a data bus to transmit digital data representing an analog electrical signal output by the sensor 52.

FIG. 1 also shows the MD 12 connected to a sensor 61 that is located off-board the substrate 70 and outside of the housing 65. Accordingly, the sensor 61 can be referred to as an "off-board sensor" or a "remote sensor." The sensor connection 60 can extend from the processor 53 to the connector 62. A sensor circuit 63 can connect the sensor 61 to the connector 62 so that output of the sensor 61 can be provided to the processor 53 via the sensor connection 60. The sensor circuit 63 can include one or more electrical circuits. Additionally or alternatively, the connector 62 can include a receiver and the sensor circuit 63 can include a transmitter such that the output of the sensor 61 can be provided to the connector 62 wirelessly. The MD 12 can be configured for operation with at least one of sensor 52 and sensor 61. Sensor 52 and sensor 61 can both comprise one or more sensors. For embodiments in which sensor 52 or 61 include two or more sensors, two or more of the sensors can be the same type of sensor or different types of sensors.

The electrical circuit 56 can connect the power supply 54 to one or more components within the MD 12. The electrical circuits 57, 58, and 76 can be configured as data busses to carry data between the processor 53 and the CRM 51, between the processor 53 and the transceiver 55, and between the processor 53 and the display 75, respectively. The sensor connections 59 and 60 can carry electrical currents between the sensor 52 and the processor 53, and between the connector 62 and the processor 53, respectively. The CRM 51 and the transceiver 55 are shown separately from the processor 53. The processor 53, the CRM 51, or the transceiver can be located with a single semiconductor package.

A processor such as the processor 53, the processor 152 (shown in FIG. 4) or any other processor discussed in this description can include one or more processors. Therefore, the processor 53 or the processor 152 can be referred to as "at least one processor." A processor can include a general purpose processor (e.g., an INTEL® single core microprocessor or an INTEL® multicore microprocessor), or a special purpose processor (e.g., a digital signal processor, a graphics processor, a processor including an image sensor, or an application specific integrated circuit (ASIC) processor). A processor can be configured to execute computer-readable program instructions (CRPI). For example, the processor 53 can execute CRPI 71 stored in the CRM 51. A processor can be configured to execute hard-coded functionality in addition to or as an alternative to software-coded functionality (e.g., via CRPI). The processor 53 can be programmed to perform any of the functions described herein as being performed by execution of the CRPI 71 or by the MD 12.

In an embodiment in which the MD 12 includes multiple processors, at least one of the multiple processors can be configured in a single integrated circuit package along with a transceiver, such as the transceiver 55 or a transceiver that performs at least a portion of the functions described as being performed by the transceiver 55.

In an embodiment in which the MD 12 includes multiple processors, at least one of the multiple processors can be configured in a single integrated circuit package along with a CRM, such as the CRM 51 or a CRM containing one or more items described as being stored in the CRM 51.

A CRM such as the CRM 51 or any other CRM discussed in this description can include one or more CRM. A CRM can include a non-transitory CRM, a transitory CRM, or both a non-transitory CRM and a transitory CRM. A non-transitory CRM, or a portion thereof, can be located within or as part of a processor (e.g., within a single integrated circuit chip). A non-transitory CRM, or a portion thereof, can be separate and distinct from a processor.

A non-transitory CRM can include a volatile or non-volatile storage component, such as an optical, magnetic, organic or other memory or disc storage component. Additionally or alternatively, a non-transitory CRM can include or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can include static RAM or dynamic RAM.

A transitory CRM can include, for example, CRPI provided over a communication link, such as a communication link which is connected to or is part of a communication network 129 (or more simply "network"). The communication link can include a digital communication link or an analog communication link. The communication link can include a wired communication link including one or more wires or conductors, or a wireless communication link including an air interface.

A CRM can be referred to by other terms such as a "computer-readable storage medium," a "data storage device," a "memory device," a "memory," "computer-readable media," a "computer-readable database," "at least one computer-readable medium," or "one or more computer-readable medium." Any of those alternative terms can be preceded with the prefix "transitory" if the CRM is transitory or "non-transitory" if the CRM is non-transitory.

The CRM 51 can contain at least one of computer-readable program instructions (CRPI) 71, measurement data 72, timing data 73, a measurement device identifier (MD ID) 74 and network data 77. The processor 53 executes the CRPI 71. Data stored within a CRM can be stored in a flat file, multiple tables, or in some other format. The data described in this description as being stored in a table can be stored within a CRM as part of one or more tables or otherwise.

The processor 53, by executing the CRPI 71 or otherwise, can convert analog values (e.g., analog voltages across the sensor connections 59 and 60, or a voltage on the sensor connection 59 or 60 with respect to reference signal (e.g., ground)) to digital values. This conversion can include the processor 53 sampling the voltage differential across the sensor connections 59 and 60 or the voltage on the sensor connection 59 or 60 with respect to the reference signal). The sampling can occur periodically at a predefined rate, such a rate of 2,400 samples per second or at another rate. The processor 53 can convert each sampled analog voltage value to a binary number within a range (e.g., a range of 0 to $2^9$ (i.e., 0 to 512), a range of 0 to $2^{10}$ (i.e., 0 to 1,024), a range of 0 to $2^{11}$ (i.e., 0 to 2048) or another range). The processor 53 can scale the sampled voltage values linearly (e.g., by multiplying an initial sample value by a constant value). The processor 53 can scale the sampled voltage values non-linearly (e.g., based on a logarithm or power relation). The processor 53 can cause the converted digital values, scaled or otherwise, to be stored as part of or in the measurement data 72. This scaling and storage can be useful for preserving low-value accuracy when several orders of magnitude difference exists between the smallest and largest values to be stored.

The processor 53 can determine a time-series representation of the analog values using any of a variety processes. As an example, the time-series representation can comprise a Discrete Fourier Transform (DFT) representation, a Discrete Cosine Transform (DCT), a Discrete Wavelet Transform (DWT) representation, a Piecewise Linear Approximation representation, an Adaptive Piecewise Constant Approximation representation, a Haar Wavelet representation, for example. The processor 53 can compress the time-series representation, such as by encoding the time-series representation using MP3 compression or some other compression technique. The processor 53 can generate the DFT representation using a Fast Fourier Transform (FFT) algorithm.

The processor 53 can execute the CRPI 71 to cause the transceiver 55 to request time information from a remote device having a network transceiver. The processor 53 can determine the time information received by the transceiver 55 from the remote device and store the time information within the timing data 73. The received time information can be used as a basis to determine when the processor 53 samples the electrical signals across or from the sensor connections 59 and 60, to record a sampling time associated with one or more data values indicating a sampled voltage, and to determine when the transceiver 55 is to transmit data indicating the sampled voltage. The processor 53 can request the time information when the MD 12 enters a power-on state after having been in a power-off state. The requested time information and the timing data 73 can include date information (e.g., a calendar date).

The CRPI 71 can include a maximum report-to-report time (e.g., ten minutes, thirty minutes, or sixty minutes). The timing data 73 can include a time stamp that indicates the last time the MD 12 transmitted measurement data to the processing system (PS) 130. The processor 53 can determine whether the maximum report-to-report time has elapsed since the most recent transmission of measurement data to the PS 130. As an example, the processor 53 can make that determination by referring to internal processor timing circuitry or by referring to the time stamp indicating the time of the last measurement data transmission. Upon determining the maximum report-to-report time has elapsed, the processor 53 can cause the transceiver 55 to transmit measurement data to the PS 130. That transmitted measurement data can be based on measurements made by the MD 12 after the prior transmission of measurement data from the MD 12 to the PS 130.

The voltages sampled by the processor 53 can represent a current flow to an electrical motor of an EST. In one respect, the processor 53 can cause the transceiver 55 to transmit measurement data stored in the measurement data 72 for the most recent time period prior to the maximum report-to-report time being exceeded or elapsing if at least one data value stored during the preceding time interval represents a current flow to the motor exceeding 0.0 amperes. In another respect, the processor 53 can cause the transceiver 55 to transmit measurement data stored in the measurement data 72 for the most recent time period prior to the maximum report-to-report time being exceeded or elapsing even if all of those stored values represent the current flow the motor was 0.0 amperes. In yet another example, the CRM 51 comprises a particular memory stack size for storing the measurement data 72 and the processor 53 is programmed to transmit the measurement data when a count or quantity of the data values stored in the memory stack reaches a predetermined percentage (e.g., 90%, 95%, 100% or some other percentage) of a count or quantity of data values that can be stored in the memory stack.

The MD ID 74 includes one or more identifiers associated with the MD 12. The transceiver 55 can transmit the MD ID 74 along with the measurement data that is transmitted to the PS 130. The MD ID 74 can include a globally unique identifier (ID) so that the PS 130 can determine which MD sent the measurement data by referring to registration data that indicates the MD ID is associated with the MD that sent the measurement data. The MD ID 74 can be used as a key value associated with other data at the PS 130.

An MD attribute is an attribute of an MD or an attribute that is associated with an MD, such as the MD 12. As an example, an MD attribute that is associated with an MD configured for use with a particular EST or a particular type of EST (e.g., a vehicle lift) can comprise an MD attribute that pertains to the particular EST or the particular type of EST. The MD ID 74 can comprise data that represents an MD attribute (e.g., one or more MD attributes) of the MD 12 or that is associated with the MD 12. The PS 130 can include a data structure to determine what each MD attribute represents. That data structure, for example, can include geopolitical map information or postal code information for interpreting an MD attribute of an MD ID received with or otherwise associated with the transmitted data.

This paragraph includes examples of information that can be represented by one or more MD attributes, such as any MD attribute discussed in this description. Other examples of attribute information are possible.

(1) geographical location attribute information (e.g., a latitude and longitude);

(2) geopolitical location attribute information (e.g., a town, a county, a city, a state, a country, or a postal code);

(3) owner attribute information (e.g., information regarding an owner of the EST or MD 12 (e.g., a person, a corporation, or a government entity);

(4) machine classification attribute information (e.g., a vehicle lift, a brake lathe, a tire balancer, a tire changer, or another type of EST);

(5) machine group attribute information (e.g., a specific type/group of machines with substantively similar characteristics);

(6) machine model attribute information (e.g., information regarding a set of machines sharing substantially the same bill of materials or construction specifics, a model number, or a machine make);

(7) machine serial number attribute information (e.g., a machine-specific unique identity string, which either by itself or when combined with a machine model yields a globally unique ID);

(8) current sales organization attribute information (e.g., persons, group or corporate entity responsible for future sales efforts for the geographical area where the MD or EST connected to the ME is located);

(9) current sales person attribute information (e.g., specific individual with primary responsibility for sales effort for the geographical area where the MD or EST connected to the ME is located);

(10) current service organization attribute information (e.g., one or more person, groups or corporate entities responsible for service or maintenance efforts for the geographical area where the MD or EST connected to the MD is located);

(11) current service person attribute information (e.g., one or more specific individuals with some level of responsibility for sales efforts for the geographical area where the MD or EST connected to the MD is located);

(12) past sales organization attribute information (e.g., one or more specific persons, groups or corporate entities with a responsibility for past sales effort for the geographical area where the MD or EST connected to the ME is located);

(13) past sales person attribute information (e.g., specific individual with primary responsibility for past sales effort for the geographical area where the MD or EST connected to the ME is located);

(14) past service organization attribute information (e.g., one or more person, groups or corporate entities responsible for past service or maintenance efforts for the geographical area where the MD or EST connected to the MD is located);

(15) past service person attribute information (e.g., one or more specific individuals with some level of responsibility for past sales efforts for the geographical area where the MD or EST connected to the MD is located), and

(16) service history attribute information (e.g., one or more records containing date and service description information pertaining to servicing of the MD or EST connected to the MD). The service history attribute information can include an ID of a service person associated with servicing the MD or EST.

The network data 77 can comprise data that allows the MD 12 to communicate over the network 129. The network data 77 can be added or modified while registering the MD 12 with the PS 130, or otherwise. The network data 77 can comprise an identifier of a portion of the network 129, such as an Wi-Fi access point of the network 129 and a network password. Other examples of the network data 77 are possible.

Next, the transceiver 55 or any other transceiver discussed in this description can include one or more transceivers. Each transceiver can include one or more transmitters to transmit data onto a network, such as the communication network 111, 118, 127, 128, or 129. Each transceiver can include one or more receivers configured to receive data carried over a network, such as the network 129. As an example, the data transmitted or received by a transceiver can include any of the measurement data, timing data, notifications, metadata, or other data discussed in this description as being communicated across the network 129, to the MD 12, from the MD 12, to the PS 130, or from the PS 130. As an example, the metadata can include information regarding a device that provides measurement data to the PS 130, such as program version numbers, program check-sums, or lists of electrical modules present in an EST that contains multiple processors.

The transceiver 55 can receive an MD software update transmitted from the PS 130. The processor 53 can install the MD software update so that the MD 12 operates using a different set of software (e.g., a newer set of software).

A transmitter can transmit radio signals carrying data and a receiver can receive radio signals carrying data. A transceiver with that transmitter and receiver can include one or more antennas and can be referred to as a "radio transceiver," an "RF transceiver," or a "wireless transceiver." The radio signals transmitted or received by a radio transceiver can be arranged in accordance with one or more wireless communication standards or protocols such as an Institute of Electrical and Electronics Engineers (IEEE) standard, such as an IEEE 802.11 standard (e.g., 802.11a, 802.11b, 802.11g, or 802.11n) or an IEEE 802.15 standard (e.g., 802.15.1, 802.15.3, 802.15.4 (ZigBee), or 802.15.5) for wireless personal area networks (PANs), a Bluetooth version 4.1 or 4.2 standard developed by the Bluetooth Special Interest Group (SIG) of Kirkland, Wash., or an IEEE 802.11 standard for wireless local area networks (wireless LAN) (which is sometimes referred to as a Wi-Fi standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard. Additional examples of the wireless communication standard or protocol include an International Telecommunication Union (ITU) standard, such as the ITU-T G.9959 standard referred to as the Z-Wave standard, or a 6LoWPAN standard, a Thread networking protocol, an International Organization for Standardization (ISO/International Electrotechnical Commission (IEC) standard such as the ISO/IEC 18000-3 standard for Near Field Communication (NFC), the Sigfox communication standard, the Neul communication standard, and the LoRaWAN communication standard.

Additionally or alternatively, a transmitter can transmit a signal (i.e., one or more signals or one or more electrical waves) carrying or representing data onto a wire (e.g., one or more wires) and a receiver can receive via a wire a signal carrying or representing data over the wire. The wire can be part of a network, such as the network 129. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data transmitted by a transceiver can include a destination ID or address of a system component to which the data is to be transmitted. The data transmitted by a transceiver can include a source ID or address of the system component including the transceiver. The source ID or address can be used to send a response to the system component that includes the transceiver that sent the data. The source ID can include the MD ID 74 or an ID associated with the PS 130. The destination ID can include the MD ID 74 or an ID associated with the PS 130.

A device within the network 129 or that communicates via the network 129 using a packet-switched technology can be locally configured for a next 'hop' in the network (e.g., a device or address where to send data to, and where to expect data from). As an example, a device (e.g., a transceiver) configured for communicating using an IEEE 802.11 standard can be configured with a network name, a network security type, and a password. Some devices auto-negotiate this information through a discovery mechanism (e.g., a cellular phone technology).

In accordance with the example embodiments, the MD 12 can include a real-time clock (RTC) such that the MD 12 does not have to request time information from a remote device. The RTC can be included within the processor 53 or can be separate from the processor 53. The power supply 54 can provide power to the RTC constantly for its operation. FIG. 1 shows an RTC 34 and a line connecting the RTC 34 to the processor 53 and the transceiver 55. FIG. 1 shows the RTC 34 outside of the MD 12. In accordance with an example embodiment, the MD 12 does not include the RTC 34, but the MD 12 requests and receives time data from the RTC 34. The transceiver 55 can receive the time data via the network 129. In accordance with an example embodiment, the MD 12 includes the RTC 34. In that case, the RTC 34 can be connected to the processor 53 or can be part of the processor 53, for example.

The power supply 54 can be configured in any of a variety of configurations or combinations of the variety of configurations. As an example, the power supply 54 can receive AC current from an AC electrical supply 10 (shown in FIG. 14) and convert the AC current to a DC current for supplying to one or more of the components within the MD 12. As another example, the power supply 54 can include a battery or be battery operated. As yet another example, the power supply 54 can include a solar cell or be solar operated. The power supply 54 can comprise electrical circuits to distribute electrical current throughout the MD 12. Other examples of the power supply 54 are also possible.

The display 75 is configured to display information, such as information useful to a technician installing the MD 12. Such information can comprise some or all of the MD ID 74, for example. The display 75 can comprise any type of display described in this description or another type of display.

B. Example Sensors

As discussed, the measurement device 12 can include one or more on-board sensors (e.g., sensor 52) or can connect to one or more off-board sensors (e.g., sensor 61). Several examples of sensors and features of the example sensors are discussed elsewhere in this description. The PS 130 can receive the output signals or values from the MD 12, such as an array of output signals or values sent to the processing system over the network 129, and determine data values pertaining to use or non-use of an EST.

The sensor 52 or the sensor 61 can provide outputs to the processor 53 indicative of using an EST associated with the MD 12. As an example, the outputs indicative of use can include a voltage output, an amperage output (e.g., a direct current (DC) amperage), a pulse width modulated signal, or a digital value. The outputs indicative of use may indicate a position, an acceleration, a velocity, or a speed of a component of the EST. The PS 130 can use two or more output signals and time data to determine use of the EST. For example, the PS 130 can determine a speed or velocity of the EST component from two position values output from a sensor and time data.

As an example, the sensor 52 or the sensor 61 can include or be configured to include one or more of the sensors listed in the following fifteen enumerated sensor examples.

(1) A single data point sensor, such as an ammeter, configured to output a single value, such as one current reading, per time period. The processor 53 can cause each single value, output by the single data point sensor, to be stored along with time data indicative of the time period associated with the single output value.

(2) A position sensor configured to output signals or values indicating a position pertaining to an EST. The position can be linear, rotary (angular), continuous, or discrete (e.g., a home position or an end position). As an example, the positon sensor can comprise a limit switch. For an embodiment in which the EST comprises a vehicle lift, the position sensor can be installed at a particular position on a frame of the vehicle lift such that a signal output by the position sensor can indicate the lift arms of the vehicle lift have been moved to a particular vertical position. For a multiple post (e.g., two post or four post) vehicle lift, each post may include one or more position sensors. The PS 130 can process measurement data indicative of signals or values output by the position sensor(s) on the vehicle lift to determine the operating characteristics of the vehicle lift (e.g., lifting at each post is equal or unequal with respect to lifting at the other vehicle lift post(s)). The positon sensor(s) on a vehicle lift can output signals that indicate a height of a vehicle lift component with respect to a reference position (e.g., a floor of the repair shop).

(3) A tilt sensor can be configured to output signals or values indicating orientation or inclination of an EST or some portion of an EST. As an example, the EST can comprise a vehicle lift and the portion of the lift can comprise a lift arm.

(4) A velocity sensor configured to output signals or values indicating a linear velocity or angular velocity of a component of the EST. As an example, the component can be a motor shaft of an electrical motor.

(5) An acceleration sensor configured to output signals or values indicating a linear acceleration or angular acceleration of a component of the EST. As an example, the component can be a motor shaft of an electrical motor.

(6) A voltage sensor configured to output a voltage signal or value pertaining to an EST.

(7) A power sensor that includes a current sensor and a voltage sensor to output signals or values that can be used to calculate a power value pertaining to an EST or that indicate a power value pertaining to the EST.

(8) A thermal sensor configured to output signals or values indicating a temperature or heat detection pertaining to an EST.

(9) A volume flow sensor configured to output signals or values indicating a volume, velocity, or acceleration pertaining to an EST. As an example, the volume flow sensor can be positioned to detect a pressure within a transport line, such as a line for transporting air compressed by an air compressor or a line for transporting a liquid fluid in a hydraulic system.

(10) A vibration sensor configured to generate a vibration signal. The vibration sensor can be coupled to an EST, such as a brake lathe or another type of EST. The vibration signal can be responsive to vibrations experienced by the EST. The vibration sensor can comprise a microphone as described in U.S. Pat. No. 8,140,480, which is incorporated herein by reference. In accordance with an embodiment in which the EST comprise a brake lathe, the PS 130 can process the vibration signals to determine use parameters pertaining to the brake lathe, such as an amount of time the brake lathe is machining brake parts, a total amount of time the brake lathe has been used to machine brake parts during a particular time period, or an amount of time a motor of the brake lathe is operating in the on state but the brake lathe is not machining a brake part.

(11) A motion sensor configured to output signals or values to measure velocity, acceleration, or jerk (a first derivative of acceleration). The signals or values from this type of sensor can be summarized (e.g., using Fast Fourier Analysis or another summarizing process) to generate an array of frequencies and amplitudes for storage in the measurement data 72.

(12) A pressure sensor configured to output signals or values indicative of a pressure within some portion of an EST. As an example, the pressure sensor can be positioned to detect a pressure within a storage tank (such as a storage tank of an air compressor), or a transport line (such as a line for transporting air compressed by an air compressor or a line for transporting a liquid fluid in a hydraulic system). The pressure sensor can output signals or values that indicate a pressure within the EST has exceeded a threshold pressure at which a pressure relief valve within the EST relieves pressure within the EST.

(13) A microphone configured to capture audio. A sensor including a microphone can include or connect to electrical circuitry configured to convert the captured audio into an output audio signal.

(14) An image sensor configured to capture images and output images. Multiple captured images or multiple output images can be configured as a video signal.

(15) A current sensor configured to sense a current within some electrical conductor within an EST or extending to or from the EST. As an example, the current sensor can comprise a current transformer or a current sensor with a Hall sensor.

In accordance with an embodiment in which the sensor 52 or 61 includes a current sensor comprising a current transformer, the current transformer can comprise or be configured as a CR8300 series current transformer from CR Magnetics, St. Louis, Mo. In accordance with that example, the current transformer can be a vertical printed circuit board (PCB) mounted current transformer. The current transformer can include a conductive coil with first and second transformer leads. The current transformer can be configured with a central passageway through which a conductor carrying alternating current to or from the EST can pass. As an example, that conductor can be the electrical circuit 17 shown in FIG. 14 or one of the electrical circuits 31, 32, or 33 shown in FIG. 15. The first and second transformer leads can be connected to the electrical circuits within the sensor connection 59 or the sensor connection 60.

In accordance with an embodiment in which the sensor 52 or the sensor 61 includes multiple sensors, each of the multiple sensors can comprise a current transformer. Multiple conductors carrying an alternating current of a multi-phase electrical supply can pass through the passageways of coils of multiple current transformers. For instance, a first AC line circuit of a three-phase AC supply passes through a first coil of a first current transformer, a second AC line circuit of a three-phase AC supply passes through a coil of a second current transformer, and a third AC line of a three-phase AC supply passes through a coil of a third current transformer.

Figure 2:
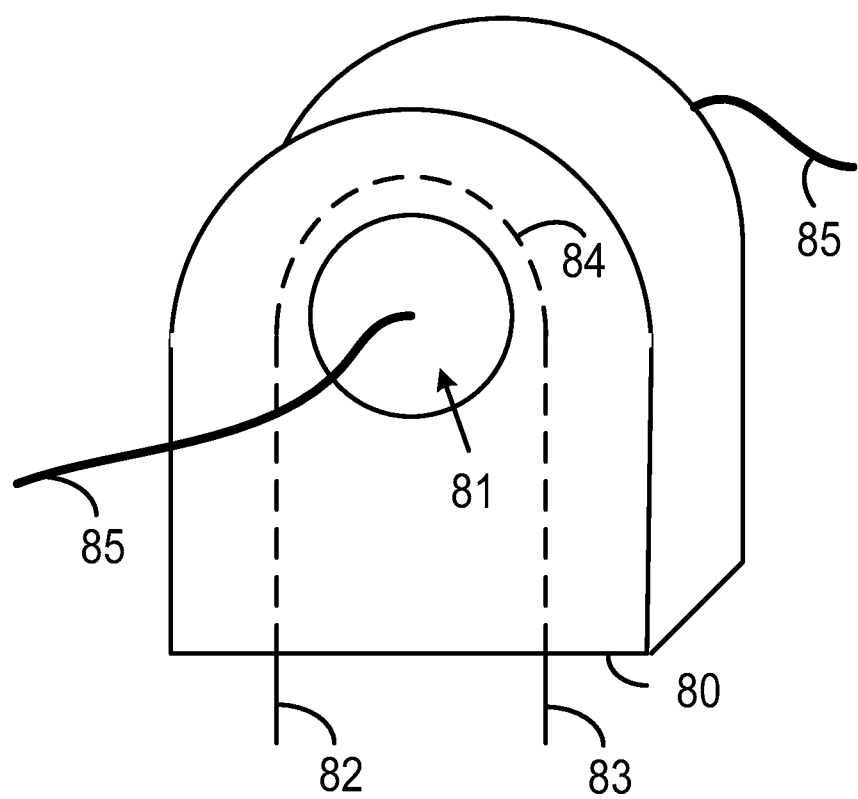
FIG. 2 illustrates an example sensor.

Next, FIG. 2 shows an example sensor 80. The sensor 80 includes a central passageway 81 through which a conductor 85 can pass. The conductor 85 can include or be configured at the electrical circuit 17 shown in FIG. 14 or one of the electrical circuits 31, 32, or 33 shown in FIG. 15. The conductor 85 can carry an AC electrical current to or from an EST. The sensor 80 can include a transformer lead 82, a transformer lead 83, and a conductive coil 84. The conductive coil 84 can wind around the central passageway 81 one or more times. The conductive coil 84 is connected to the transformer lead 82 and to the transformer lead 83. The sensor 52 and the sensor 61 can be arranged or include the sensor 80.

C. Example Processing Systems and Data

Figure 3:
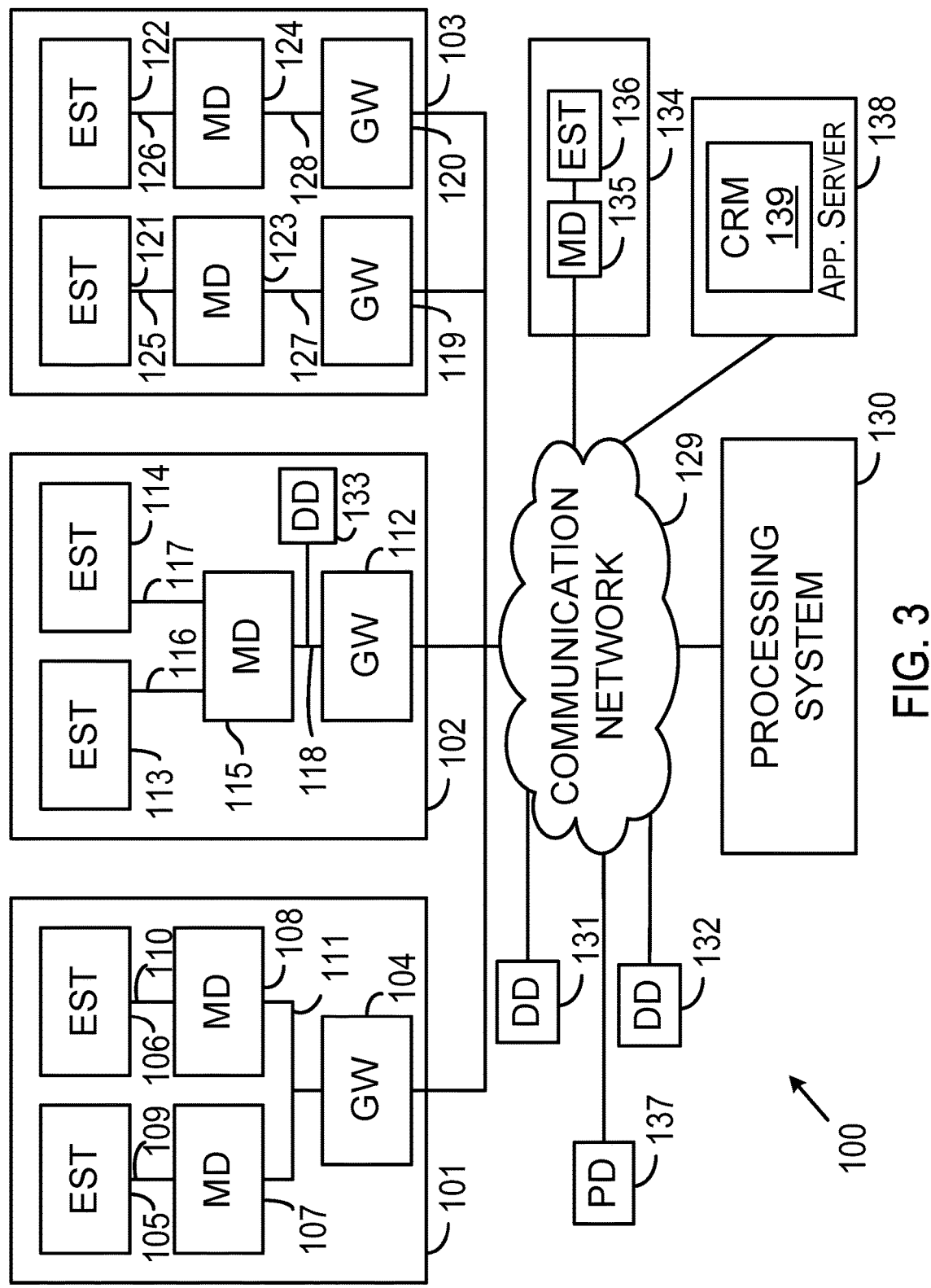
FIG. 3 is a block diagram showing components of an example system.

Next, FIG. 3 is a block diagram showing components of a system 100 in accordance with the example embodiments. The system 100 includes the PS 130. The PS 130 can receive measurement data, such as measurement data pertaining to the use of an EST. The measurement devices that transmit measurement data to the PS 130 can be located at or in one or more repair shops. FIG. 3 shows repair shops 101, 102, 103, and 134, and various ways in which an MD within a repair shop can connect to the network 129. Since an EST can comprise an MD (such as one of the MD shown in FIG. 3), FIG. 3 also illustrates various ways in which an EST within a repair shop can connect to the network 129. Each and every EST shown in FIG. 3 can include or be configured as any EST described in this description (e.g., the EST 11 shown in FIG. 14 or the EST 25 shown in FIG. 15). The PS 130 can be referred to as a "computing system."

The repair shop 101 represents an example embodiment in which a repair shop includes multiple EST connected to a respective measurement device and multiple measurement devices are connected to a common gateway to the network 129. In particular, the repair shop 101 includes a gateway 104, an EST 105, an EST 106, an MD 107, and an MD 108. The MD 107 is connected to the EST 105 and the gateway 104. The MD 108 is connected to the EST 106 and the gateway 104. Both of the MD 107 and the MD 108 can be configured like the MD 12.

A gateway, such as the gateway 104 or any other gateway discussed in this description, can comprise one or more devices for receiving data transmitted over the network 129 and for outputting (e.g., transmitting) data onto the network 129 for transmission over the network 129. A gateway, such as the gateway 104 or any other gateway discussed in this description, can comprise one or more devices for receiving data and routing the received data to another device. As an example, a gateway can include one or more of a modem, a router, a mobile hotspot, a wireless access point or a personal display device (e.g., a mobile phone or tablet device). As an example, a modem and router can be arranged as an ARRIS Touchstone TG862G/CT DOCSIS 3.0 cable modem and wireless router available from ARRIS Group, Inc. Suwanee, Ga. As an example, a mobile hotspot can comprise a MIFI® 3352 intelligent mobile hotspot available from Novatel Wireless, San Diego, Calif.

An MD and a gateway to the network 129 can be coupled together to allow the MD and the gateway to communicate with one another. The MD and the gateway can be coupled together in any of a variety of ways. As an example, the MD and the gateway can be coupled together by way of a personal area network (PAN). A PAN can couple two or more devices together by an air interface or a wire. A PAN can be configured according to any of a variety of standards, protocols, or specifications. For example, a PAN can be configured according to a universal serial bus (USB) specification 2.0, 3.0, or 3.1 developed by the USB Implementers Forum. As another example, a PAN can be configured according to an IEEE standard, such as an IEEE 802.11 standard (e.g., 802.11a, 802.11b, 802.11g, or 802.11n) or an IEEE 802.15 standard (e.g., 802.15.1, 802.15.3, 802.15.4, or 802.15.5) for wireless PAN. Personal area networks operating according to those two standards are sometimes referred to as WI-FI® network and a BLUETOOTH® network, respectively. As yet another example, communication between an MD and a gateway can be carried out over a low power wireless PAN using IPv6 packets. In that regard, the communications can be carried out according to Network Working Group, Request for Comments: 4944 (Transmission of IPv6 Packets over IEEE 802.15.4 Networks).

Figure 14:
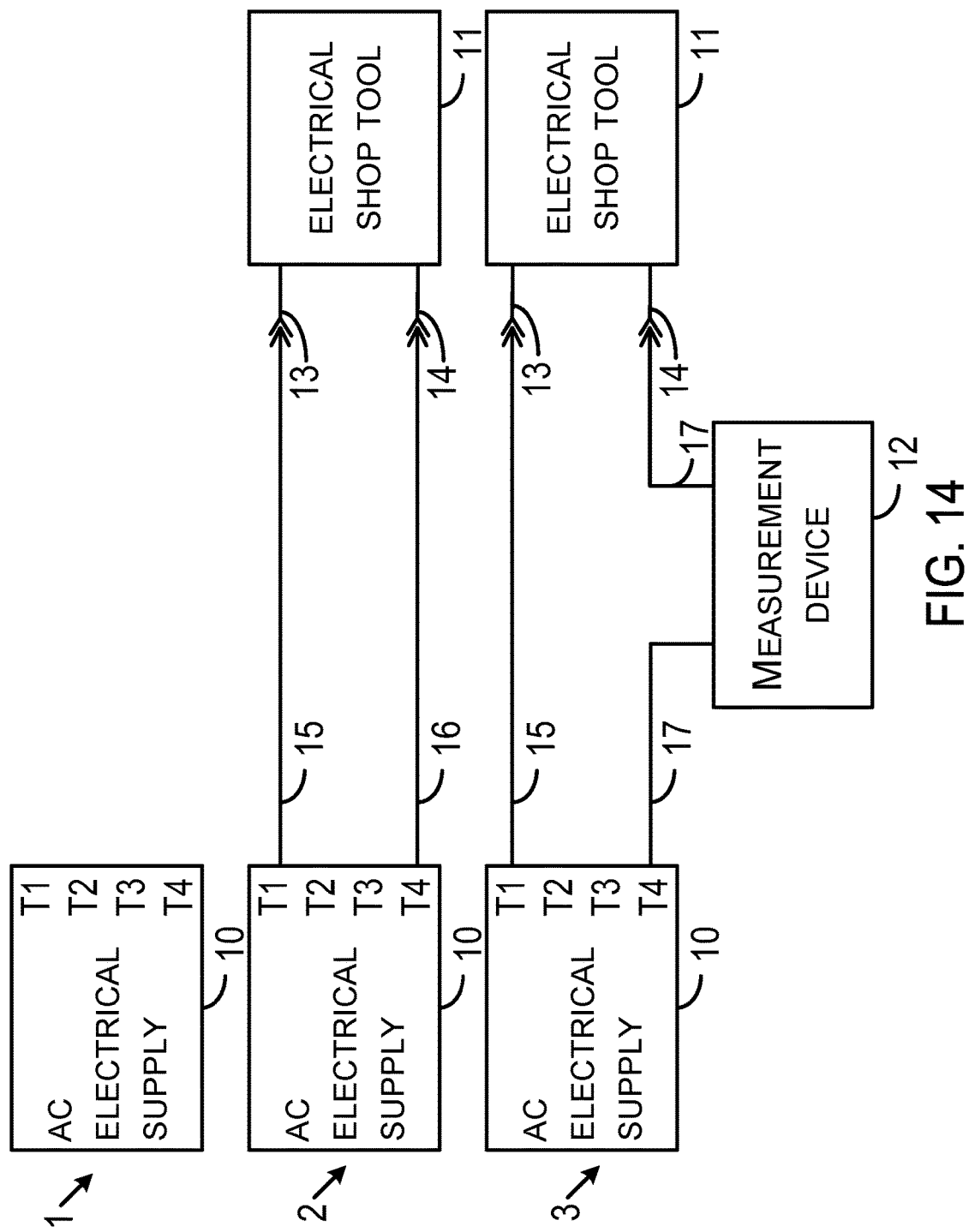
FIG. 14 shows a block diagram depicting an example AC electrical supply and example connections to the AC electrical supply.
Figure 15:
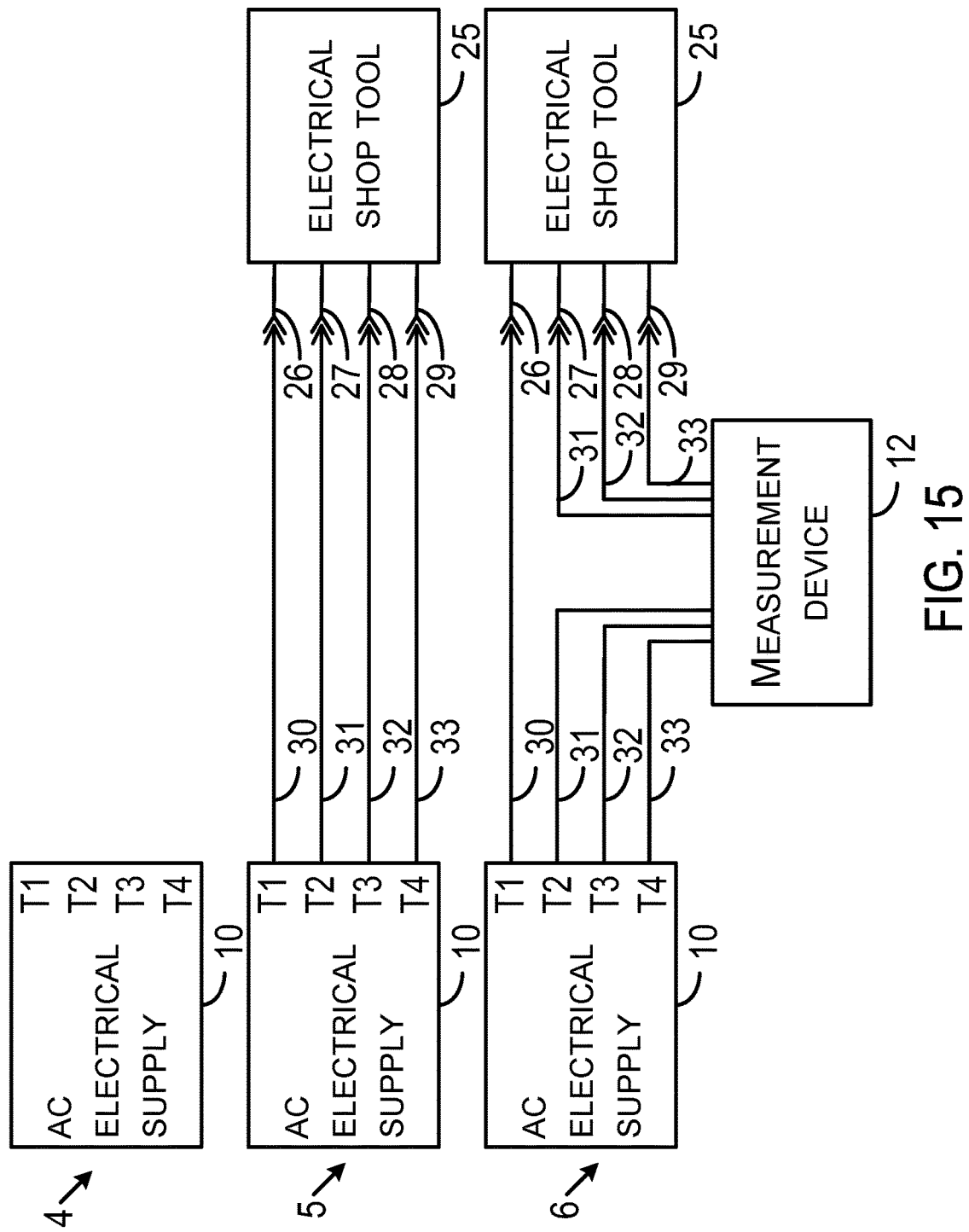
FIG. 15 shows another block diagram depicting an example AC electrical supply and example connections to the AC electrical supply.

The gateway 104 and the MD 107 and the MD 108 can be coupled together by way of a communication network 111. The communication network 111 can comprise a wireless PAN, a wired PAN, a wired local area network, a wireless area network or some other type of communication network. The MD 107 and the EST 105 can be coupled together using an electrical circuit 109 similar to the manner in which the EST 11 is connected to the MD 12 via the electrical circuit 17 (as shown in FIG. 14) or the manner in which the EST 25 is connected to the MD 12 via the electrical circuit 33 (as shown in FIG. 15). The MD 108 and the EST 106 can be coupled together using an electrical circuit 110 similar to the manner in which the EST 11 is connected to the MD 12 via the electrical circuit 17 (as shown in FIG. 14) or the manner in which the EST 25 is connected to the MD 12 via the electrical circuit 33 (as shown in FIG. 15). Other examples of how the EST 105 connects to the MD 107 and how the EST 106 connects to the MD 108 are also possible.

An MD, such as the MD 107, can request time information from a gateway, such as the gateway 104. An MD, such as the MD 107, can receive time information from a gateway, such as the gateway 104. Additionally or alternatively, an MD, such as the MD 107, can request time information from another device, such as an EST or the PS 130. An MD, such as the MD 107, can receive time information from another device, such as an EST or the PS 130.

The repair shop 102 represents an embodiment in which a repair shop includes multiple EST connected to a single measurement device and the single measurement device is connected to a single gateway to the network 129. In particular, the repair shop 102 includes a gateway 112, an EST 113, an EST 114, and an MD 115. The MD 115 is connected to the EST 113, the EST 114, and the gateway 113. The MD 115 can be configured like the MD 12.

The gateway 112 and the MD 115 can be coupled together by way of a communication network 118. The communication network 118 can comprise a wireless PAN, a wired PAN, a wired local area network, a wireless area network or some other type of communication network. The MD 115 and the EST 113 can be coupled together using an electrical circuit 116 similar to the manner in which the EST 11 is connected to the MD 12 via the electrical circuit 17 (as shown in FIG. 14) or the manner in which the EST 25 is connected to the MD 12 via the electrical circuit 33 (as shown in FIG. 15). The MD 115 and the EST 114 can be coupled together using an electrical circuit 117 similar to the manner in which the EST 11 is connected to the MD 12 via the electrical circuit 17 (as shown in FIG. 14) or the manner in which the EST 25 is connected to the MD 12 via the electrical circuit 33 (as shown in FIG. 15). Other examples of how the EST 114 connects to the MD 115 and how the EST 114 connects to the MD 115 are also possible.

The repair shop 103 represents an embodiment in which a repair shop includes multiple EST connected to a respective measurement device and multiple measurement devices are connected to a respective gateway to the network 129. In particular, the repair shop 103 includes a gateway 119, a gateway 120, an EST 121, an EST 122, an MD 123, and an MD 124. One or more of the MD 123 and the MD 124 can be configured like the MD 12.

A gateway (such as the gateway 119 or the gateway 120) can be coupled to an MD (such as the MD 123 and the MD 124, respectively) using any of a variety of wired or wireless communication networks. For example, the gateway 119 and the MD 123 can be coupled to each other by way of a communication network 127, and the gateway 120 and the MD 124 can be coupled together by way of a communication network 128. In particular, the communication network 127 and the communication network 128 can comprise a wireless PAN, a wired PAN, a wired local area network, a wireless area network or some other type of communication network.

The MD 123 and the EST 121 can be coupled together using an electrical circuit 125 similar to the manner in which the EST 11 is connected to the MD 12 via the electrical circuit 17 (as shown in FIG. 14) or the manner in which the EST 25 is connected to the MD 12 via the electrical circuit 33 (as shown in FIG. 15). The MD 124 and the EST 122 can be coupled together using an electrical circuit 126 similar to the manner in which the EST 11 is connected to the MD 12 via the electrical circuit 17 (as shown in FIG. 14) or the manner in which the EST 25 is connected to the MD 12 via the electrical circuit 33 (as shown in FIG. 10). Other examples of how the EST 121 connects to the MD 123 and how the EST 122 connects to the MD 124 are also possible.

The network 129 can comprise a wide area network (WAN). The WAN can include one or more network segments. A network segment of the WAN can carry data using at least one of a packet-switched technology or a circuit-switched technology. A network segment of the WAN can carry data wirelessly using radio signals or over one or more wired conductors, such as a coaxial cable, a CAT 5 or CAT 6 cable, or a fiber optic cable. The various network segments can be interconnected by a network device, such as a router, a relay station, a gateway or some other network device.

The system 100 can comprise a display device (DD). FIG. 3 shows a DD 131, a DD 132, and a DD 133. The DD 131, the DD 132, or the DD 133 can be registered by the PS 130 as being associated with at least one of a person (such as a person with a particular role), a repair shop, an EST, and a measurement device. A DD can be registered with one or more repair shops. A DD can be registered with one or more EST. A DD can be registered with one or more measurement devices. The PS 130 can transmit notifications onto the network 129 for delivery to a DD to which each notification is addressed. A display device can output a notification or other data audibly or haptically as an alternative or in addition to outputting the notification or other visible data on a display.

A registered DD can be deregistered. For example, the DD 133 can be registered with the repair shop 102, the EST 113, or the MD 115 because the DD 133 is owned by a person that works at the repair shop 102. At a point in time after the DD 133 is registered with the repair shop 102, the EST 113, or the MD 115, the person stops working at the repair shop 102 such that the repair shop no longer wants the DD 133 to be registered with the repair shop 102, the EST 113, or the MD 115. Another device, such as the DD 131, can communicate with the PS 130 to deregister the DD 133 so that the DD 133 is no longer registered with the repair shop 102, the EST 113, or the MD 115.

A DD, such as the DD 131, the DD 132, or the DD 133 can include or be implemented as a portion of a small-form factor portable (i.e., mobile) electronic device such as a smartphone (e.g., an IPHONE® smartphone from Apple Inc. of Cupertino, Calif., or a GALAXY S® smartphone from Samsung Electronics Co., Ltd. of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). Additionally or alternatively, a DD, such as the DD 131, the DD 132, or the DD 133, can include or be implemented as a personal computing system (including both laptop computer and non-laptop computer configurations). A DD that receives a notification from the PS 130 can output the notification via a user interface component, such as a display configured to display the notification. A DD can include an EST. An EST can include a DD. In that regard, an EST can include a display device to output the received notification(s). Furthermore, multiple DD can be grouped and associated with function groups, such as repair shop owners, equipment users, service staff, sales staff, calibration staff, etc. The actions indicated by an analysis of an EST can be routed to a group of users (e.g., the display devices of the group of users), or to an individual DD of a user that is given a DD user group associated with a particular action.

Each repair shop including an MD and EST can include a DD to receive notifications from the PS 130. The DD of the repair shop can connect to the network 129 via a gateway at the repair shop. For example, the DD 133 can connect to the network 129 via the gateway 112. The other example repair shops can also include DD that connect to the network 129 via a gateway at that repair shop.

A person having ordinary skill in the art will understand that repair shops including an EST and MD in accordance with the example embodiments can be arranged in configurations different than those shown in FIG. 3. For example, a repair shop can include only one interconnected EST, MD and gateway. That repair shop can look like the repair shop 103 without any of the gateway 120, the EST 122, the MD 124 the electrical circuit 126, and the PAN 128. As another example, a repair shop can include an arrangement like the repair shop 101 and have one or more additional MD connected to the gateway 104 and a respective EST connected to each of the one or more additional MD. As yet another example, a repair shop can include an arrangement like the repair shop 102 and have one or more EST connected to the MD 115.

Although FIG. 3 shows the MD 107, the MD 108, the MD 115, the MD 123 and the MD 124 connected to one of the gateways 104, 112, 119, and 120 via one of the communication networks 111, 118, 127, and 128, a person having ordinary skill in the art will understand that a MD can include the gateway to the network 129. For example, the transceiver 55 of the MD 12 can include a gateway to a cellular network segment of the network 129.

The repair shop 134 illustrates an example in which a repair shop does not include a gateway to the network 129 or in which an MD 135 within the repair shop 134 connects to the network 129 via a gateway (not shown) located outside of the repair shop 134. As an example, the gateway used by the MD 135 can comprise a cellular telephone network base transceiver station (BTS) within the network 129 and the transceiver within the MD 135 can communicate via the BTS using a cellular wireless communication standard. Other examples of how an MD connects to the network 129 by means other than a gateway located in a repair shop where the MD is located area also possible.

The system 100 includes a programming device 137. The programming device 137 can include a processor to execute CRPI for setting up (e.g., registering) a measurement device (e.g., the MD 12) for use with the PS 130. Those CRPI may be stored within a CRM within the programming device 137, and can comprise or be arranged as a mobile application executable by the processor and usable by a technician installing an MD within the system 100. The processor can create data to link the unique ID of the MD with an MD attribute of or associated with that MD, which the installing technician can input using the programming device when configuring the MD. The programming device can include a smartphone, a table device, a wearable computing device, a personal computing system, or some other device configured for setting up the MD 12.

Figure 25:
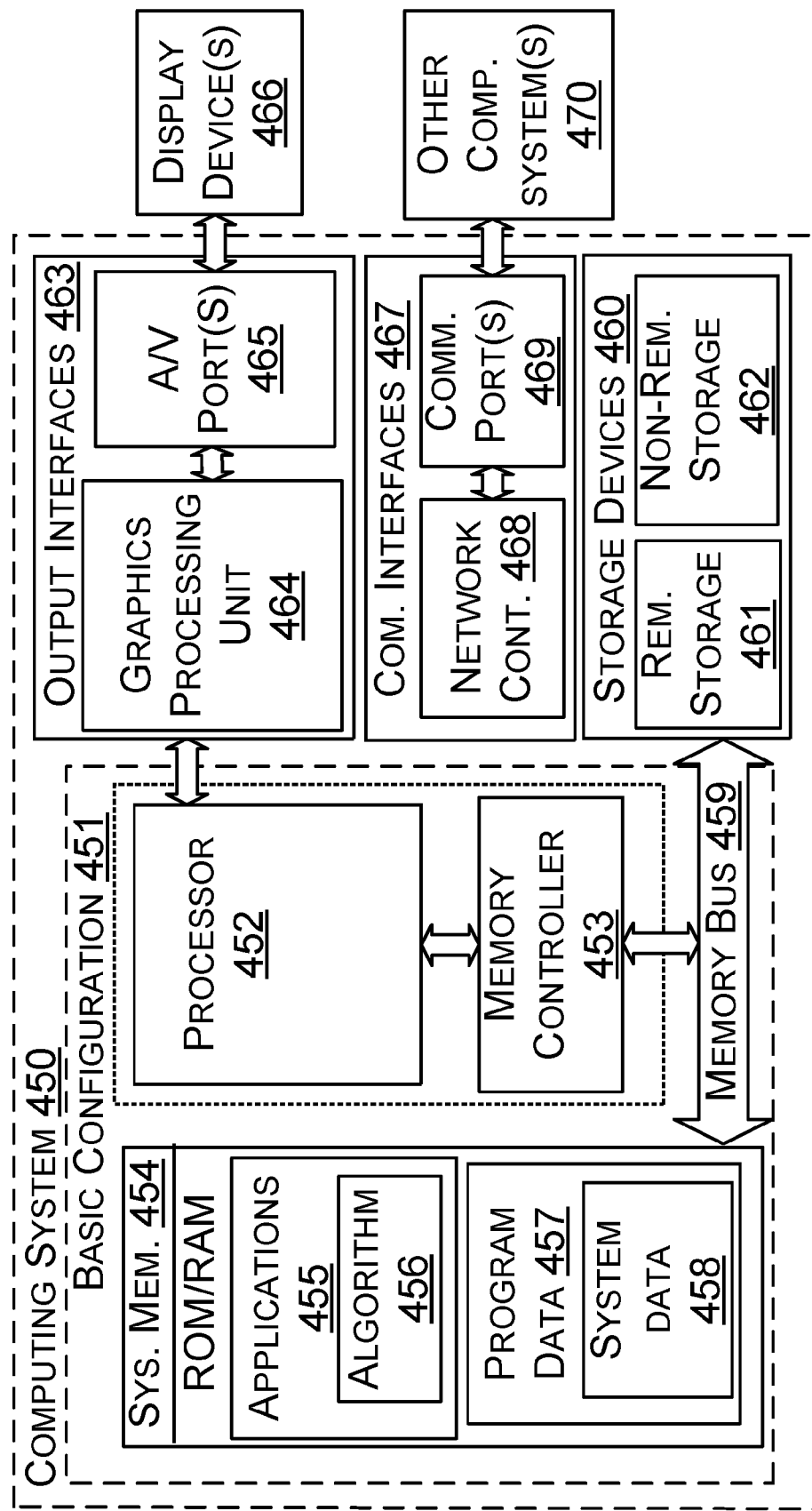
FIG. 25 is a functional block diagram illustrating a computing system that is arranged in accordance with at least some example embodiments.

The system 100 also comprises an application server 138 connected to the network 129. The application server 138 includes a CRM 139 and can comprise one or more of the components of the example computing system shown in FIG. 25. The CRM 139 can store applications executable at another computing system, such as a display device or a programming device shown in FIG. 3. The applications can be downloaded to the other computing system over the network 129.

Figure 4:
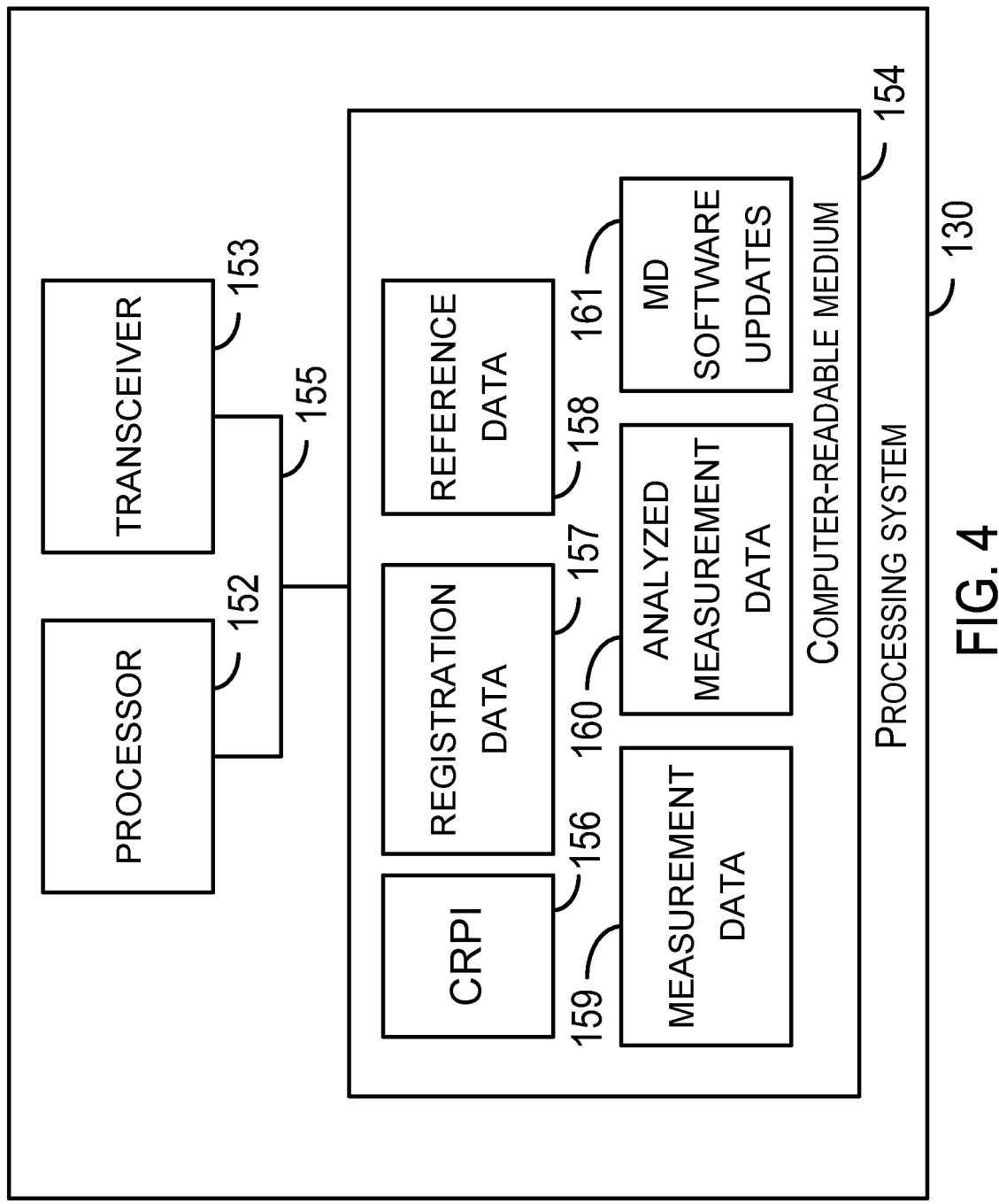
FIG. 4 is a block diagram of an example processing system.

Next. FIG. 4 is a block diagram of the PS 130. The PS 130 can comprise at least one of a processor 152, a transceiver 153, and a CRM 154. Two or more of those components can be communicatively coupled together via a system bus, network, or other connection mechanism 155. The network of the connection mechanism 155 can comprise a portion of the network 129. In that regard, the PS 130 can be implemented as a distributed hardware system. Moreover, the PS 130 can be configured as a data center within the network 129 (which can be referred to as "the cloud"). In the distributed hardware system, the processor 152 can comprise multiple processors, transceivers, or CRM 154. For example, the distributed hardware system can comprise a first processor, a first transceiver, and a first CRM at a first network connection of the network 129 and a second processor, a second transceiver, and a second CRM at a second network connection of the network 129. Other examples of the PS 130 as a distributed hardware system are also possible.

Any component of the PS 130 comprising the processor 152 can comprise a single processor or multiple processors. One or more of the multiple processors can be configured for redundancy in case another one of the processors is inoperative or busy, for example. Additionally or alternatively, the multiple processors can perform different functions, such as a first processor configured to perform functions for a particular firmware version and a second processor configured to perform functions based on different use levels.

The processor 152 can perform a variety of functions. Examples of functions the processor 152 can perform are discussed throughout this description. Those functions can be carried out by the processor 152 executing computer-readable program instructions or by a combination of hardware, firmware, or software.

The processor 152 can determine that data received by the transceiver 153 includes data for registering a measurement device. The processor 152 can cause the data determined to be registration data to be stored within the CRM 154 as registration data 157 so as to register the measurement device at the PS 130. The data for registering an MD can comprise data regarding an EST connected to the MD, such that the processor 152 can register the EST connected to the MD.

The CRM 154 can comprise at least one of CRPI 156, the registration data 157, reference data 158, measurement data 159, analyzed measurement data 160, and MD software updates 161. The measurement data 159 contains the measurement data received from one or more measurement devices (e.g., one or more measurement devices registered with the PS 130). The received measurement data can comprise measurement data that is determined by the MD and subsequently transmitted to the PS 130. The processor 152 executes the CRPI 156.

The transceiver 153 is configured to receive data (e.g., measurement data) sent over the network 129. The transceiver 153 can receive measurement data from one or more measurement devices. The measurement data received by the transceiver 153 can be provided to the CRM 154 for storage as the measurement data 159. The measurement data received by the transceiver 153 can include one or more data values representing a respective measurement made by a measurement device. The measurement data received by the transceiver 153 can include one or more time stamps. For example, each data value of the measurement data can include a separate time stamp. As another example, the measurement data can include data values ordered in a sequence in which the measurements were made and one time stamp associated with one of the data values. Time stamps for each of the other data values can be determined based on the provided time stamp and a sample rate at which measurements were made to generate the data values. As another example, the measurement data can include an array of data associated with a time period or time stamp. For instance, the measurement data can comprise an output of a Fast Fourier Transform (FFT) for a complex vibrational signal (e.g., sound) or an output of some other data compression algorithm to reduce the burden on transceiver (by reducing the quantity of data to be received) or to reduce the quantity of data to be stored in the CRM 154. Other examples of representing a time-series set of measurement data are described elsewhere herein.

The transceiver 153 is also configured to transmit data onto the network 129 for transmission to another device connected to the network 129. That other device connected to the network can be a destination for a notification. As an example, the data transmitted by the transceiver 153 can comprise a notification destined for a display device. As another example, the data transmitted by the transceiver 153 can comprise an MD software update destined for an MD including an earlier level of software.

The processor 152 can determine that data received by the transceiver 153 comprises data for registering an MD. That determination can include determining that the received data includes an MD ID, a notification ID (NID), an EST ID or an MD version ID. The processor 152 can register the MD. Registering the MD can include the processor 152 controlling the CRM 154 to store the data for registering the MD as registration data 157.

The processor 152 can determine that an MD has requested time information, determine the time information, and cause the transceiver 153 to transmit time information onto the network 129 for transmission to an MD that requested the time information. The processor 152 can cause the transceiver 153 to transmit data, such as the time information, by outputting the data to the transceiver 153. The data output to the transceiver 153 can include an address of the destination for the data. The address (e.g., an IP address) can be included or associated with an ID of a destination device (e.g., an MD ID or a NID).

The processor 152 can determine the analyzed measurement data 160 from the measurement data 159. Determining the analyzed measurement data can include the processor 152 performing an aggregate function (e.g., a sum, count, maximum, minimum, mean, median, or mode function) on the measurement data 159 pertaining to a particular EST or to multiple EST. Performing the aggregate functions results in aggregate measurements that can be stored as part of the analyzed measurement data 160. The aggregate measurements can be stored for various amounts of time, such as a short-term amount of time (e.g., for the duration of a relevant query or action) or a long-term amount of time (e.g., for being available for a subsequent query after an initial relevant query or action). The analyzed measurement data pertaining to multiple EST can comprise data indicative of a determination of data regarding two or more EST, such as a determination indicating one of the two or more EST is used significantly more or less than another of the two or more EST.

The measurement data 159 and the analyzed measurement data 160 can comprise multiple data points. Each data point, for example, can comprise an MD ID (e.g., a globally unique ID value associated with an individual MD), a date and time (e.g., a value representing a coordinated universal time (UTC), and a data value (e.g., an amperage value). For a given MD ID, multiple data points can be grouped together and sorted by date and time as a data series (e.g., a machine cycle or a job). The date and time value may be evenly or unevenly spaced. In a particular embodiment where the date and time values are unevenly spaced, the data points are updated only when the MD determines there is a change from a previous data value (e.g., an amperage). A device data stream (DDS) comprises a set of the result values.

A job is an estimate of operator interaction or logical work cycle of an EST. As an example, a job can be defined as a power cycle of the EST (e.g., the EST powers on and then powers off). As another example, a job based on current amperage to the EST can be based on the data values representing the current amperage. As yet another example, a job can be based on whether or not the current amperage to the EST exceeds a defined threshold amperage (TA) and whether a next machine cycle of the EST occurs within a time threshold (TT) defined for grouping machine cycles as a job. For the example embodiments, a job comprises a group of data points that have contiguous time and date values and may or may not include data points having a value of zero. For embodiments in which the data points represent amperage, a job may or may not include data points that represent zero amps. A processor, such as the processor 53 or 152, can group data points using the following two factors: whether or not the data value exceeds a minimum data value threshold, and whether or not an amount of time elapsed since a data value exceeded the minimum value exceeds a time threshold (TT). The minimum threshold value can equal zero or can be greater than zero. For data point representing amperage, the minimum threshold value can be referred to as a TA. A job can comprise data points having a value of zero. If the elapsed time between (i) a time when a prior data point exceeded the minimum data value threshold and (ii) a next data point that exceeded the minimum data value threshold is greater than the TT, then the next data point is not part of an earlier job. On the other hand, if the elapsed time between (i) a time when a prior data point exceeded the minimum data value threshold and (ii) a next data point that exceeded the minimum data value threshold is less than the TT, then the next data point can be part of an earlier job.

For some embodiments in which the MD measures amperage with respect to an EST, the TA can be used for embodiments in which the EST uses power in small amounts regardless of whether a technician is present and performing work with the EST. Since the determination of a job is essentially to estimate worker/EST interaction periods, it may be preferable to not report data pertaining to times the EST was idle with only minimum amperage.

As an example, an aggregate measurement can include a count of transitions from "off" to "on" during a given time period (e.g., a predetermined amount of time) for a particular EST. As an example, the processor 152 can determine a transition from "off" to "on" by determining that a data value within a stream of data stored in the measurement data 159 is above a first threshold value and follows (i.e., occurring after) data values within the stream of data that are below a second threshold value less than the first threshold value or at least less than the first threshold value. As an example, the first threshold value could be a value greater than zero and the second threshold could be zero.

As another example, an aggregate measurement can include a "total time on" value indicating an amount of time pertaining to an EST. In particular, the "total time on" value can represent an amount of time represented by data values within the stream of data that are above the first threshold value. The amount of time pertaining to an EST can be associated with an amount of time (e.g., an amount of time since the MD associated with the EST was registered by the processing system, an amount of time since the MD associated with the EST was last serviced). The total time on for an EST including an electrical motor or pump can indicate how long the electrical motor or pump was on during the identified amount of time.

The processor 152 can compare the aggregate measurements (e.g., aggregate measurements determined by the processor 152) with respect to some variable or attribute (e.g., time, current, or EST use positions). The processor 152 can contrast the results of comparing the aggregated measurements to determine correlation(s) or relationship(s) between two or more aggregated measurements so as to determine variation(s) or trend(s) in the aggregated measurements.

The processor 152 can perform a pattern content analysis. Performing the pattern content analysis can include the processor 152 analyzing data received from an MD to determine a basic use pattern of an EST indicated by the analyzed data or a specific job pattern indicated by the analyzed data. Four examples of pattern content are discussed below.

(1) First Example of Pattern Content Analysis:

For measurement data received from an MD connected to an EST arranged as or including a vehicle lift, the processor 152 can analyze data values representing an amperage of current flow to a motor of the vehicle lift as the motor is started (e.g., a large in-rush current), amperage of current flow to the motor as the vehicle lift raises the vehicle lift arms without any load on the lift arms (e.g., a relatively low amperage), amperage of current flow to the motor as the vehicle lift arms engage a vehicle (e.g., an increased amperage with respect to the relatively low amperage), and amperage of current flow to the motor when the vehicle lift stops being raised. The various positions of a vehicle lift are examples of EST use positions. Other examples of basic use positons defined for a vehicle lift and other examples of basic use patterns of other EST having an electrical component, such as an electrical motor or pump, are also possible.

(2) Second Example of Pattern Content Analysis:

For measurement data received from an MD connected to an EST arranged as or including a tire balancer, the processor 152 can analyze data values representing use of the tire balancer. For instance, data values indicating two short use periods in rapid succession (e.g., within 20 to 60 seconds of one another) can indicate a first spin of the tire balancer to measure imbalance of a tire and wheel, and a second spin of the tire balancer to check whether the tire and wheel are balanced after one or more wheel weights have been attached to the wheel. Those two instances of using the tire balancer can be grouped together to indicate a single job (e.g., a single instance of balancing a tire and wheel).

(3) Third Example of Pattern Content Analysis:

For measurement data received from an MD connected to an EST arranged as or including a brake lathe, the processor 152 can analyze data values representing use of the brake lathe. For instance, a short period of no current flow to the brake lathe (e.g., an off period of 15 to 45 seconds) between two long periods of current flow to the brake lathe (e.g., on periods of at least 90 seconds) to determine that one brake component has been machined by the lathe. The off period can allow a user of the brake lathe to apply an accessory brake silencer after a depth cut has been set. Those two on periods and an intermediate off period can be grouped together to indicate a single job (e.g., a single instance of machining a brake component).

(4) Fourth Example of Pattern Content Analysis:

For measurement data received from an MD connected to an EST arranged as or including a vehicle lift, the processor 152 can analyze data values representing use of the vehicle lift. For instance, a long period of vehicle lift usage (e.g., 10 seconds) followed by a short period of non-use of the vehicle lift (e.g., 3 seconds) followed by a short period of vehicle lift usage (e.g., 1 second) can indicate the vehicle lift was raised to a first height and then adjusted to a second height. Those two period of vehicle lift usage and the short period of non-use can be grouped together to indicate a single job (e.g., a single instance of raising a vehicle on the vehicle lift). The processor 152 can perform an aggregate function (e.g., a count) to determine a total number of single jobs (e.g., balancing a tire and wheel, machining a brake component, or raising a vehicle) performed by the EST for a given time period or during a given amount of time.

The processor 152 can analyze a single data stream of measurement data received from a single MD. The processor 152 can determine an average use of an EST for a particular time period based on the single data stream.

The processor 152 can perform a comparative analysis or a multivariate analysis. Performing the comparative analysis or the multivariate analysis can include the processor 152 comparing and contrasting two or more data values from two or more data streams from one or more measurement devices. The processor 152 can detect correlation or causation between multiple variables within the data streams. As an example, results of a comparative analysis of data streams from an MD connected to a vehicle lift can show that an amperage of current flow to a motor of the vehicle lift when the vehicle lift arms were being raised without a vehicle load has increased from a first measurement time period to a second measurement time period. The increased current flow could indicate that there is a lack of lubrication in the vehicle lift that results in the increased current flow. Three examples of comparative analysis or a multivariate analysis are discussed below.

(1) First Example of Comparative Analysis or a Multivariate Analysis

The processor 152 can compare actual user patterns, time or pattern content to expected values of the patterns. The processor 152 can determine a deviation between the compared patterns. A deviation from the expected values could indicate extreme use of the EST associated with the measurement data. A notification including an indication of the extreme use could be sent to a DD, such as a DD associated with an owner of the over-used EST or a DD associated with a sales person that services the repair shop where the over-used EST is located. A deviation from the expected values could indicate the lack of using the EST. A notification including an indication of the under-use of an EST could be sent to a DD, such as a DD associated with an owner of the under-used EST or a DD associated with a sales person that services the repair shop where the under-used EST is located. A deviation from the expected values could be used to set an expected equipment life for an EST. A notification including an expected equipment life value could be sent to a DD associated with the EST, such as a DD associated with an owner of the DD or a DD associated with a sales person that services the repair shop where the EST is located.

(2) Second Example of Comparative Analysis or a Multivariate Analysis

The processor 152 can compare use patterns of an EST connected to an MD providing measurement data to the PS 130 to determine that a business where the EST is located is closed on a particular day of the week (e.g., Sunday) or a particular time of day (e.g., 8:00 PM to 6:00 AM) because the measurement data for the particular day or the particular time of day represents that the EST is not used. This comparison can be carried out for a calendar period including multiple instances of the particular data of the week or the particular time of day.

(3) Third Example of Comparative Analysis or a Multivariate Analysis

The processor 152 can compare use patterns of an EST to determine a decrease in the average use of the EST on a particular day of the week (e.g., Thursdays). The processor 152 can cause the transceiver 153 to send a notification to a DD associated with that EST or the MD connected to that EST indicating the use pattern or including a suggestion. As an example, the suggestion can indicate that the particular day of the week is a day to carry out a sale or discount on services at the repair shop where the EST is located.

The processor 152 can perform a time series analysis based in part on one or more of the example aggregate functions. The time series analysis may include a statistical method such as a two-sided test versus a one-sided test, an F-test, a t-Test, a linear correlation and regression, an analysis of variance (ANOVA), or another statistical method. Furthermore, the processor 152 can perform these time series analyses based on data provided from one MD or from multiple MD.

The processor 152 can determine existence of a condition that is defined to cause a notification to be sent to a display device. At least some of the conditions are based on the measurement data or measurement calculations pertaining to a measurement device associated with the display device. The processor 152 can provide the notification to the transceiver 153 to cause transmission of the notification. The processor 152 can determine a destination for the notification by referring to the registration data 157.

The processor 152 can determine that updated software is available for an MD. Making that determination can include the processor 152 comparing a software level for the MD stored in the registration data 157 to the software level recently added to the MD software updates 161. The processor 152 can cause the updated software to be provided to the transceiver 153 so as to cause the transceiver 153 to transmit the software update to the MD over the network 129.

D. Example Data

The CRM 154 can comprise data the processor 152 uses to determine aspects pertaining to generating or sending a notification. These aspects can include a person ID, a name of a person, a role associated with a person, a destination identifier (e.g., an e-mail address, an SMS (text) number, or an account handle, etc.) for the notification, the MD or EST associated with the person, a notification threshold (e.g., frequency threshold or urgency threshold) established for the person, a brand, type or model of the EST, or some other preference registered for the person. Determining what MD is associated with the person can be based on a location ID or a territory ID associated with the person. The role associated with a person can be that of a sales person, a service technician, a sales manager, a service manager, a shop owner, a shop manager, a shop technician, or some other role pertaining to the system 100. For this description, a service technician is a person that typically services an MD or an EST at different repair shops, and a shop technician is a person that typically uses an EST to service vehicles at a repair shop.

FIG. 5 shows an example of data the processor 152 can use to determine the aspects pertaining to sending a notification. The types of data shown in FIG. 5 can be stored as or as part of the registration data 157 or some other data within the CRM 154. In FIG. 5, each of the first six rows below the underlined column headers represents registration data for measurement devices (MDs) associated with an MD ID 1, 2, 3, 4, 5, and 6, respectively. The next four rows represent registration data for an MD associated with an MD ID 7. The registration data 157 may include registration data for a different number of MDs.

As shown in FIG. 5, the registration data for each registered MD can include at least one of an MD ID, an EST identifier (EST ID), a MD version ID, a location ID, a territory ID, and a person ID (PID). The example embodiments include embodiments in which the registration data for an MD includes a subset of the identifiers shown in a single row in FIG. 5. For example, the registration data for an MD can include an MD ID, and the EST ID, the MD version ID, the location ID, the territory ID or the PID. As another example, the registration data for an MD can include an MD ID, and two or more EST ID for two or more EST that provide data to the MD identified by the MD ID. That example registration data may or may not include an MD version ID.

The MD ID associated with each MD can be unique with respect to every other MD ID registered by the PS 130. The MD ID can comprise a globally unique string of characters (e.g., alpha-numeric characters). The MD ID can be a permanent ID for the MD.

The EST ID can be unique with respect to a group of similar EST, such as a group of EST associated with an identical model identifier. The EST ID can be a permanent ID for the EST. In an alternative embodiment, the EST ID associated with each EST can be unique with respect to every other EST ID registered by the PS 130, such as a serial number associated with the EST.

The MD version ID can be indicative of a hardware level or software level associated with the registered MD. FIG. 5 shows those levels by an H term and an S term, respectively. The H term (e.g., H1) in the MD version ID can represent a hardware level, a release date, or a build date, or a serial number associated with the MD. The S term (e.g., S4) in the MD version ID can represent a software level or a release date of the software associated with the MD. For purposes of this description, the number in a hardware or software version increases each time a new version becomes available although other ways to represent new versions can also be used.

The location ID comprises data representing a location. The location ID and the location can be associated with an MD, an EST, or a person. For example, the associated location ID or location can indicate where an MD or EST is located or registered as being installed or where a person works. The location ID can represent a location in any of a variety of ways. For example, the location can be represented using any of the following types of location identifiers: a latitude and longitude, an address (e.g., a street number and a street name), geopolitical identifier (e.g., a country, a state or a province, a county, a city, or a postal or zip code), a GOOGLE® Place ID that is associated with a location shown on a GOOGLE® map, or a location area identifier (e.g., a polygon outlining a location on a map). The location ID can comprise data representing a business name. For simplicity, FIG. 5 shows the location ID data with the prefix "L" followed by a whole number, such as "L1."

The territory ID comprises data representing a territory. The territory ID or territory can pertain to an area of Earth that comprises a group of locations represented by a location ID. A territory or group of locations can comprise geopolitical data groups, such as a postal or zip code or multiple postal or zip codes. A territory ID or territory can be defined for a person that sells or services an MD or an EST. A territory can be associated with an EST brand. For example, a territory represented by a territory ID can be associated with the ACME EST brand shown in the figures. A territory can be associated with an EST model. For example, a territory represented by a territory ID can be associated with the example Pro-Lift 778 vehicle lift model. A territory can be associated with a type of EST. For example, a territory can be associated with the example EST type referred to as brake lathe. For simplicity, FIG. 5 shows the territory ID data with the prefix "T" followed by a whole number, such as "T1."

A person ID is a unique identifier associated with a person registered with the processing system to receive notifications. For simplicity, FIG. 5 shows each person ID as a whole number. The person ID can be mapped to other datum, such as any of the datum shown in FIG. 11 and FIG. 12.

Next, FIG. 6 shows example reference data 165 that can be stored as part of the reference data 158. The reference data 165 comprises data mapped to EST ID for eleven EST registered by the PS 130. The reference data 165 comprises data mapping hardware levels of an MD to software levels of an MD. The reference data 165 can include data mapped to a different number of EST ID or a different number of hardware and software levels of an MD than shown in FIG. 6.

The PS 130 can determine what type of EST is associated with the measurements provided by the MD by referring to the EST ID associated with a registered MD within the registration data 157 and then referring to the reference data 158 to determine the type, brand, model ID, current hardware level available for the EST, and the current software level available for the EST. For example, the PS 130 can determine the measurement data for an EST having an EST ID of AA56 pertains to an EST known as a vehicle lift, and that has a model number Pro-Lift 778 and a brand name ACME.

The reference data 158 can comprise other data regarding an EST. For example, the reference data can comprise a serial number associated with an EST, an operating voltage (e.g., 120 VAC) of the EST, an electrical frequency (e.g., 60 Hz) of the EST, a normal amperage value for the EST, a maximum amperage value for the EST, an installation date indicating when the EST was installed at its current location, a service date indicating the last date on which the EST was serviced, a sales person visit date indicating the last date on which a sales person visited a shop where the EST is installed, a warranty start date, a warranty end date, a warranty time period, or job definition values. As an example, the job definition values can comprise a TA, a TT, or an MJT. The processor 152 can refer to the reference data 158 to determine parameters to aggregate with a notification template, such as a notification template shown in FIG. 10.

The processor 152 can determine whether a software update is available for a registered MD. The MD version ID shown in FIG. 5 indicates hardware and software levels of a registered MD such as the MD with the MD ID 1. The reference data 165 comprises data 166 indicating the latest software levels for the hardware level of the MD. For example, as shown in FIG. 5, the software level for the MD associated with the MD ID 1 having hardware level H1 is S1, and as shown in FIG. 6, the latest software level available for the same version of hardware H1 is S4. In response to determining a software update is available for an MD, the processor 152 can generate a notification and transmit a notification to a service technician or salesman that can reprogram the MD. That notification can be generated using a notification template, such as the notification template associated with notification ID 23 shown in FIG. 10.

Next, FIG. 7 shows example measurement data 90 and 190 in accordance with the example embodiments. Each row of the measurement data 90 pertains to a different time period (e.g., a time period extending from a start time till an end time). Each row of the measurement data 190 pertains to different instance of time. An MD or two more MDs can transmit measurement data that pertains to the same time period or the same instance of time. The measurement data that pertains to the same time period or same instance of time can comprise measurement data for multiple electrical shop tools connected to the MD.

The data in each row of the measurement data 90 and the data in each row of the measurement data 190 can be (i) transmitted to the PS 130 over the network 129 from an MD, (ii) received by the PS 130, and (iii) stored as part of the measurement data 159. The MD 12 can transmit one or more rows of the measurement data 90 or 190 simultaneously.

The measurement data 90 includes MD ID data 91, date data 92, start time data 93, end time data 94, and data values 95. The measurement data 72 for an MD can include the date data 92, the start time data 93, the end time data 94, and the data values 95. The MD 12 can add the MD ID data 91 (e.g., "1") to a stream of data including the date data 92, the start time data 93, the end time data 94, or the data values 95 so that the PS 130 can determine which measurement device transmitted each row of the measurement data 90. The measurement data 159 stored by the PS 130 can include the MD ID data 91, the date data 92, the start time data 93, the end time data 94, or the data values 95. The PS 130 can determine whether the MD that transmitted the measurement data 90 is online or offline (e.g., connected or not connected to the network 129) and store the online status data 96 regarding the measurement device that transmitted the measurement data 90, and the measurement data 90 as measurement and online status data 97. The data value for a particular time period can be set to "null" or "0" or some other value when the online status for that particular time period is offline.

The date data 92 can include data indicating one or more dates. For example, the date can include a first date on which the start time in the start time data 93 occurred and a second date on which the end time in the end time date 94 occurred. For an occurrence, in which the start time and the end time occurred on the same date, information indicating a single date can be stored to represent both the first date and the second date. The dashed lines for the end time and data value in the bottom row of the measurement data 90 can indicate that a value has not yet been received or that the measurement device associated with MD ID 1 is offline as represented by the online status data 96 for that bottom row. Multiple dates are useful where the measurement period end time falls on a date different than the date on which the measurement time period began. Furthermore, the date can include time zone information, or it may be unified date such as a UTC date.

The online status data 96 can be stored with or separately from the measurement data 159. A transmission of online status data to the PS 130 can be accompanied by the MD ID 74 (e.g., the unique ID), date information, time information, and the data values.

The measurement data 190 includes MD ID data 191, date data 192, time data 193, and data values 195. The measurement data 72 for an MD can include the date data 192, the time data 193, and the data values 195. The MD 12 can add the MD ID data 191 (e.g., "2") to a stream of data including the date data 192, the time data 193, or the data values 195 so that the PS 130 can determine which measurement device transmitted each row of the measurement data 190. The measurement data 159 stored by the PS 130 can include the MD ID data 191, the date data 192, the time data 193, or the data values 195. The PS 130 can determine whether the MD that transmitted the measurement data 190 is online or offline (e.g., connected or not connected to the network 129) and store the online status data 196 regarding the MD that transmitted the measurement data 190, and the measurement data 190 as measurement and online status data 197. The data value for a particular instance of time can be set to "null" or "0" or some other value when the online status for that particular instance of time is offline.

The date data 192 can include data indicating one or more dates. Each date of the date data 192 indicates the date on which the time in the time data 193 occurred. The dashed lines for the time and data value in the bottom row of the measurement data 190 can indicate that a value has not yet been received or that the measurement device associated with MD ID 2 is offline as represented by the online status data 196 for that bottom row. The date can include time zone information, or it may be unified date such as a UTC date.

The online status data 196 can be stored with or separately from the measurement data. A transmission of online status data to the PS 130 can be accompanied by the MD ID 74 (e.g., the unique ID), date information, time information, and the data values.

Next, FIG. 8 depicts graphs 500 and 520 indicative of data points grouped as machine cycles or jobs. A data point can exist at each end of a horizontal line segment within a graph. For graph 500, the threshold amperage is greater than zero and the time threshold 508 is greater is zero, whereas for graph 520, the TA is zero and the TT is zero.

Graph 500 shows machine cycles 501, 502, 503, 504, 505, and 506. Each of those cycles begins when the measured amperage exceeds the TA and ends when the measured amperage does not exceed the TA. Machine cycles 501 and 502 are grouped as job 507 as amount of time 511 between machine cycles 501 and 502 is less than the TT 509. Machine cycles 503, 504, 504, and 506 are grouped as job 508 since amounts of time 512, 513, and 514 between machine cycles 503 and 504, 504 and 505, and 505 and 506, respectively do not exceed the TT 509. The job 507 does not include any machine cycles after machine cycle 502 since the amount of time 510 between the end of machine cycle 502 and the start of machine cycle 503 exceeds the TT 509.

Graph 520 shows machine cycles 521, 522, and 523. Each of the machine cycles 521, 522, and 523 starts when current usage by the EST is above zero amperes and ends when current usage by the EST returns to zero amperes. Each of the machine cycles 521, 522, and 523 is a separate job. The machine cycles 521, 522, and 523 can be machine cycles of an air compressor as air compressors typically use zero amperes of current when the air compressor is off.

A usage cycle time for each type of EST typically has a different pattern. For example a vehicle lift may have a short "on" period when the shop technician moves lifts arms of the vehicle lift upward and then checks the lift pad positioning relative to the vehicle frame, and then a longer "on" period in order to lift the vehicle off of the ground to a desired working height. A brake lathe, however, may have an initial period where its motor is run to adjust the lathe to the vehicle having brake components to be machined, and then a short "off" period where the shop technician places a chip deflector or silencer, and then turn the lathe "on" to machine the brake component. As another example, an air compressor turns "on" when the pressure of air in its storage tank is below a low pressure threshold and turns "off" when the pressure of air in its storage tank reaches a high pressure threshold. The usage cycle time the air compressor can take into account whether shop technicians are using pneumatic tools while the air compressor is on.

In the brake lathe example, if the TT is set to an amount of time longer than an expected "off" time between different wheels on a vehicle, but shorter than an amount of time expected to move the lathe from a first vehicle to a second vehicle, then the job would pertain to a single vehicle. If the TT is set to an amount of time less than the expected "off" time between different wheels on the vehicle, then the job would pertain to machining a brake component at a first wheel position.

The PS 130 can generate and store data regarding jobs in the analyzed measurement data 160, for example. Each job (also known as a job history) can comprise data regarding the EST associated with the MD that measured current usage by the EST. In one respect, the job can be based on values for a type of EST. In that respect, the data regarding the EST can comprise an EST type, the TA and TT values for the EST type, and a minimum job time (MJT) value for the EST type. In another respect, the job can be based on values for a particular EST model. In that respect, the data regarding the EST can comprise an EST model, the TA and TT values for the EST model, and the MJT value for the EST model.

Next, FIG. 9 is a table of mapped data 540 the processor 152 can use to determine which notification is applicable to sending in response to determining occurrence of an actionable condition. The reference data 158 or another part of the CRM 154 (such as the CRPI 156) can store or include mapped data that the processor 152 can use to determine the applicable notification. The mapped data 540 includes notification ID 1 to 25. The notification ID 1 to 10 pertain to a first EST referred to as an Acme brand Pro-Lift 778 vehicle lift, seven different conditions, and four different roles. The notification ID 11 to 20 pertain to a second EST referred to as a Brake-cut brand brake lathe model number 45899, seven different conditions, and four different roles. The notification ID 21, 23, 24, and 25 pertain to any type of EST, any EST brand, and any EST model. The notification ID 22 pertains to a third EST referred to as an A1 Tools brand air compressor model number 7784S.

An MD can be configured to be connected to a first EST and later disconnected from the first EST and connected to a second EST. The PS 130 can store data in the CRM 154 that is indicative of a start date indicating when the MD is registered with the first EST and an end date indicating when the MD is deregistered (e.g., no longer registered with the first EST) with respect to the first EST. The MD may no longer be registered with the first EST on the start date indicating when the MD is registered with the second EST. The end date for the MD can be a null value if the MD is still registered with the second EST.

A job the processor 152 determines from the measurement data can be stored in the analyzed measurement data 160. A job stored in the analyzed measurement data 160 can comprise an MD ID, a start date or time, an end date or time, a time on during the job, a time off during the job, and amperage summary statistics (e.g., a sum value, a mean value, a minimum value, a maximum value, etc.).

The processor 152 can evaluate and summarize the jobs based on measurements by a single MD and based on comparisons with jobs based on measurements by one more other MD. As an example, the job summaries can indicate a percentage of an hour, day, week, or month that an EST is active with jobs versus the EST being inactive. As another example, the job summaries can comprise a comparison of the usage of an EST versus the average usage of a similar EST in the same repair shop, or a similar EST used in a different repair shop, or compared to similar EST in a group of other repair shops. As yet another example, the job summaries can comprise a comparison of jobs performed by an EST during a recent time period to jobs performed by the EST during prior time periods of similar duration to indicate whether usage of the EST has increased or decreased. As yet another example, the job summaries can comprise an indication that usage of the EST for a given time period is zero. A notification indicating no usage of the EST can lead to an inference that the EST is broken or the employees at the repair shop require training, for example. As yet another example, the job summaries can comprise an indication that one model of an EST type at a repair shop is used more frequently than another model of the same EST type at the repair shop. As still yet another example, the job summaries can comprise an indication of usage of an EST for a given time period, such as a week, month or year.

The processor 152 can summarize jobs for a particular EST and compare the job summary to data representing a condition (or more simply "condition data" or a "rule"). The condition (i.e., a rule) can be stored as part of the reference data 158 or in another part of the CRM 154. The condition data can comprise a threshold, such as a life expectancy threshold or a service interval threshold. The threshold can indicate an amount of time or a count of a number uses, for example. The condition data can be common to all EST having the same model number, or the same model number and the same hardware or software level.

Alternatively, the condition data can be unique to different instances of EST having the same model number, or the same model number and the same hardware or software level. In this alternative approach, a first user, such as the owner of a first EST, can select a service interval different than a service interval selected by a second user for a second EST similar to first EST (e.g., the same type of EST). For instance, the service interval selected by the first user can be 1,000 hours and the service interval selected by the second user can be 2,000 hours. As another example, the service interval selected by the first user can be 2,000 jobs performed by the EST and the service interval selected by the second user can be 1,000 jobs performed by the EST.

Other examples of the condition data include a minimum value, a maximum value, a mean value, a count, or a diagnostic trouble code. The condition data can be a value in proximity to some other condition data value, such as 90% of the life expectancy condition data value defined for an EST, or 85% of the service interval condition data value defined for an EST.

Next, FIG. 10 is a table of mapped data 541 including example notification templates mapped to example notification ID numbered 1 to 25. In response to determining occurrence of a condition, the processor 152 can search the mapping data 541 to determine a notification mapped to the condition that occurred or exists. The notification ID 23 pertains to a notification indicating a software update is available for an MD.

FIG. 10 shows that a notification template, such as the notification template associated with notification ID 1, can comprise a gap for insertion of a parameter. The gap is represented by square brackets (i.e., "[ ]"). The parameter is represented by the prefix "P" followed by a whole number. The gap and parameter is one way in which the processor 152 can customize a notification. FIG. 10 also shows that a notification template, such as the notification template associated with notification ID 7, can comprise a complete notification without parameter gaps for customizing the notification.

Examples of the parameters shown in FIG. 10 include the following: [P1]=determined percentage of amount of life of EST used to date; [P2]=most recent date sales person visited repair shop; [P3]=most recent date sales EST was serviced; [P4]=name of person at repair shop; [P5]=name of repair shop; [P6]=name of service technician; [P7]=telephone number; [P8]=most recent date EST was used; [P9]=quantity of jobs; [P10]=time period during which quantity of jobs occurred; [P11]=determined percentage in change of jobs performed with respect to a prior time period; [P12]=EST type, and [P13]=time at which MD determined to be offline. Other examples of a notification ID, a notification template, other data mapped to a notification template, or parameters insertable into a notification template are possible.

Next, FIG. 11 is a table of mapped data 542. The mapped data 542 include datum mapped to various person IDs. Each person ID can be mapped to data regarding a person registered to receive a notification from the PS 130. The person ID can be unique to each registered person even if two registered persons have the same name. For simplicity in the drawings, each person ID is shown as a unique whole number. Other examples of a unique person ID are also possible.

As shown in FIG. 11, each person ID can be mapped to one or more of a person's name, a person's role, a location ID, a territory ID, a brand, an EST type, and an EST model. The name datum is indicative of a person associated with the person ID. The processor 152 can refer to the name datum to customize a notification. The role datum is indicative of a person's job or position. The processor 152 can use the role data to determine whether a person is to receive a notification for a particular actionable condition or what notification is to be sent for the particular actionable condition. For example, the processor 152 can determine that a person acting in a sales person role is to receive a notification indicating an EST has not been used enough such that training on how to use the EST may be necessary. As another example, the processor 152 can determine that a person acting in a service technician role is to receive a notification indicating that the EST experienced more than a threshold amount of use such that servicing of the EST is recommended.

The location ID datum is indicative of a location, such as a location at which the person works, a location at which the shop owner's business is located, or a location at which an MD or EST associated with the person is located. The territory ID datum is indicative of a territory associated with a person, such as a sales person or service technician. Examples formats of a location ID and a territory ID are described in other parts of this application.

The brand datum is indicative of a brand of an EST associated with a person. Example brands are shown in FIG. 6, FIG. 9, and FIG. 11. A brand can be indicative of a manufacturer of the EST. The EST type is indicative of a type of EST associated with the person. The EST model is indicative of a particular EST model associated with a person. A person can be associated with an EST type based on the person being trained or certified to operate an EST, or to sell or service the EST indicated by the EST type. A person can be associated with a brand or EST model based on the person being trained or certified to operate that brand or model of the EST, or to sell or service that brand or model of the EST.

Next, FIG. 12 is a table of mapped data 543. The mapped data 543 include datum mapped to various person IDs. The person IDs in FIG. 12 correspond to the matching person IDs shown in FIG. 11. As shown in FIG. 12, each person ID can be mapped to one or more of a notification hierarchy, a destination ID, a notification ID, a maximum notification per period, a time period, and a notification count. A person identified by a person ID can generate or be provided with a user ID and password to select or modify a personal setting for that person, such as any of the parameters shown in FIG. 12.

A notification hierarchy can indicate an order of a type of notification to send to a destination. As an example, the types of notification can comprise a SMS message, an e-mail message, a social media (SM) application notification, an MMS message, a web application notification, or some other type of notification. The processor 152 can use the notification hierarchy to send a second type of notification if the sending the first type of notification to a destination was unsuccessful. The SM application notification or the web application notification can be displayed on a display device operating as a client to a server that is serving the display device a web application.

A person ID can be mapped to one or more destination IDs. Each destination ID can be associated with the type of notification(s) associated with the person ID, such that a single person ID can be associated with multiple destination IDs. For example, the person ID "1" can be associated with a telephone number 555-123-3458 to which a notification can be sent via an SMS message, and an e-mail address to which a notification can be sent via an e-mail message. As an example, the destination IDs mapped to a person ID can comprise an e-mail address to which a notification in the form of an e-mail message can be sent and an account handle (e.g., (e.g., a TWITTER® handle) to which a notification can be addressed. The PS 130 can determine where to send a notification by referring to the destination ID.

A person ID can be mapped to one or more notification ID. The processor 152 can determine a notification template to use to generate a notification based on the notification ID mapped to the person ID and the mapped data 541.

A person ID can be mapped to a maximum notifications per period. The processor 152 can refer to the maximum notifications per period and data indicative of a current period to determine whether or not a maximum number of notifications have been sent to a particular destination during that time period. The processor 152 can refer to the period ID to determine how long the time period is for the maximum notification per period identifier. The notification count can indicate how many notifications have been sent to the destination during a current time period. As an example, the mapped data 543 shows that sixteen e-mail notifications have been sent to destination e-mail address for the person ID "5" out of the maximum number (fifty) of e-mail notifications to be sent to that person daily.

Next, FIG. 13 is a table of mapped data 544 for use in a rule to determine an actionable condition. The mapped data 544 includes parameters (i.e., a service interval and a life expectancy) that can be used as a part of a condition, such as a condition shown in FIG. 9. Other examples of parameters for use in a condition to determine an actionable condition are possible.

The parameters in the mapped data 544 are mapped to at least one of an EST type ID, an EST manufacturer ID, or an EST model ID. Those parameters could be mapped to other data such as a hardware or software level of an EST, a role ID, or a person ID, for example. The processor 152 can determine the rules for comparing against measurement data pertaining to a particular EST with reference the mapped data 544. Rows A, E, and I include null values for EST manufacturer ID and the EST model ID such that the service interval and life expectancies of rows A, E, and I are applicable to rules pertaining to any brake lathe, any vehicle lift, and any air compressor, respectively. Row D includes a null value for the EST model such that the service interval and life expectancy for row D is applicable to a rule pertaining to any brake lathe manufactured by or for A1 Tools. Rows B and C include a service interval and a life expectancy for brake lathes having a particular manufacturer and model identifier. Rows F, G, and H include a service interval and a life expectancy for vehicle lifts having a particular manufacturer and model identifier. Rows J and K include a service interval and a life expectancy for air compressors having a particular manufacturer and model identifier.

E. Example Electrical Connections

FIG. 14 shows a block diagram depicting connection views 1, 2, and 3 of an AC electrical supply 10 and example connections to the AC electrical supply 10. The AC electrical supply 10 can be located in a structure, such as a vehicle repair shop or a building used for other purposes. The AC electrical supply 10 can be connected to an electrical grid that supplies AC electricity to other structures as well. Additionally or alternatively, the AC electrical supply 10 can be connected to an electrical generator configured for providing electricity to electrical circuits and devices at the structure. The AC electrical supply 10 can output single-phase electricity or multi-phase electricity with a physical frequency. The physical frequency, for example, can be 50 hertz (Hz) or 60 Hz. The electricity output by the AC electrical supply 10 can have a root-mean-squared (RMS) voltage value of approximately 120 volts AC, 240 volts AC, or 480 volts AC, and a peak voltage value of approximately 170 volts AC, 340 volts AC, or 680 volts AC, respectively. Other examples of the physical frequency, RMS voltage values or peak voltage values of electricity provided by the AC electrical supply 10 are also possible.

The AC electrical supply 10 can include an electrical panel at which electrical circuits can be connected to terminals within the electrical panel. FIG. 14 shows four terminals T1, T2, T3 and T4 of the AC electrical supply 10. An electrical panel of the example embodiments can include a number of terminals greater than or fewer than four terminals. The connection view 1 represents a situation in which terminals T1 to T4 are not connected outside of the AC electrical supply 10.

Next, the connection view 2 shows an EST 11 having circuit leads 13 and 14 connected to the AC electrical supply 10 via electrical circuits 15 and 16. The circuit leads 13 and 14 can be connected to an electrical motor at or within the EST 11. The electrical motor at the EST 11 can include a single-phase AC motor. In one case, the terminal T1 is connected to an AC line (i.e., hot) circuit, and the terminal T4 is connected to an AC neutral circuit. In another case, the terminal T1 is connected to an AC neutral circuit, and the terminal T4 is connected to an AC line (i.e., hot) circuit. In yet another case, the terminal T1 and the terminal T2 are connected to AC line (i.e., hot circuits) without a neutral wire connected to the EST 11, although a ground wire (not shown) can be connected to both the EST and a ground within the AC electrical supply 10. The EST 11 can be used one or more times before a MD 12 is installed within an electrical circuit connected to the AC electrical supply 10. Alternatively, the EST 11 may have never been used before the MD 12 is installed within an electrical circuit connected to the AC electrical supply 10.

The EST 11 can comprise any of a variety of EST. In a first respect, the EST 11 can comprise one or more electrical motors. This type of EST can be referred to as a motorized EST or motorized shop tool. In this first respect, the EST 11 can comprise a vehicle lift configured to raise and lower vehicles, a wheel balancer, a brake lathe, a tire changer, a brake dynamometer, a vehicle frame straightening machine, or a vehicle exhaust pipe bending machine, for example. In a second respect, the EST 11 can comprise one or more electrical pumps. In the second respect, the EST 11 can comprise an air conditioning service machine, a fluid exchanger, a part washer, or an air compressor, for example. The fluid exchanger could be configured to exchange transmission fluid, brake system fluid, engine coolant, engine fuel, or power steering system fluid, for example. In a third respect, the EST 11 can comprise an EST without an electrical motor and without an electrical pump. In the third respect, the EST 11 can comprise a battery charger, for example. In a fourth respect, the EST 11 can comprise at least part of a hydraulic system, such that the EST comprises an electro-hydraulic system.

Table 1 provides more particular examples and details regarding some of the example EST described above.

TABLE 1

| EST | Example Model | Seller | Details |
|---|---|---|---|
| Air compressor | BRA15312H | SNAP-ON ® | Stationary, 120 gallon storage tank, 15.0 HP/3 phase pump - 175 max. PSI |
| AC service machine | EEAC324B | SNAP-ON ® | ECO ™ Plus A/C service center (R134a) - 0.25 HP vacuum pump |
| Brake dynamometer | 500/1 | MAHA ® | Single roller dynamometer, 22 KW motor |
| Brake lathe | PFM 9.1 DRO | PRO-CUT ™ | 1.0 HP - 120 VAC/1 phase/60 hz motor |
| Fluid exchanger | EEFT304B | SNAP-ON ® | Heavy duty transmission fluid exchanger, with power steering fluid exchanger features |
| Fluid exchanger | EEBR311A | SNAP-ON ® | Brake fluid flush system |
| Fluid exchanger | EEFS305A | SNAP-ON ® | Fuelkare ™ Fuel service system - 12 VDC pump |
| Part washer | PBD3222A | SNAP-ON ® | 120 VAC/60 hz pump - rate 325 gallons per hour |
| Pressure washer | SEPW30SHDE | SNAP-ON ® | Cart mounted, electric power (230 VAC/34A/1 phase)/oil fired - 3,000 max. PSI |
| Tire changer | EEWH329A | SNAP-ON ® | Swing arm tire changer |
| Vehicle exhaust pipe bender | 1302-BA-202 | BENDPAK ® | Digital pipe bender |
| Vehicle frame straightener | Power-Pro 3000 SL HD | BLACKHAWK ® | 120 VAC - 1 phase - 60 Hz. |
| Vehicle lift | JBC6099MC | SNAP-ON ® | JOHN BEAN ® mobile column automotive lift - 96,000 lb. capacity |
| Wheel balancer | EEWB517A | SNAP-ON ® | JOHN BEAN ® portable truck wheel balancer |

Other examples of the EST 11 are also possible.

The examples in the details column in Table 1 shows different EST can have different electrical connections and different electrical ratings, such single phase or three phase alternating current voltage. As a result, measurements of current used by the different types of EST can be compared to different measurement profiles to determine whether or not an actionable condition exists with an EST that was subject to measurements in accordance with this description. Each measurement profile can comprise or represent a waveform over time (such as an electrical current waveform over a time), for example.

In addition to having different measurement profiles for different types of EST, an individual type of EST can be associated with different measurement profiles. For example, an EST comprising a 64,000 pound vehicle lift can be associated with a measurement profile to compare to measurements of the vehicle lift when the vehicle lift is raising a vehicle, and a measurement to compare to measurements of the vehicle lift when the vehicle lift is lowering a vehicle. Furthermore, a single type of EST, such as the 64,000 pound vehicle lift, can be associated with multiple measurement profiles based on a weight of a vehicle positioned on the vehicle lift.

As another example, an EST comprising a battery charger can be associated with multiple measurement profiles, such as a measurement profile to compare to measurements of the battery charger when the battery charger is charging a lead acid battery, a measurement profile to compare to measurements of the battery charger when the battery charger is charging a lithium ion battery, a measurement profile to compare to measurements of the battery charger when the battery charger is charging a 12 volt battery, or a measurement profile to compare to measurements of the battery charger when the battery charger is charging a 42 volt battery, for example.

Next, the connection view 3 shows the EST 11 with the circuit lead 13 connected to the terminal T1 via the electrical circuit 15, and the circuit lead 14 connected to a first portion (e.g., a first end) of an electrical circuit 17. The terminal T4 is connected to a second portion (e.g., a second end) of the electrical circuit 17. An intermediate portion (e.g., a portion between the first end and the second end) of the electrical circuit 17 is at the MD 12. Since the terminal T4 is connected to a hot or neutral AC circuit, the MD 12 can measure electrical values pertaining to the hot or neutral AC circuit.

Next, FIG. 15 shows a block diagram depicting connection views 4, 5, and 6 of the AC electrical supply 10 and example connections to the AC electrical supply 10. The connection view 4 represents the situation in which terminals T1 to T4 are not connected outside of the AC electrical supply 10. The connection views 5 and 6 represent an example of multi-phase AC connections to EST 25. Due to electrical imbalance that may arise in the multi-phase system, different amperages can occur on different phases, but the total amperage is the sum of current through N-1 circuit leads excluding the ground leads. For accurate measurement of amperage in a multi-phase system including an EST and a measurement device, the measurement device measures N-1 number of wires in the AC connections to the EST excluding any ground connection. For example, if the EST includes a three-phase motor in a Y-configuration using four circuit leads, signals on three of the four circuit leads are to be sampled by the measurement device.

In particular, the connection view 5 shows an EST 25 having circuit leads 26, 27, 28, and 29 connected to the AC electrical supply 10 via electrical circuits 30, 31, 32, and 33. The circuit leads 26, 27, 28, and 29 can be connected to an electrical motor at or within the EST 25. The electrical motor at the EST 25 can include a multi-phase AC motor, such as a two-phase or three-phase motor. In one example case, the terminals T1, T2, and T3 care connected to AC line (i.e., hot) circuits, and the terminal T4 is connected to an AC neutral circuit. In another example case, the terminal T1 is connected to an AC neutral circuit, and the terminals T2, T3, and T4 are connected to AC line (i.e., hot) circuits. In another example case, one of terminals T1, T2, and T3 is connected to a ground circuit and the other two circuits are each connected to a respective AC line circuit or an AC line circuit and an AC neutral circuit, and the terminal T4 is connected to an AC neutral circuit if the terminals T1 to T3 are each connected to a respective AC line circuit or an AC line circuit if one of the terminals T1 to T3 is connected to an AC neutral circuit. The EST 25 can be used one or more times before the MD 12 is installed for measuring electrical values pertaining use of the EST 25.

The EST 25 can include various motorized shop tools. For example, the EST 25 can include a vehicle lift configured to raise and lower vehicles. As another example, the EST 25 can include one of the following machines: a wheel balancer, a brake lathe, an air compressor, a tire changer machine, a brake dynamometer, a fluid flushing machine, a battery charger, a vehicle frame straightening machine, an air conditioning service machine, or a vehicle exhaust pipe bending machine. The EST 25 can include at least part of a hydraulic system, such that the EST comprises an electro-hydraulic system. Other examples of the EST 25 are also possible.

Next, the connection view 6 shows the EST 25 with the circuit lead 26 connected to the terminal T1 via the electrical circuit 30, the circuit lead 27 connected to the terminal T2 via the electrical circuit 31, the circuit lead 28 connected to the terminal T3 via the electrical circuit 32, and the circuit lead 29 connected to the electrical circuit 33. Portions of the electrical circuits 31, 32, and 33 are positioned between the EST 25 and the MD 12, and other portions of the electrical circuits 31, 32, and 33 are positioned between the MD 12 and the AC electrical supply 10. Since the terminal T4 can connect to a hot or neutral AC circuit, the MD 12 can measure electrical values pertaining to the hot or neutral AC circuit. In another example embodiment, one or more of the electrical circuits 31, 32, and 33 may extend between the AC electrical supply 10 and the EST 25 without extending to the MD 12.

III. Example Operation

Figure 16:
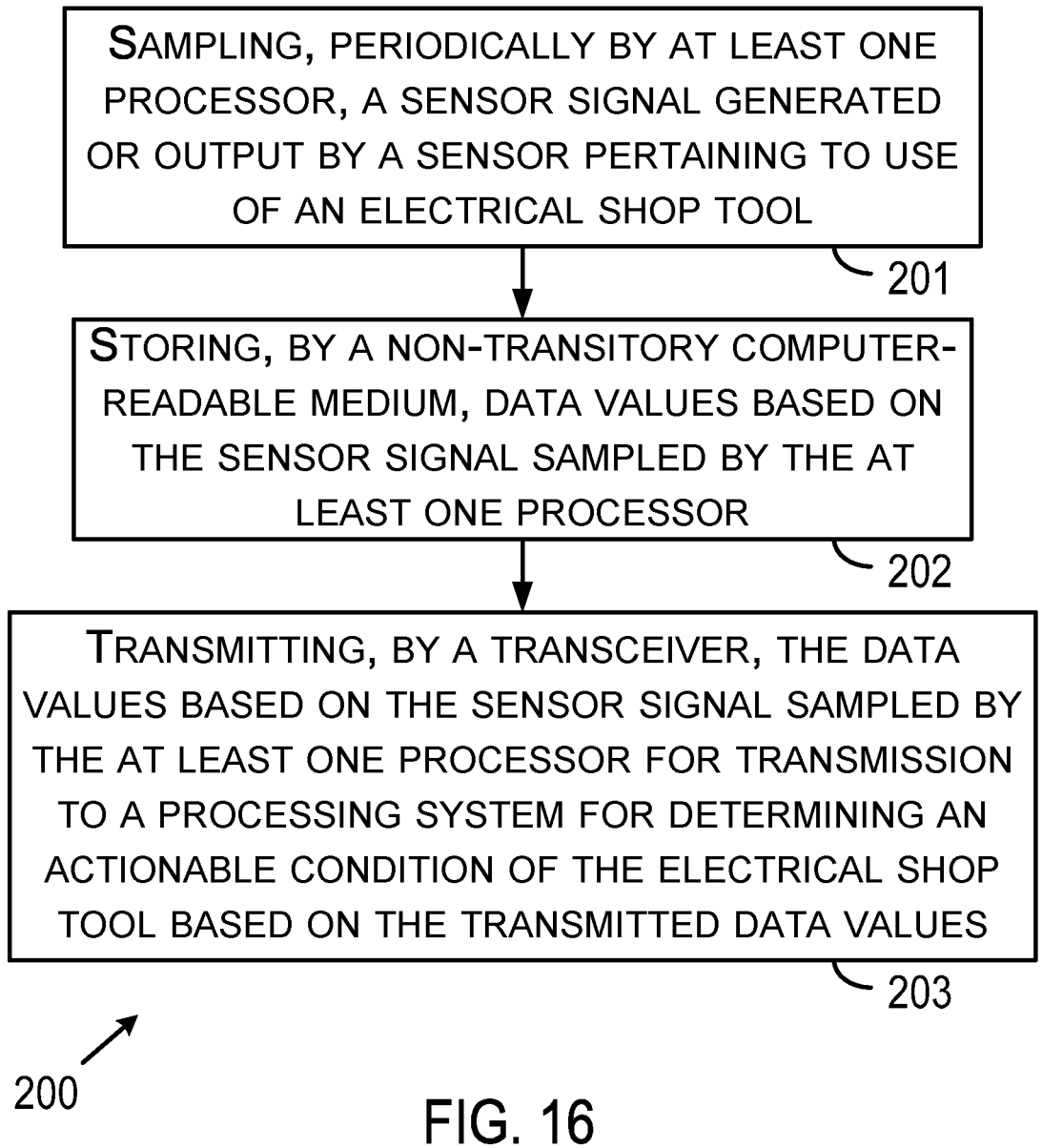
FIG. 16 is a flowchart depicting a set of functions that can be carried out in accordance with the example embodiments.

FIG. 16 is a flowchart depicting a set of functions 200 (or more simply "the set 200") that can be carried out in accordance with the example embodiments described in this description. The set 200 includes the functions shown in blocks labeled with whole numbers 201 through 203 inclusive. The following description of the set 200 includes references to elements shown in other figures, but the functions of the set 200 are not limited to being carried out only by the referenced elements. A variety of methods can be performed using all of the functions shown in the set 200 or any proper subset of the functions shown in the set 200. Any of those methods can be performed with other functions such as one or more of the other functions of the set 220 (shown in FIG. 17), an "a function pertaining to the set 200" discussed elsewhere in this description, or another function discussed in this description. One or more of the functions shown in the set 200 can be carried out multiple times in performing a method in accordance with the example embodiments.

The set 200 refers to an EST. That EST can comprise any EST discussed in this description or another EST. The set 200 provides for reporting data pertaining to use of the EST.

Block 201 includes sampling, periodically by at least one processor (e.g., the processor 53), a sensor signal generated or output by a sensor (e.g., sensor 52 or 61) pertaining to use of an EST. The MD 12 can output a voltage reference signal (e.g., a five volt DC signal) to the sensor that generates or outputs the sensor signal.

As an example, the sensor signal can include a voltage, a current, an audio signal, an image, or computer-readable binary data. In accordance with an embodiment in which the sensor 52 or 61 comprises a current transformer, the sensor signal can comprise a voltage differential across a first transformer lead and a second transformer lead of a first current transformer including a first conductive coil with the first transformer lead and the second transformer lead. The first conductive coil is configured with a central passageway through which a first conductor carrying alternating current to or from the electrical shop can pass.

As another example, the sensor signal can include a signal representing a detected position $[X(t)]$, velocity $d[X(t)]$, acceleration $d^2[X(t)]/dt^2$, or jerk $d^3[X(t)]/dt^3$. The detected position, velocity, acceleration, or jerk pertains to an EST or some portion of an EST, such as a shaft of a motor, a lift arm of a vehicle lift, or some other portion of an EST. A received sensor signal can be continuous (e.g., zero to a maximum value), discrete (e.g., positions A, B, C), angular, or linear.

A function pertaining to the set 200 can comprise the processor 53 receiving timing signals to determine when to sample the sensor signal, record a time when each data value indicating a sampled sensor signal was sampled, or determine when the transceiver 55 is to transmit data indicating the sampled sensor signal. In one respect, processor 53 can receive the timing signals from a real-time clock within the MD 12. In another respect, the processor 53 can cause the transceiver 55 to request the timing signals from a remote device within or attached to the network 129, and the processor 53 can receive the timing signals received by the transceiver in response to that request.

A function pertaining to the set 200 can comprise the processor 53 determining an amperage value corresponding to each voltage differential sample. The stored data values represent the determined amperage values.

Next, block 202 includes storing, at a non-transitory CRM 51, data values based on the sensor signal sampled by the processor 53. The data values can be stored as the measurement data 72.

A function pertaining to the set 200 can comprise the processor 53 determining a sampled sensor signal value for each periodic sample of the sensor signal, and the processor 53 scaling the sampled sensor signal values using a linear scale to determine the data values based on the sensor signal sampled by the processor 53. The CRM 51 can store these scaled data values.

A function pertaining to the set 200 can comprise the processor 53 determining a sampled sensor signal value for each periodic sample of the sensor signal, and the processor scaling the sampled sensor signal values using a non-linear scale to determine the data values based on the sensor signal sampled by the processor 53. The CRM 51 can store these scaled data values.

A function pertaining to the set 200 can comprise the processor 53 determining a sampled sensor signal value for each periodic sample of the sensor signal, and summarizing the sampled sensor signal values into an array or other data structure. The CRM 51 can store this array or other data structure of data values.

A function pertaining to the set 200 can comprise the processor 53 determining values indicative of how a sensor signal changes over time such as a derivative, partial derivative, integral, etc. of a sensor signal. The CRM 51 can store the determined values indicating how a sensor signal changes over time.

Next, block 203 include transmitting by the transceiver 55, the data values based on the sensor signal sampled by the at least one processor 53 for transmission to the PS 130 for determining an actionable condition of the EST based on the transmitted data values. The actionable condition may include any of the actionable conditions discussed elsewhere in this description or another actionable condition. Transmission of the data values based on the sampled sensor signal can including transmission of the data values directly to the network 129 or indirectly to the network 129 via a gateway.

In one respect, the transceiver 55 can transmit the data values stored during a preceding time interval at a next transmission time occurring at an end of the preceding time interval if at least one data value stored during the preceding time interval represents a current flow to the motor exceeded 0.0 amperes. In another respect, the transceiver 55 can transmit the data values stored during a most-recent data collection period upon a maximum report-to-report time has elapsed.

In yet another respect, the processor 53 can postpone the transceiver 55 from transmitting the data values stored during at least one preceding time interval at a next transmission time occurring at an end of each of the at least one preceding time interval if each data value stored during stored during each of the at least one preceding time interval represents a current flow to the motor was 0.0 amperes. The transceiver 55 can transmit the data values stored during a next preceding time interval at a next transmission time occurring at an end of the next preceding time interval if at least one data value stored during stored during the next preceding time interval represents a current flow to the motor exceeded 0.0 amperes. The next preceding time interval occurs immediately after the at least one preceding time interval.

A function pertaining to the set 200 can comprise the network transceiver 55 transmitting a device identifier and at least one time indicator along with the transmitted data values. That device identifier is associated with at least one of the EST and a device including a substrate on which the first current transformer, the at least one processor, and the first network transceiver are mounted. The at least one time indicator is associated with the transmitted data values.

A function pertaining to the set 200 can comprise the processor 152 determining the at least one actionable condition of the EST based on the data values transmitted by the transceiver 55, the transceiver 153 transmitting notification of the at least one actionable condition to at least one destination associated with the EST, and a display device associated with the destination receiving and displaying the notification of the at least one actionable condition.

Figure 17:
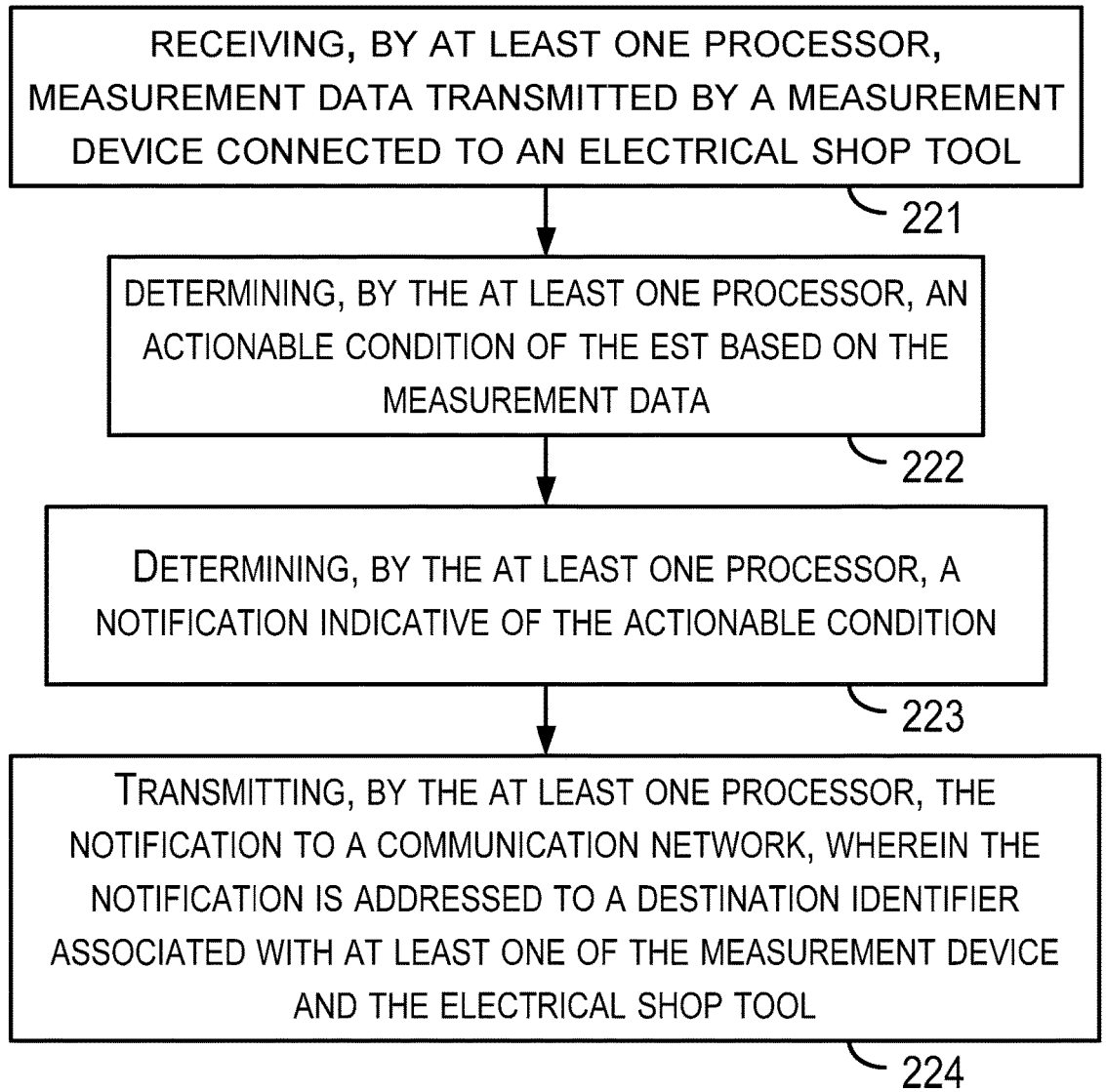
FIG. 17 is a flowchart depicting a set of functions that can be carried out in accordance with the example embodiments.
Figure 21:
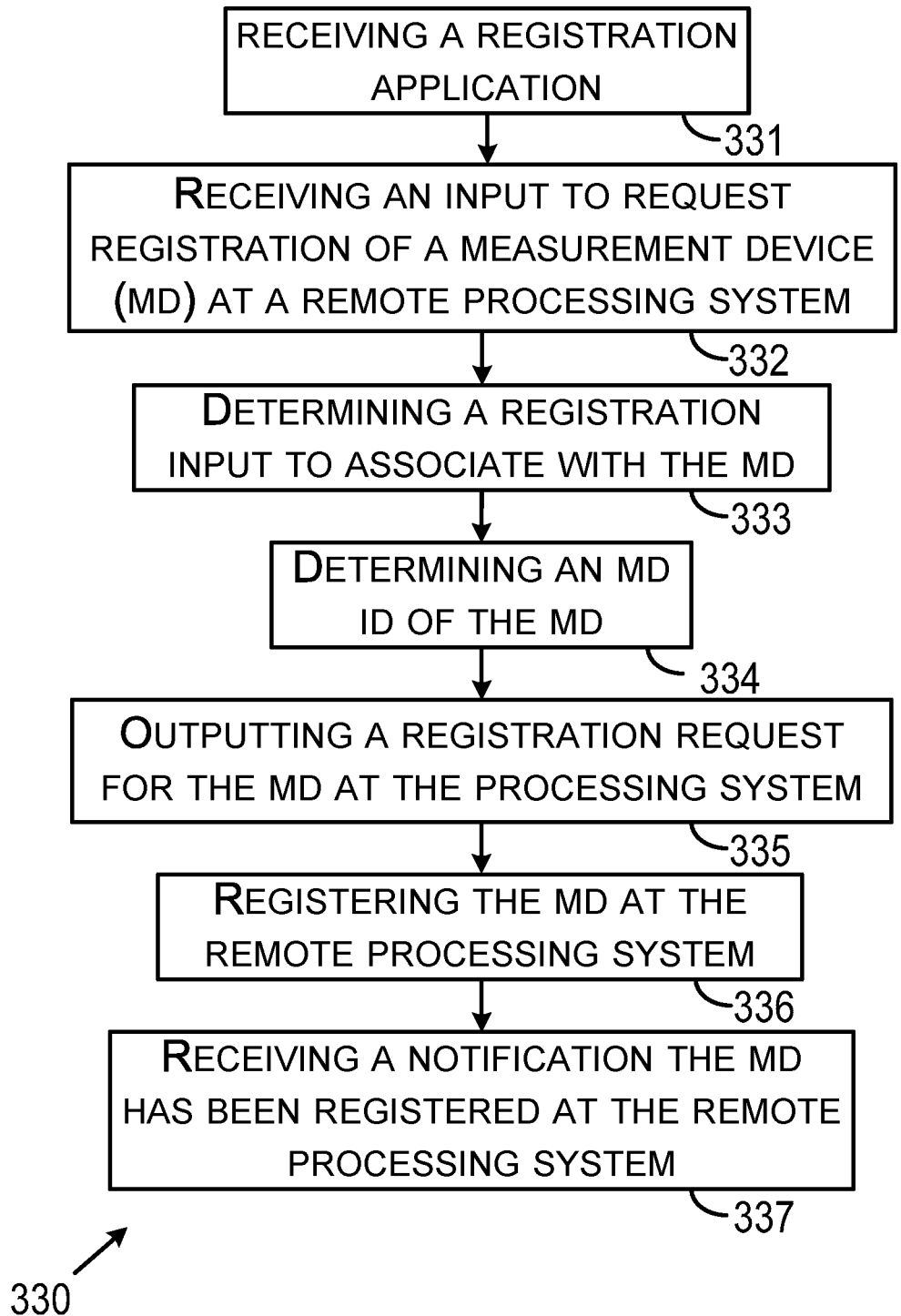
FIG. 21 is a flowchart depicting a set of functions that can be carried out in accordance with the example embodiments.

Next, FIG. 17 is a flowchart depicting a set of functions 220 (or more simply "the set 220") that can be carried out in accordance with the example embodiments described in this description. The set 220 includes the functions shown in blocks labeled with whole numbers 221 through 224 inclusive. The following description of the set 220 includes references to elements shown in other figures, but the functions of the set 220 are not limited to being carried out only by the referenced elements. A variety of methods can be performed using all of the functions shown in the set 220 or any proper subset of the functions shown in the set 220. Any of those methods can be performed with other functions such as one or more of the other functions of the set 200 (shown in FIG. 16) or the set 330 (shown in FIG. 21), an "a function pertaining to the set 220" discussed elsewhere in this description, or another function discussed in this description. One or more of the functions shown in the set 220 can be carried out multiple times in performing a method in accordance with the example embodiments.

The set 220 refers to at least one processor and an EST. The at least one processor can comprise the processor 152. The EST can comprise any EST discussed in this description or another EST. The set 220 allows for providing a notification pertaining to an actionable condition of the EST. The processor 152 can perform the set 220 for one or more different EST. The processor 152 can repeat performing one or more functions of the set 220 for those EST(s).

Block 221 includes receiving, by at least one processor (e.g., the processor 152), measurement data transmitted by a measurement device (e.g., the MD 12) connected to the EST. The received measurement data can be stored in the CRM 154 as the measurement data 159.

Receiving the measurement data can comprise the transceiver 153 receiving a communication (e.g., one or more communications) comprising a measurement datum. A communication comprising a measurement datum or data can be arranged in any one of a variety of configurations. As an example, a communication comprising a measurement datum can comprise a 3-tuple having a time stamp, a source identifier, and the measurement datum. The source identifier can comprise at least one of an MD ID and an EST ID.

The measurement data can include the raw data the processor 53 samples from the signal, data values output by the sensor 52, or data values generated by the sensor 52. The measurement data can include a data value representing one or more digitized values of a voltage differential sampled by the measurement device or at least one time value pertaining to the sampled voltage differential. As an example, the analyzed measurement data can include data representing one or more sets of at least two voltage differential samples associated with one or more electrical circuits connected to one or more sensors, and each of the one or more sets represents a respective instance of using the EST.

Figure 18:
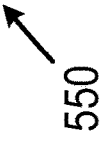

Turning to FIG. 18, example 3-tuples 550 that can be included in a communication comprising a measurement datum are shown. Each value $T_X$ represents a time stamp, such as a UTC time stamp. The time stamp can represent a time when the MD determined the associated measurement datum. For embodiments in which the measurement datum represents multiple measurements, the time stamp can represent a start time indicative of when a first of the multiple measurements was made or an end time indicative of when a last of the multiple measurements was made. For purposes of this description, the greater the number X in $T_X$, the more recent in time the time stamp. A communication including a measurement datum or data can comprise a start time and an end time pertaining to measurement(s) made to obtain the measurement datum or data.

Each value $ID_X$ (where X equals 1, 2, or 3) represents an identifier, such as an MD ID of an MD that transmitted the communication comprising the measurement data or an EST ID of an EST connected to that MD. For purposes of this description $ID_1$ can be the MD with ID "1" shown in FIG. 5, $ID_2$ can be the MD with ID "2" shown in FIG. 5, and $ID_3$ can be the MD with ID "3" shown in FIG. 5

Each numeric datum following an $ID_X$ in a 3-tuple represents a measurement datum. For simplicity, the measurement data are shown as whole numbers 0 to 10. Other values of the measurement datum, such as one or more hexadecimal bytes of data, are possible. As an example, each measurement datum can comprise a data value representing one or more digitized values of a voltage differential sampled by the MD 12. The units associated with the measurement datum can be implied based on the EST associated with the $ID_X$. As an example, the units associated with the measurement datum can be amperes, volts, or some other units.

The 3-tuples 550 include some 3-tuples with an "X" following an $ID_X$. The value "X" represents a value the processor 152 can use to determine whether an MD is online. At time stamp $T_{14}$, the 3-tuples for $ID_1$, $ID_2$, and $ID_3$ include an X following the $ID_X$. The processor 152 can use those 3-tuples to determine that the measurement devices with ID "1", "2", and "3" were online at the time associated with the time stamp $T_{14}$. In one respect, a communication the processor 152 uses to determine the MD is online can be sent in response to a request the PS 130 transmits to request a status of an MD being online. In another respect, a communication the processor 152 uses to determine the MD is online can be sent to the PS 130 without being requested by the PS 130. In this latter respect, that communication can be sent as a heartbeat signal to provide notice the MD is online. The communications the processor 152 uses to determine online connectivity of measurement device need not be sent at the same time, such as the communications sent at time stamps $T_{76}$, $T_{77}$, and $T_{78}$.

The processor 152 can determine an MD is offline in various ways. As an example, the processor 152 may request an MD to send a communication to indicate the MD is online. If the processor 152 does not receive a response to that request in a threshold amount of time, the processor 152 can determine the MD is offline. As another example, processor 152 can determine that an MD if offline by determining the processor 152 has not received a communication from the MD within a threshold amount of time (e.g., 24 hours). For instance if the 3-tuple at time stamp $T_{77}$ represents 12:01 AM on 4 Jul. 2017 and time stamp $T_{79}$ represents 12:01 AM on 5 Jul. 2017, the processor 152 can determine that the MD with ID "2" is offline since the processor 152 had not received any communication from the MD with ID "2" within 24 hours of 12:01 AM on 4 Jul. 2017. Other examples of a time threshold to determine the MD is offline are also possible.

Next, FIG. 19 shows a subset of 3-tuples 551 including $ID_1$ from among the 3-tuples 550. FIG. 19 shows groups of 3-tuples 552, 553, 554, 555, 556, 557, and 558. As an example, those groups of tuples can include all the measurement data the processor 152 received from the MD with ID "1" during equal time periods, such as an hour, day, week, or month, but at different times. Comparing the measurement data within the 3-tupple 551, the processor 152 can determine that the amount of use of the EST connected to that MD differ for each of the time periods associated one of the groups of 3-tuples 552 to 558.

As another example, a communication comprising a measurement datum can comprise a 4-tuple having a time stamp representing a measurement start time, a time stamp representing a measurement end time, a source identifier, and a measurement datum representing a common measurement value for each of multiple measurements made by the MD during the start time and the end time. The common measurement value can represent two or more measurements of a voltage differential associated with one or more electrical circuits connected to one or more sensors. For example, the voltage different could comprise a voltage differential across two electrical circuits of the MD 12 or a voltage differential associated with electrical circuits connected to one or more of sensors 52 and 61.

As another example, the measurement data can comprise an array of datum. The array can be arranged as a 2n+1 tuple where n equals a number of separate measurement datum contained in the communication. Each measurement datum can be associated with a separate measurement time. As an example, a communication arranged as a 2n+1 tuple comprising twelve separate measurement datum from the group of 3-tuples 553 could be arranged as follows: $ID_1$, $T_{18}$ 6, $T_{19}$ 3, $T_{20}$ 0, $T_{21}$ 6, $T_{22}$ 3, $T_{23}$ 0, $T_{24}$ 7, $T_{25}$ 3, $T_{26}$ 0, $T_{27}$ 7, $T_{28}$ 3, $T_{29}$ 0.

As another example, the measurement data can comprise one or more sets of at least two measurements made by the MD 12, such as measurements of a voltage differential associated with one or more electrical circuits connected to one or more sensors. Each of those sets of measurements can represent a separate job or machine cycle of the EST connected to the MD 12. As another example, a communication comprising measurement data can comprise one or more images captured using an image sensor. Other examples of a communication comprising a measurement datum or data are also possible.

Returning to FIG. 17, block 222 includes determining, by the at least one processor (e.g., the processor 152), an actionable condition of the EST based on the measurement data. Determining the actionable condition can comprise the processor 152 determining that the measurement data matches a condition defining the actionable condition. As an example, the actionable condition can comprise a condition of an EST that warrants transmitting at least one of a notification regarding servicing the EST, a notification regarding the expected life of the EST, a notification pertaining to financial benefit of an EST, a notification regarding a sales opportunity pertaining to an EST, a notification regarding use or non-use of an EST, and any other notification described in this description.

The condition defining the actionable condition can be referred to as a rule. The rule can be arranged as logic executable by the processor 152. The processor 152 can evaluate the rule by comparing a single measurement datum to the rule or an aggregate of measurement data to the rule. Accordingly, the actionable condition can be based on a single measurement datum or an aggregate of multiple measurement values contained within the received measurement data.

A rule can be applicable to all types of EST, such as a rule pertaining to use of the EST or a rule pertaining to non-use of the EST. A rule pertaining to use of the EST can comprise a rule to determine a number of machine cycles or jobs performed by the EST during a particular time period. A rule to determine the number of machine cycles or jobs can define a machine cycle or job as described with respect to FIG. 8. A rule pertaining to non-use of the EST can comprise a rule to determine an amount of time since the EST last performed a machine cycle or job. A rule can be applicable to a particular type of EST, such as a rule pertaining to all types of brake lathes, a rule pertaining to all types of on-vehicle brake lathes, a rule pertaining to all types of vehicle lifts, or a rule pertaining to all types of two-post vehicle lifts. A rule can be applicable to a particular brand of an EST. A rule can be applicable to a particular brand and model number of an EST. A rule can be applicable to a particular brand, model number and hardware or software level of an EST.

The processor 152 can refer to the reference data 158 to determine a data value for use in a rule. For example, the reference data 158 can comprise a life expectancy of a particular type of EST or a particular brand and model of EST (see notification ID 1, 2, 11, and 12 in FIG. 9). As another example, the reference data 158 can comprise time data indicating the last day a particular EST was serviced (see notification ID 3, 4, 13, and 14 in FIG. 9). As yet another example, the reference data 158 can comprise an expected average current value for a particular brand and model of EST (see notification ID 21 and 22 in FIG. 9).

As yet another example, the reference data 158 can comprise data indicative of normal operating hours for a repair shop at which the MD and EST are located or data indicative of additional MD and EST within a particular repair shop that include the MD and EST. The processor 152 can use such reference information for a rule regarding unexpected use of an EST. For instance, the MD 12 can be connected to an EST comprising an air compressor. The processor 152 can evaluate the rule to determine that the air compressor is running at a time well beyond an expected operating hour. The rule can include a condition to determine that other EST connected to a registered MD are not used outside the expected operating hours. If the conditions of the rule are met, the processor 152, by evaluating the rule, can determine the actionable condition is to report the unexpected use of the EST as the unexpected use could mean that the air compressor has an air leak that causes the air compressor to run periodically even though no other devices are using the air compressed by the air compressor.

As yet another example, the processor 152 can evaluate a rule with respect to use or non-use of multiple similar EST in a repair shop using reference data indicating the repair shop has multiple similar EST. For instance, a repair shop can have three brake lathes and the processor 152 can determine aggregates of measurement data for at least one of the brake lathes and apply a rule based on those aggregates to determine, for example, that one of the brake lathes is rarely used compared to the other two brake lathes. A notification based on such determination can be sent to a destination associated with a person having a sales or service role to see if the rarely used EST requires service or if technicians at the repair shop require training, for example.

Since the processor 152 can evaluate a rule by comparing an aggregate of measurement data to the rule, the processor 152 can be arranged to determine an aggregate of the measurement data (e.g., multiple measurement values). As an example, the aggregate of multiple measurement values determined by the processor can comprise a count of pairs of measurement values indicating the EST transitioned from an off state to an on state or the on state to the off state during a particular time period. As another example, the aggregate of multiple measurement values comprises a value indicating an amount of time the EST has been operated in an on state. As yet another example, the aggregate of multiple measurement values comprises a value indicating an average time the EST was used on each Sunday, Monday, Tuesday, Wednesday, Thursday, Friday, and Saturday over a time period of one or more weeks. As still yet another example, the aggregate of multiple measurement values can comprise a value indicating an average time the EST was used during a first time period for comparison to at least one other aggregate of multiple measurements values for one or more other time periods equal to the first time period, and the first time period is an hour, a day, a week, a month, a quarter of year, or a year, for example.

The processor 152 can aggregate measurement data by grouping the measurement data into a machine cycle or a job. Accordingly, the processor 152 can aggregate measurement data by grouping the measurement data into multiple machine cycles or multiple jobs. An example of determining this type of aggregated data is discussed with respect to FIG. 8. The processor 152 can determine an aggregate of multiple measurement values contained within the received measurement data breaches a threshold associated with an actionable condition.

Next, block 223 includes determining, by the at least one processor (e.g., the processor 152), a notification indicative of the actionable condition. The CRM 154 can store data that maps a notification to the actionable condition. The notification mapped to the actionable condition can comprise a complete notification ready for transmission or a notification template with a gap to be filled with a parameter before a completed notification pertaining to the actionable condition is ready for transmission. The processor 152 can refer to the stored data, such as the registration data 157 and the reference data 158 to determine the notification indicative of the actionable condition and a parameter if needed for completing a template.

Determining the notification indicative of the actionable condition can include the processor 152 following a rule (e.g., one or more rules) structured for determining the notification. The rule can be included within the CRPI 156 or can be included within the stored data, such as the registration data 157 and the reference data 158. As an example, the rule can comprise a rule to determine a notification associated with at least one of an EST type associated with the EST, a manufacturer of the EST, a model number of the EST, and a role of a person associated with the MD or the EST. If the notification regarding the actionable condition depends on a version level of the EST (such as a hardware or software level), the preceding rule can include the version level in order for the processor 152 to determine the applicable notification to be transmitted.

As an example, each row in the mapped data 541 can represent a rule or part of a rule, such as a rule comprising a Boolean operator. For example, based on the first row after the headers in FIG. 9, a first particular example rule could be written as: Determined notification=notification ID 1 IF (EST type=vehicle lift) AND (EST brand=ACME) AND (EST model=Pro-Lift 778) AND (condition=usage>threshold % of life expectancy) AND (role of person=sales person).

As another example, based on the fifteenth row after the headers in FIG. 9, a second particular example rule could be written as: Determined notification=notification ID 15 IF (EST type=brake lathe) AND (EST brand=Brake-Cut) AND (EST model=45899) AND (condition=fault detected) AND (role of person=shop owner OR shop technician).

Determining the notification can comprise the processor 152 determining the notification based on the registration data associated with a particular person associated with MD or the EST. FIG. 11 and FIG. 12 show example registration data for example people associated with an MD or an EST connected to an MD. As an example, the processor 152 can determine the notification to be sent based on one or more of a notification hierarchy, destination ID, or notification ID associated with a person registered with the PS 130. For instance, the processor 152 can refer to the mapped registration data shown in FIG. 11 and FIG. 12 to determine the notification ID 1 is applicable for sending to the person named Jane Doe as an SMS message to the destination mobile identification number 555-123-3458.

The notification can pertain to an actionable condition of the EST or any other actionable condition discussed in this description. As an example, the actionable condition includes a maintenance condition of the EST, a sales phone call, an email of return-on-investment data to the owner of the EST, or a warranty issue regarding the EST. Others that may receive the notifications include, for example, sales staff, service staff, calibration staff, lease companies, billing staff, etc.

Furthermore, the processor 152 can refer to the registration data 157 associated with a registered person to determine whether or not to transmit a notification to the registered person based on another preference of the person such as a maximum notification per period preference.

Next, block 224 includes transmitting, by the at least one processor (e.g., the processor 152), the notification to the communication network 129. The notification is addressed to destination identifier associated with at least one of the MD 12 and the EST. The PS 130 can receive the destination identifier during performance of a function of the set 330, such as the function 333, or otherwise. The processor 152 can determine the destination identifier from the registration data 157 or the reference data 158. As an example, the destination address can comprise an e-mail address, a short message service text message number, a multimedia messaging service number, a mobile identification number, a landline telephone number, or a social media account handle. A registrant can be associated with multiple destination identifiers such that a notification is sent to multiple destinations or according to a hierarchy of destinations preferred by the registrant.

Determining the destination identifier can comprise determining the destination ID is associated with a person associated with the MD 12 or the EST connected to the MD 12. Determining the destination identifier can comprise determining the location of the MD 12 or the EST is within the territory associated with the person associated with the MD 12 or the EST and determining the destination identifier is associated with the person associated with the MD 12 or the EST.

A function pertaining to the set 220 can comprise receiving, by the at least one processor 152 prior to receiving the measurement data, an identifier indicative of the measurement device, an identifier indicative of the EST, and the destination identifier, and registering the MD 12. Registering the MD 12 can comprise storing within the CRM 154 registration data that associates the identifier indicative of MD 12 and the identifier indicative of the EST to each other and that associates the destination identifier with at least one of the MD 12 and the EST. In this way, the processor 152 can determine the destination identifier associated with at least one of the MD 12 and the EST based on the registration data and an identifier received with the measurement data. The identifier received with the measurement data comprises at least one of the identifier indicative of MD 12 and the identifier indicative of EST. The processor 152 can address a notification with the destination identifier associated with at least one of the MD 12 and the EST.

A function pertaining to the set 220 can comprise receiving, by a destination indicated by the destination identifier, the notification. For example, a display device (e.g., the DD 131, the DD 132, or the DD 133) can be associated with a mobile identification number. The display device can receive the notification and output the notification via an output device of the display device. Outputting the notification can comprise displaying the notification on a display.

A function pertaining to the set 220 can comprise the PS 130 providing a display device with analysis data for viewing on the display device. For example, the PS 130 may determine and provide a display device (associated with an owner of a repair shop or otherwise) data indicating use of one or more EST (such as all EST owned by the owner) over the course of a day or some other time period or by different categories of EST.

A function pertaining to the set 220 can comprise the processor 152 determining a status of the MD 12 being online or offline the network 129, and the CRM 154 storing the status of the MD 12. Examples of making that determination are described with respect to FIG. 18 and FIG. 19. The determination can be made for multiple MD at a single repair shop. The MD 12 being offline can be considered an actionable condition of the MD 12. All registered MD from a single repair shop being offline could indicate to the processor 152 of another actionable condition. The processor 152 can determine whether or not a registrant is to receive a notification (such as the notification ID 24 or 25) regarding the MD(s) being offline. An action taken in response to receiving such notification can comprise modifying the network data 77 in the MD 12 so that the MD 12 is arranged to communicate via the network 129.

A function pertaining to the set 220 can comprise determining a destination identifier of a destination for the notification. The processor 152 can determine the destination identifier from the registration data 157 or the reference data 158. The processor 152 can address the notification with the destination identifier.

A function pertaining to the set 220 can comprise performing an action pertaining to the actionable condition. As an example, the action can comprise communicating the actionable condition to another person. Communicating the actionable condition to another person can comprise placing a phone call, such as a sales phone call. During the phone call, the discussing selling of another EST could occur. Communicating the actionable condition to another person can comprise generating and sending an e-mail message, such as an e-mail comprising return-on-investment data.

A function pertaining to the set 220 can comprise servicing the EST based on the actionable condition. For example, servicing the EST can comprise repairing a fault with the EST or a connection to the EST, such as wired connection between the EST and MD 12. As another example, servicing the EST can comprise performing a maintenance function to the EST when the actionable condition pertains to a service interval associated with the EST. A maintenance function can comprise inspection function, such as inspecting a safety latch on a vehicle lift, or cleaning a slideway on a brake lathe. As yet another example, servicing the EST can comprise receiving, by a device associated with the destination to which the notification is addressed, the notification, and the device displaying or otherwise outputting the notification. As yet another example, servicing the EST can comprise addressing a warranty issue regarding the EST.

IV. Example Display Device and Operation

Figure 20:
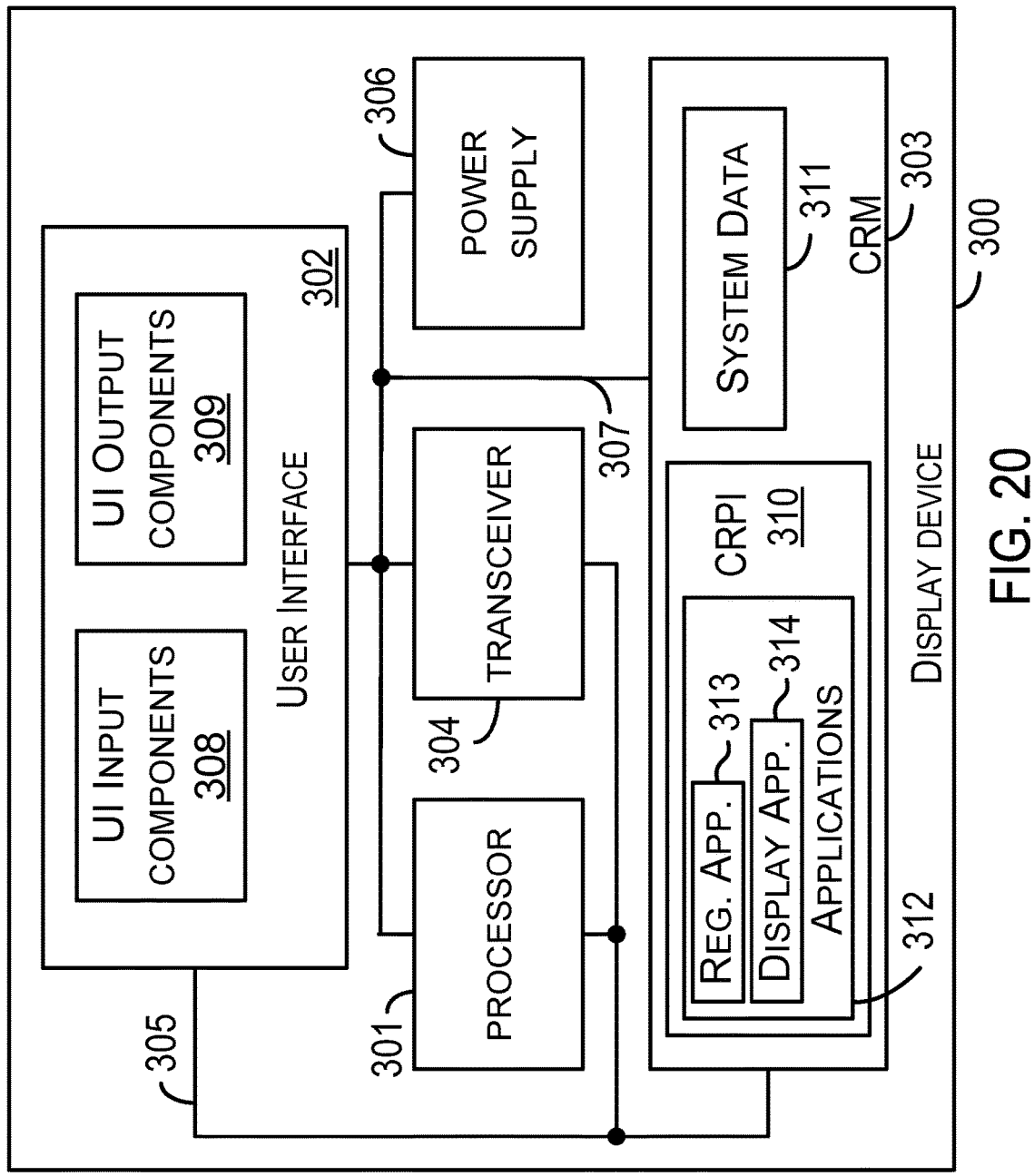
FIG. 20 is a block diagram of an example display device.

Next, FIG. 20 is a block diagram of an example display device 300. Any display device or programming device described in this description or shown in the other figures can be arranged like at least a portion of the DD 300. The DD 300 can comprise at least one of a processor 301, a user interface 302 a CRM 303, and a transceiver 304. Two or more of those components are communicatively coupled together via a system bus, network, or other connection mechanism 305. The DD 300 can comprise a power supply 306 and an electrical circuit 307 that connects the power supply 306 to one or more components within the DD 300. Any display device described in this description can be referred to as a "computing system." The DD 300 can be used to register an MD connected to an EST. The DD 300 can be used to display notifications determined by the PS 130 with respect to an EST connected to a registered MD.

A user interface such as the user interface 302 or any other user interface discussed in this description can include one or more user interfaces. Each user interface can include one or more user interface (UI) input components 308 configured so that a user of a system or device that includes the user interface can input data to or for use by a processor or another item of the system or device including the user interface 302. As an example, the UI input components 308 can comprise a touch screen display, a user input section having one or more input keys, a pointing device such as a computing system mouse, a keyboard (e.g., a QWERTY keyboard), a display pointer (e.g., a computer mouse input device), or a microphone for receiving spoken inputs. The UI input components 308 can comprise a camera or some other capture device to capture images or multi-dimensional codes (e.g., quick response (QR) codes).

A user interface such as the user interface 302 or any other user interface discussed in this description can include one or more user interface (UI) output components 309 configured for outputting (e.g., presenting) data to a user of the system or device including the user interface. As an example, the UI output elements 309 can include a display for visually presenting data, such as a notification, a data entry screen, a graphical user interface, measurement data, or analyzed measurement data. The display can comprise a display implemented using any of a variety of technologies, such as a light emitting diode (LED) display, a liquid crystal display (LCD), an organic LED (OLED) display, an active-matrix OLED display or some other type of display. As another example, the UI output components 309 can include an audio speaker to audibly present data to a user of the system or device including the user interface. Some components, such as a touch screen display, can function as both a UI input component 308 and as a UI output component 309.

The CRM 303 can comprise at least one of computer-readable program instructions 310 and system data 311. The CRPI 310 can comprise one or more applications 312 executable by the processor 301. The CRPI 310 can comprise an operating system executable by the processor 301. The application executable by the processor 301 can comprise a browser application, such as the SAFARI® internet browser application, or the CHROME® internet browser application, for example. The browser application can request and display an application served by a server, such as the PS 130. As an example, the browser application can comprise a registration application by which a user of the DD 300 can register an MD or EST with the PS 130. As another example, the browser application can comprise an application by which the DD 300 can display a notification generated by the PS 130 for the person using the DD 300.

The system data 311 can comprise registration data for registering the DD 300 or a person (such as a user of the DD 300) at the PS 130. As an example, the registration data can comprise a mobile identification number (e.g., a telephone number) associated with the DD 300. As another example, the registration data can comprise a user name, an e-mail address, an employee number or some other data associated with a person to be registered. As yet another example, the registration data can comprise data captured from an MD, such as an image of the MD or a multi-dimensional code captured from the MD. As still yet another example, the registration data can comprise a password associated with the DD 300 or an account associated with a person. Registration of the DD 300 or any other DD to an MD can occur at various times during life of a MD, such as while the MD is being installed at a repair shop, after the MD is installed but prior to being used at the repair shop, or after the MD is installed and has been used at the repair shop, for example.

The system data 311 can comprise data received at the transceiver 304 from the PS 130, such as data pertaining to the use of an EST connected to a MD to which the DD 300 is registered. A display application 314 can be executed to cause at least a portion of the system data 311 to be displayed on a display of the UI output components 309. Execution of the display application 314 can cause a GUI to be displayed on the display.

An application within the applications 312 can be downloaded to the DD 300 by way of the transceiver 304. As an example, the transceiver 304 can receive an application downloaded to a transceiver 304 from the APP STORE® online retail store, from the GOOGLE PLAY® online retail store, or another source of the application. As an example, an application can comprise a registration application 313 that is executable to request registration of the DD 300, the MD 12, or an EST connected to the MD 12.

The power supply 306 can be arranged in various configurations. For example, the power supply 306 can receive AC current from an AC electrical supply and convert the AC current to a DC current for supplying to one or more of the components within the DD 300 via the electrical circuit 307. As another example, the power supply 306 can include a battery or be battery operated. As yet another example, the power supply 54 can include a solar cell or be solar operated.

Next, FIG. 19 is a flowchart depicting a set of functions 330 (or more simply "the set 330") that can be carried out in accordance with the example embodiments described in this description. The set 330 includes the functions shown in blocks labeled with whole numbers 331 through 337 inclusive. The following description of the set 330 includes references to elements shown in other figures described in this description, but the functions of the set 330 are not limited to being carried out only by the referenced elements. A variety of methods can be performed using all of the functions shown in the set 330 or any proper subset of the functions shown in the set 330. Any of those methods can be performed with other functions such as one or more of the other functions of the set 200 (shown in FIG. 16) or the set 220 (shown in FIG. 17), a "function pertaining to the set 330" discussed elsewhere in this description, or another function discussed in this description. One or more of the functions shown in the set 330 can be carried out multiple times in performing a method in accordance with the example embodiments.

Block 331 includes receiving a registration application. The DD 300 or a component of the DD 300 (such as the processor 301, the CRM 303, or the transceiver 304) can receive the registration application.

In one respect, the registration application can comprise a web application served by a server (such as the PS 130 acting as a server, or the application server 138). The DD 300, operating as a client, can via the processor 301 execute a browser application to request the registration application from the server. The transceiver 304 can receive the registration application from the server.

In another respect, the registration application can comprise a native application, such as a registration application 313. As an example, the registration application 313 can be stored in the DD 300 at the time the DD 300 is manufactured. As another example, the processor 301 can execute a browser application to request and receive the registration application 313 from the application server 138 via the network 129. The transceiver 304 can receive the registration application 313 and then provide the registration application 313 to the CRM 303 for storage.

The registration application 313 can comprise program instructions executable by the processor 301 to perform one or more functions of the set 330. After the registration application 313 has been stored in the CRM 303, a user can select the registration application 313 to be executed by the DD 300. Execution of the registration application 313 can include the processor 303 initiating the registration application 313. Initiating the registration application can occur in response to selection of an icon representing the registration application 313 from a display of the DD 300. The icon can be one of several displayed icons representing multiple applications that can be initiated and executed by the processor 301. Initiating the registration application 313 can include outputting a GUI to the display of the DD 300. The GUI can comprise a menu with multiple selectors pertaining to registration of an MD (e.g., the GUI 355 shown in FIG. 23). The processor 301 can continue to execute the registration application after initiation of the registration application until such time that a user selects to end execution of the registration application (e.g., by selection of an end selector).

Figure 22:
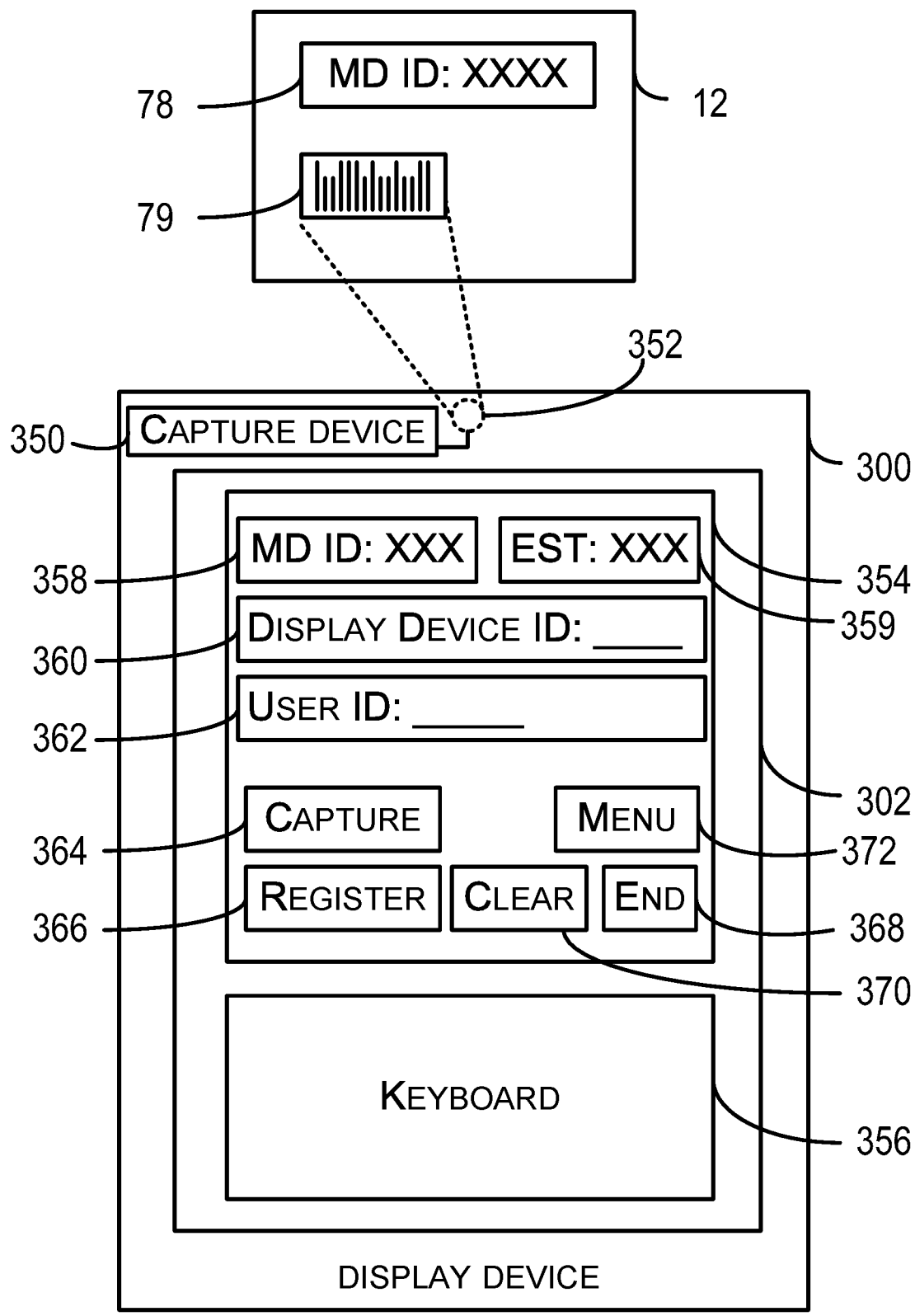
FIG. 22, FIG. 23, and FIG. 24 depict an example display device with a graphical user interface (GUI).

Next, FIG. 22 shows details of the DD 300 and the MD 12 in accordance with an example embodiment. The MD 12 can include a visible MD identifier that uniquely identifies the MD 12, such as a visible MD identifier 78 or 79. The MD identifier 78 includes an alpha-numeric identifier of the MD 12. The MD identifier 78 or 79 can be permanently or temporarily associated with the MD 12. A temporary MD identifier can be provided to the MD 12 and displayed on the display 75 during the process of registering the MD 12. The MD identifier 79 comprises a multi-dimensional code indicative of the MD 12. The multi-dimensional code can comprise a two-dimensional bar code, a data matrix code (e.g., a quick response (QR) code), or some other multi-dimensional code. One or more of the MD identifiers 78 and 79 can comprise an adhesive label with the MD identifier printed onto the label. One or more of the MD identifiers 78 and 79 can comprise a metal tag with the MD identifier printed, etched or otherwise applied to the metal tag. Other examples of a visible MD identifier are possible.

As shown in FIG. 22, the DD 300 comprises a capture device 350 (e.g., a scanner or a camera). The capture device 350 can be connected to the processor 304 shown in FIG. 20. The capture device 350 can comprise or be connected to a lens 352 that allows light reflecting from the visible MD identifier 78, the visible MD identifier 79, or some other object to be received at an image sensor of the capture device 350. A data file representative of a captured image can be stored in the system data 311.

The UI output components 309 can comprise a display that displays a GUI 354 and keyboard 356. The GUI 354 can comprise the keyboard 356. The GUI 354 can display one or more data fields. For example, the GUI 354 can display an MD ID data field 358, an EST data field 359, a display device ID data field 360, or a user ID data field 362. The MD ID data field 358 can display an ID of the MD 12 entered via the keyboard 356 or captured by the capture device 350. The EST data field 359 can display an ID of the type of EST connected to the MD 12. The display device ID data field 360 can display an ID of a display device (e.g., a display device for receiving notifications regarding the registered MD) entered via the keyboard 356 or read from the CRM 303. The user ID data field 362 can display an identifier of a person entered via the keyboard 356 or read from the CRM 303. The person, for example, can be an owner or employee affiliated with a repair shop at which the MD 12 and an EST connected to the MD 12 are located. The identifier of the person can comprise that person's name or an account associated with that person, such as an e-mail message account.

The GUI 354 can display various selectors. The processor 304 can determine selection of a display selector has occurred and responsively perform one or more functions associated with the selector. As an example, the selectors displayed on the GUI 354 can comprise a capture selector 364, a register selector 366, an end selector 368, a clear selector 370, or a menu selector 372. A function associated with the capture selector 364 comprises capturing an image or scanned representation of an MD identifier. A function associated with the register selector 366 is transmitting, by the transceiver 304, a registration request to the PS 130 for registering the MD 12. The registration request can comprise data entered into the MD ID data field 358, the display device ID data field 360, or the user ID data field 362. A function associated with the end selector 368 comprises ending execution of the registration application 313. A function associated with the clear selector 370 is clearing data displayed in one or more of the data fields (e.g., the MD ID data field 358, the display device ID data field 360, or the user ID data field 362). Afterwards, different data can be entered into the field whose data was cleared. A function associated with the menu selector 372 is switching the DD 300 to display a menu (e.g., the menu shown in FIG. 23).

Figure 23:
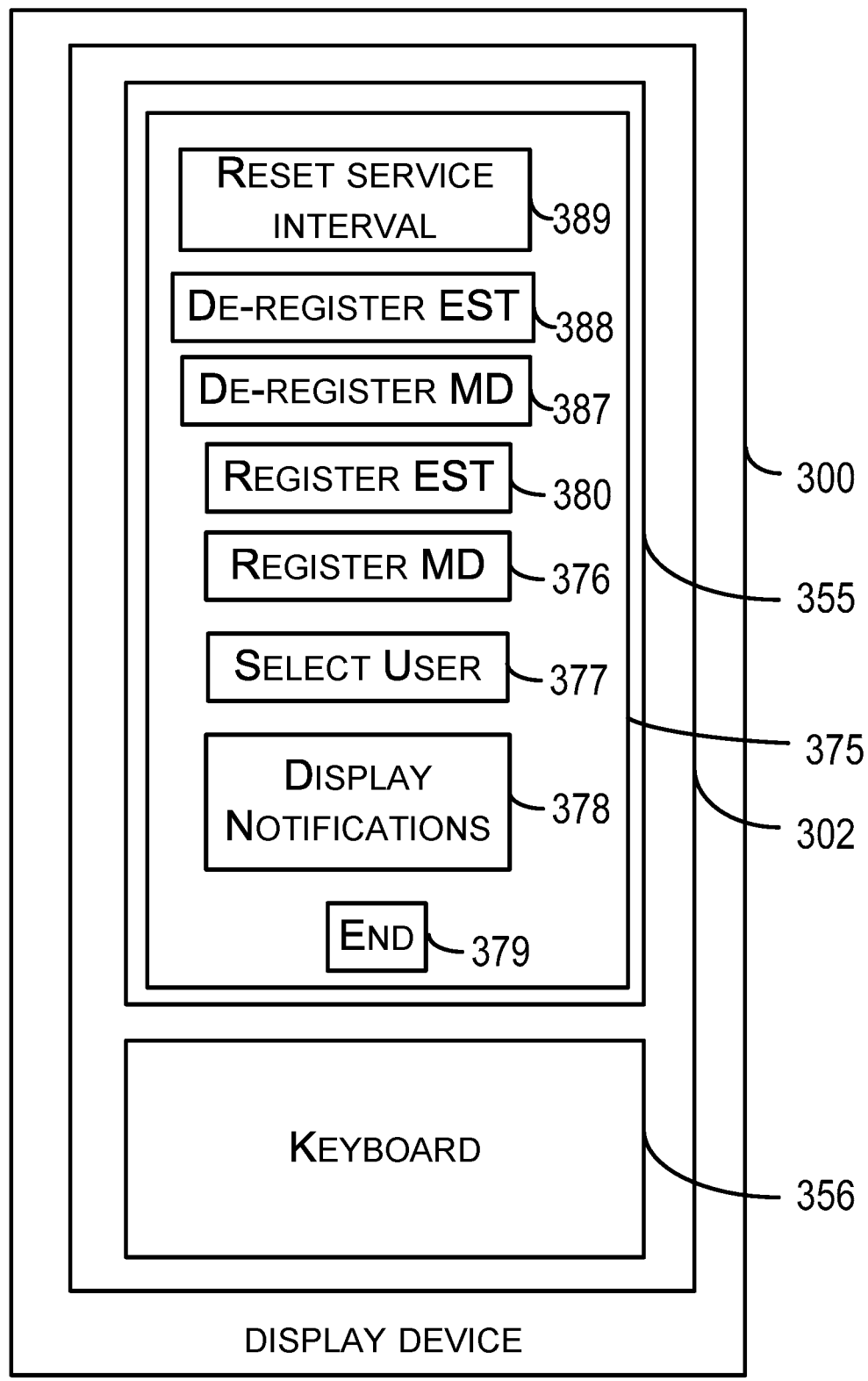

Turning to FIG. 23, the figure shows the user interface 302 of the DD 300 displaying a GUI 355. The GUI 355 displays a menu 375 and the keyboard 356. The menu 375 can be displayed during or in response to initiating the registration application 313. The menu 375 can also be displayed after initiation of the registration application 313, such as after selection of the menu selector 372. The menu 375 can display various selectors. The processor 304 can determine selection of a selector displayed in the menu 375 has occurred and responsively perform one or more functions associated with the selector. As an example, the menu selectors can comprise at least one of: a register MD selector 376, a select user selector 377, a display notifications selector 378, a register EST selector 380, a de-register MD selector 387, a de-register EST 388 selector, and a reset service interval selector 389.

Figure 24:
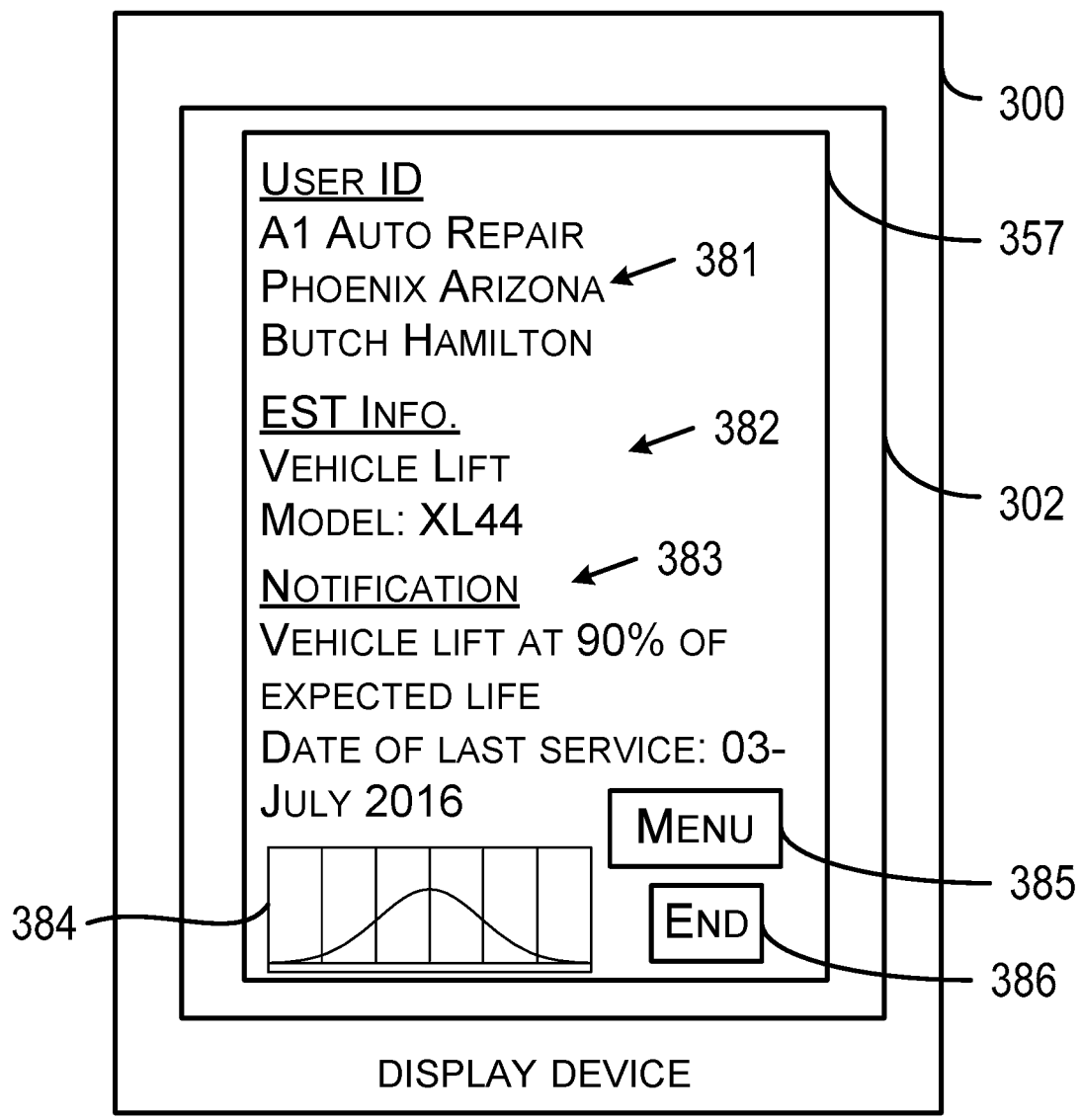

A function associated with each of those selectors comprises switching the contents displayed on the display of the user interface 302. Upon determining the register MD selector 376 has been selected, the user interface 302 can, for example, switch to displaying the GUI 354 and the MD ID data field 358. Upon determining the select user selector 377 has been selected, the user interface 302 can, for example, switch to displaying the GUI 354 and the user ID data field 362. Upon determining the display notifications selector 378 has been selected, the user interface 302 can, for example, switch to displaying a GUI 357 and notifications (as shown in FIG. 24). Upon determining the register EST selector 380 has been selected, the user interface 302 can, for example, switch to displaying a GUI with fields for entering registration information regarding an EST. Upon determining the de-register MD selector 387 has been selected, the user interface 302 can, for example, switch to displaying a GUI providing a selector to cause a registered MD to become de-registered. Upon determining the de-register EST 388 selector has been selected, the user interface 302 can, for example, switch to displaying a GUI providing a selector to cause a registered EST to become de-registered. Upon determining the register reset service interval selector 389 has been selected, the user interface 302 can, for example, switch to displaying a GUI to allow a user to reset a service interval for a particular EST. The menu 375 can include an end selector 379. A function associated with the end selector 379 comprises ending execution of the registration application 313.

Although FIG. 23 shows selectors described as being displayed after initiation of the registration application 313, during an instance of executing the registration application 313, the processor 152 could perform functions other than registering an MD or EST, such as displaying notifications, de-registering an MD or an EST or resetting a service interval for an EST.

Turning to FIG. 24, the user interface 302 of the DD 300 is shown displaying a GUI 357. The GUI 357 can be displayed by the DD 300 after the MD 12 has been registered, the MD 12 has provided data to the PS 130, and the PS 130 has determined a notification with respect to the MD 12. The GUI 357 displays user identification information 381, EST information 382, notifications 383, a notifications graph 384, a menu selector 385, and an end selector 386. The user identification information 381 can, for example, comprise a name of a repair shop (e.g., "A1 Auto Repair") at which the MD 12 is located, a geographical location reference (e.g., Phoenix, Ariz., or a GPS location), and a name of a person affiliated with the repair ship (e.g., Butch Hamilton). The EST information 382 can, for example, comprise information that identifies the type of EST connected to the MD 12 (e.g., a vehicle lift) and a model number of the EST (e.g., model XL 44). The notification 383 can comprise any notification the PS 130 determined with respect to the MD 12 or the EST connected to the MD 12. As an example, the notification 383 can indicate an expected life expectancy of the EST connected to the MD 12 or a date indicating the last time the EST was serviced. The notifications graph 384 can, for example, include a graph representing an aggregate measurement or a time series analysis performed by the PS 130. A function associated with the menu selector 385 is switching the DD 300 to display a menu (e.g., the menu shown in FIG. 23). A function associated with the end selector 386 comprises ending execution of the registration application 313.

Returning to FIG. 21, block 332 comprises receiving input to request registration of an MD at the PS 130. Receiving the input to request registration of the MD can comprise the processor 301 determining an icon representing the registration application 313 has been selected. Receiving the input to request registration of the MD can include displaying the GUI 355 including the register MD selector 376, and the processor 301 determining selection of the register MD selector 376 has occurred.

Next, block 333 comprises determining, a registration input to associate with the MD. The processor 301 may determine the registration input by determining data entered into a data field displayed in the GUI 354. For instance, the processor 301 may determine information regarding the EST connected to the MD or an MD that is to be connected to the MD, the information indicating the owner or employee affiliated with a repair shop at which the MD 12 and an EST connected to the MD 12 are located, or the information indicating the display device at which notifications regarding the EST or the registered MD are to be sent. The processor 301 may determine the information input into any of those fields is associated with the MD by determining which MD is identified in the MD ID data field 358.

Next, block 334 comprises determining an MD ID of the MD. As an example, the processor 301 determines the MD ID by receiving an image of the visible MD ID 78 or the visible MD ID 79 from the capture device 332 and performing optical character recognition of the image or converting the multi-dimensional code of the MD ID. As another example, the processor 301 determines the MD ID from data entered using the UI input components 308. For instance, the MD ID can be entered by typing the MD ID on the keyboard 338 as a cursor in located within the MD ID data field 340. As yet another example, the MD 12 can transmit its MD identifier to the transceiver 304 of the DD 300. The processor can store the MD ID in the CRM 303 (e.g., as part of the system data 311).

Next, block 335 comprises outputting a registration request for the MD to be registered at the PS 130. The registration request comprises a registration input (e.g., the registration input determined at block 333) and an MD identifier (e.g., the MD identifier determined at block 334). Accordingly, the registration request can comprise data displayed within the data fields of the GUI 354. For example, the registration input can comprise the information regarding the type of EST connected or connectable to the MD, and the contact information associated with or to be associated with the MD. The contact information can include the display device identifier or information regarding the person affiliated with the repair shop. The type of EST connectable to the MD would typically be a type of EST expected to be connected to the MD for situations in which the MD is registered at the remote processing system prior to connecting an EST of that type to the MD.

Outputting the registration request can comprise the processor 301 transmitting the registration request to the transceiver 304 and the transceiver 304 transmitting the registration request over the network 129 to the PS 130. For an embodiment in which the transceiver 304 is part of the processor 301, outputting the registration can request the processor 301 outputting the registration request directly to the network 129 for transmission to the PS 130. The registration request can comprise a destination address of the PS 130 and a source address of the DD 300. The transceiver 153 can receive the registration request transmitted over the network 129 and can provide the registration request or content of the registration request to the processor 152 for registering the MD.

Next, block 336 comprises registering the MD at the PS 130. Registering the MD at the PS 130 can include the PS 130 receiving the registration request, determining the MD ID for the MD and the EST associated with or to be associated with the MD, and storing at least a portion of the information within the registration request into the registration data 357. Another function of the set 330 includes the PS 130 transmitting to the DD 300 over the network 129 a notification indicating that the MD device has been registered.

Next, block 337 comprises receiving a notification the MD device has been registered. The notification can be received by the transceiver 304, provided to the processor 301, and output by the processor 301 to a display of the UI output components 309. The notification can be displayed on the display.

Registering the MD allows the PS 130 to subsequently determine notifications with respect to the MD or an EST connected to the MD based on measurements the MD transmits to the PS 130 and to send the notifications to a display device associated with the MD or to a user account of a user associated with the registered MD. Additionally, a salesperson may have responsibilities with respect to multiple repair shops that include one or more registered MD and with respect to the EST connected to those registered MD. The notifications sent to the display device associated with the MD can also be sent to the salesperson's display device so that the salesperson can view the notifications sent to multiple display devices associated with the registered MDs.

A DD can be associated with a particular type of EST built or sold by a particular business entity. That DD can further be associated with a particular geographic area such that the DD receives notifications pertaining to the particular type of EST within the particular geographic area. For example, the particular type of EST can be brake lathes sold by Snap-on® and located within Chicago, Ill. and surrounding counties in Illinois known as Kane county and Lake Country.

V. Example Computing Systems

As described above, the computing systems described herein can be any of a number of different types of computing systems. FIG. 23 is a functional block diagram illustrating an example computing system 450 used in a computing system that is arranged in accordance with at least some embodiments described herein. In a basic configuration 451, the computing system 450 can typically include one or more processors 452 and system memory 454. A memory bus 459 can be used for communicating between the processor 452 and the system memory 454. Depending on the desired configuration, processor 452 can be of any type including but not limited to a microprocessor (µP), a microcontroller (µC), a digital signal processor (DSP), or any combination thereof. A memory controller 453 can also be used with the processor 452, or in some implementations, the memory controller 453 can be an internal part of the processor 452.

Depending on the desired configuration, the system memory 454 can be of any type including but not limited to volatile memory (such as RAM), non-volatile memory (such as ROM, flash memory, etc.) or any combination thereof. System memory 454 can include one or more applications 455, and program data 457. The application 455 can include an algorithm 456 that is arranged to perform the functions described as being performed by execution of the CRPI 71, 156, or 310 or other functions described in this description. The program data 457 can include system data 458 that can be directed to any number of types of data, such as one more of the following types of data: the measurement data 72, the timing data 73, the MD ID 74, the registration data 157, the reference data 158, the measurement data 159, the analyzed measurement data 160, the MD software updates 161, or the system data 311. In some example embodiments, the applications 455 can be arranged to operate with the program data 457 on an operating system executable by the processor 452.

The computing system 450 can comprise additional features or functionality, and additional interfaces to facilitate communications between the basic configuration 451 and any devices and interfaces. For example, data storage devices 460 can be provided including removable storage devices 461, non-removable storage devices 462, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable program instructions, data structures, program modules, applications, or other data such as the aspects described as being stored in the CRM 51, the CRM 154, and the CRM 303.

The system memory 454 and the storage devices 460 are examples of a CRM. The system memory 454 and the storage devices 460 can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 450. The CRM 51, the CRM 154, or the CRM 303 can comprise the system memory 454 or the storage devices 460.

The computing system 450 can include or be implemented as a portion of a small-form factor portable (i.e., mobile) electronic device such as a smartphone (e.g., an IPHONE® smartphone from Apple Inc. of Cupertino, Calif., or a GALAXY S® smartphone from Samsung Electronics Co., Ltd. Of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The CRPI 71, 156, or 310, the application 455, or the program data 457 can include an application downloaded to a transceiver 55, 153, or 304, or the communication interfaces 467 from the APP STORE® online retail store, from the GOOGLE PLAY® online retail store, or another source of the applications or the CRPI described herein.

Figure 26:
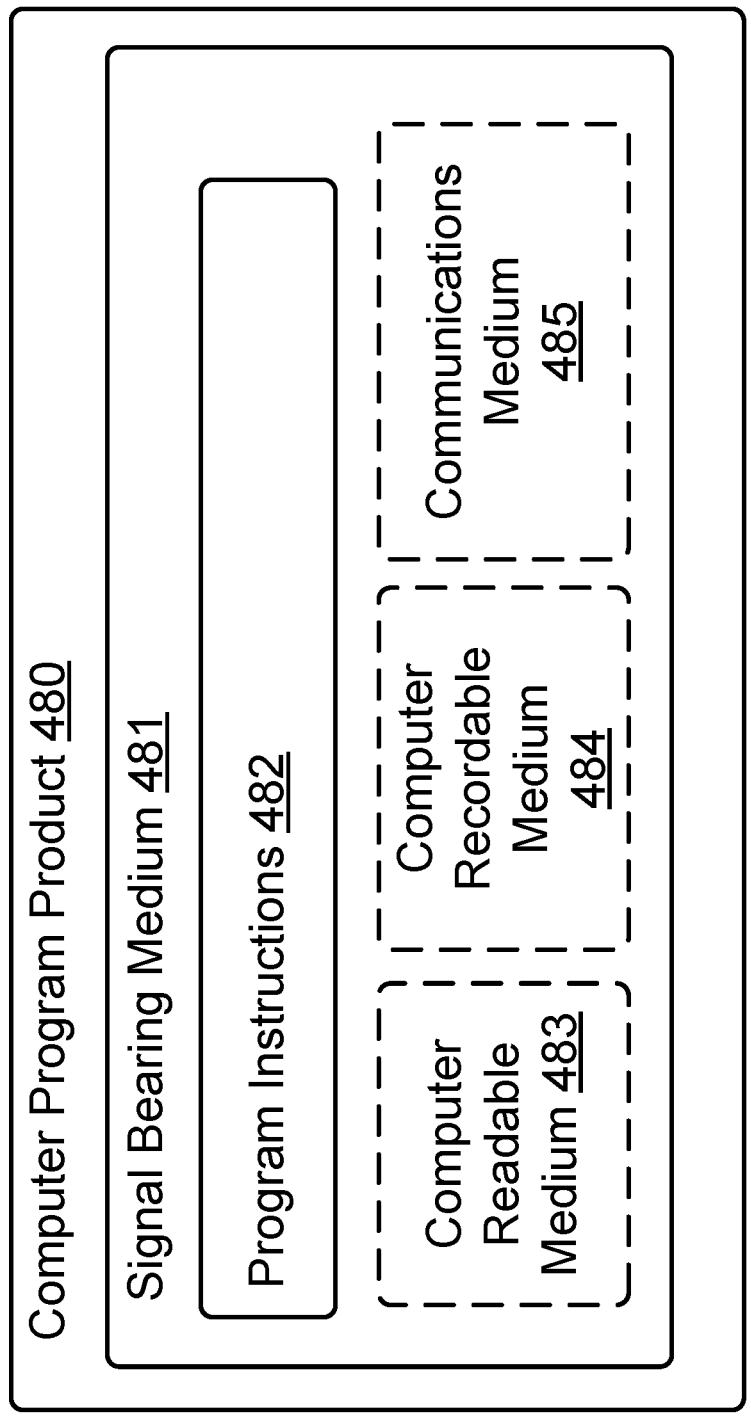
FIG. 26 is a schematic illustrating a conceptual partial view of a computer program product for executing a computer process on a computing system, according to an example embodiment.

Additionally or alternatively, the computing system 450 can include or be implemented as a personal computing system (including both laptop computer and non-laptop computer configurations), or a server. In some embodiments, the disclosed methods can be implemented as CRPI encoded on a non-transitory computer-readable storage media in a machine-readable format, or on other non-transitory media or articles of manufacture. FIG. 26 is a schematic illustrating a conceptual partial view of an example computer program product 480 that includes a computer program for executing a computer process on a computing system, arranged according to at least some embodiments presented herein.

The computing system 450 can also include output interfaces 463 that can include a graphics processing unit 464, which can be configured to communicate to various external devices such as display devices 466 or speakers via one or more A/V ports 465 or a communication interface 467. The communication interface 467 can include a network controller 468, which can be arranged to facilitate communications with one or more other computing systems 470 over a network communication via one or more communication ports 469. The communication connection is one example of a communication media. Communication media can be embodied by computer-readable program instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In one embodiment, the example computer program product 480 is provided using a signal bearing medium 481. The signal bearing medium 481 can include one or more programming instructions 482 that, when executed by one or more processors can provide functionality or portions of the functionality described above with respect to FIGS. 1-13. In some examples, the signal bearing medium 481 can encompass a CRM 483, such as, but not limited to, a hard disk drive, a Compact Disc (CD), a Digital Video Disk (DVD), a digital tape, or any other CRM described herein. In some implementations, the signal bearing medium 481 can encompass a computer recordable medium 484, such as, but not limited to, memory, read/write (R/W) CDs, R/W DVDs, etc. In some implementations, the signal bearing medium 481 can encompass a communications medium 485, such as, but not limited to, a digital or an analog communication medium (e.g., a fiber optic cable, a waveguide, a wired communications link, a wireless communication link, etc.). Thus, for example, the signal bearing medium 481 can be conveyed by a wireless form of the communications medium 485 (e.g., a wireless communications medium conforming to the IEEE 802.11 standard or another transmission protocol).

The one or more programming instructions 482 can be, for example, computer executable or logic implemented instructions. In some examples, a computing system such as the computing system 450 of FIG. 25 can be configured to provide various operations, functions, or actions in response to the programming instructions 482 conveyed to the computing system 450 by one or more of the CRM 483, the computer recordable medium 484, or the communications medium 485.

One or more of the processors 53, 152, or 301 can be configured as the processor 452. One or more of the CRM 51, 154, or 303 can be configured as part of or all of the system memory 454 or the storage devices 460. The user interface 302 can be configured as part of or all of the output interfaces 463 and the display device(s) 466. One or more of the transceivers 55, 153, or 304 can be configured as part of or all of the communication interfaces 467.

VI. Definitions and Conclusions

In this description, the articles "a," "an," or "the" are used to introduce elements of the example embodiments. The intent of using those articles is that there is one or more of the elements. In this description, the intent of using the term "or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising "A, B, or C," or "at least one of A, B, and C," or "one or more of A, B, and C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise.

In this description, the terms "data," "information," and "content" are used interchangeably. The data can be transmitted and received. As an example, the transmission of the data can occur directly from a transmitting device (e.g., a transmitter) to a receiving device (e.g., a receiver). As another example, the transmission of the data can occur indirectly from the transmitter to a receiver via one of one or more intermediary network devices, such as an access point, an antenna, a base station, a hub, a modem, a relay, a router, a switch, or some other network device. The transmission of the data can include transmitting the data over an air interface (e.g., using radio signals (i.e., wirelessly)). The transmission of the data can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates.

The data can comprise a set of images. A transceiver can transmit or receive a set of images. Each image of a set of images can comprise a respective image file, such as a file with a "JPEG" extension (i.e., a JPEG file). The set of images can comprise multiple images arranged as a video. Each video can comprise a respective video file, such as a file with an "MPEG" extension (i.e., an MPEG file). Transmission of a video can be referred to as "streaming a video." Streaming a video can occur using a real-time transport protocol (RTP) or some other protocol.

This description refers to a vehicle and a vehicle repair shop. A vehicle is a mobile machine that can be used to transport a person, people, or cargo. Any vehicle described herein can be driven or otherwise guided along a path (e.g., a paved road or otherwise) on land, in water, in the air, or in outer space. Any vehicle described herein can be wheeled, tracked, railed, or skied. Any vehicle described herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As an example, a vehicle guided along a path can include a van (such as a dry or refrigerated van), a tank trailer, a platform trailer, or an automobile carrier. Any vehicle described herein can include or use any appropriate voltage or current source, such as a battery, an alternator, a fuel cell, and the like, providing any appropriate current or voltage, such as about 12 volts, about 42 volts, or the like. Any vehicle described herein can include or use any desired system(s) or engine(s) to provide its mobility. Those system(s) or engine(s) can include vehicle components that use fossil fuels, such as gasoline, natural gas, propane, or the like, electricity, such as that generated by a battery, magneto, fuel cell, solar cell or the like, wind and hybrids or combinations thereof. Any vehicle described herein can include at least one of an electronic control unit (ECU), a data link connector (DLC), and a vehicle communication link that connects the DLC to the ECU.

Some vehicles can be identified by characteristics of the vehicle such as when the vehicle was built (e.g., a vehicle model year), who built the vehicle (e.g., a vehicle make), marketing names associated with vehicle (e.g., a vehicle model name, or more simply "model"), and features of the vehicle (e.g., an engine type). The intent of using an abbreviation YMME or Y/M/M/E is that each letter in the order shown represents a model year, vehicle make, vehicle model name, and engine type, respectively. The intent of using an abbreviation YMM or Y/M/M is that each letter in the order shown represents a model year, vehicle make, and vehicle model name, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Mich.

Example embodiments have been described above and relate to one of the enumerated example embodiment (EEEs) listed below. Those skilled in the art will understand that changes and modifications can be made to the described embodiments without departing from the true scope and spirit of the present invention, which is defined by the claims.

EEE A1 is a system for reporting data pertaining to an actionable condition of an electrical shop tool, the system comprising: a sensor to output or generate a sensor signal pertaining to use of the electrical shop tool; at least one processor to periodically sample the sensor signal; a non-transitory computer-readable medium to store data values based on the sensor signal sampled by the at least one processor; and a first network transceiver to transmit the data values based on the sensor signal sampled by the at least one processor to a network for transmission to a processing system for determining an actionable condition of the electrical shop tool based on the transmitted data values.

EEE A2 is the system of EEE A1, wherein the at least one processor is configured to determine a sampled sensor signal value for each periodic sample of the sensor signal, and wherein the at least one processor is configured to scale the sampled sensor signal values using a linear scale to determine the data values based on the sensor signal sampled by the at least one processor or using a non-linear scale to determine the data values based on the sensor signal sampled by the at least one processor.

EEE A3 is the system of EEE A1, wherein the at least one processor determines a sampled sensor signal value for each periodic sample of the sensor signal, and wherein the at least one processor is configured to scale the sampled sensor signal values using a non-linear scale to determine the data values based on the sensor signal sampled by the at least one processor.

EEE A4 system of EEE A1, wherein the sensor signal represents a detected position, velocity, acceleration, or jerk, wherein the at least one processor is configured to determine a sampled sensor signal value for each periodic sample of the sensor signal, and wherein the at least one processor is configured to summarize the sampled sensor signal values into an array.

EEE A5 system of EEE A1, wherein the sensor includes a first current transformer including a first conductive coil with a first transformer lead and a second transformer lead, wherein the first conductive coil is configured with a central passageway through which a conductor carrying alternating current to or from the electrical shop tool can pass, and wherein the sensor signal represents a voltage differential across the first transformer lead and the second transformer lead.

EEE A6 system of EEE A5, wherein the at least one processor determines an amperage value corresponding to each voltage differential sample, and wherein the stored data values represent the amperage values determined by the at least one processor.

EEE A7 system of EEE A5 or A6, wherein the conductor is an alternating current hot wire.

EEE A8 system of EEE A5 or A6, wherein the conductor is an alternating current neutral wire.

EEE A9 system of any one of EEEs A1-A8, wherein the electrical shop tool comprises a vehicle lift, a wheel balancer, a brake lathe, an air compressor, a tire changer machine, a brake dynamometer, a fluid flushing machine, a battery charger, a vehicle frame straightening machine, an air conditioning service machine, or a vehicle exhaust pipe bending machine.

EEE A10 system of any one of EEEs A1-A8, wherein the electrical shop tool comprises a vehicle lift.

EEE A11 system of any one of EEEs A1-A8, wherein the electrical shop tool comprises a wheel balancer.

EEE A12 system of any one of EEEs A1-A8, wherein the electrical shop tool comprises a brake lathe.

EEE A13 system of any one of EEEs A1-A8, wherein the electrical shop tool comprises an air compressor.

EEE A14 system of any one of EEEs A1-A8, wherein the electrical shop tool comprises a tire changer machine.

EEE A15 system of any one of EEEs A1-A8, wherein the electrical shop tool comprises a brake dynamometer.

EEE A16 system of any one of EEEs A1-A8, wherein the electrical shop tool comprises a fluid flushing machine.

EEE A17 system of any one of EEEs A1-A8, wherein the electrical shop tool comprises a battery charger.

EEE A18 system of any one of EEEs A1-A8, wherein the electrical shop tool comprises a vehicle frame straightening machine.

EEE A19 system of any one of EEEs A1-A8, wherein the electrical shop tool comprises an air conditioning service machine.

EEE A20 system of any one of EEEs A1-A8, wherein the shop electrical equipment comprises a vehicle exhaust pipe bending machine.

EEE A21 system of any one of EEEs A1-A20, further comprising: a substrate; and a power supply to receive an alternating current as an input and to output a direct current to the at least one processor and the first network transceiver, wherein the power supply, the at least one processor, and the first network transceiver are mounted on the substrate and connected to each other.

EEE A22 system of any one of EEEs A1-A20, further comprising: a substrate; and a housing, wherein the at least one processor, the computer-readable medium, and the first network transceiver are mounted on the substrate, and wherein the substrate, the at least one processor, the computer-readable medium, and at least a portion of the transceiver are located within the housing.

EEE A23 system of any one of EEEs A1-A22, further comprising: a real-time clock to output timing signals for use by the at least one processor to perform at least one of the following functions: (i) determine when to sample the sensor signal, (ii) record a time when each data value indicating a sampled sensor signal was sampled, and (iii) determine when the first network transceiver is to transmit data indicating the sampled sensor signal.

EEE A24 system of any one of EEEs A1-A23, wherein the non-transitory computer-readable medium comprises program instructions executable by the at least one processor to cause the first network transceiver to request time information from a remote device comprising a second network transceiver, and to use the time information as a basis to perform at least one of the following functions: (i) determine when to sample the sensor signal, (ii) record a time when each data value indicating a sampled sensor signal was sampled, and (iii) determine when the first network transceiver is to transmit data indicating the sampled sensor signal.

EEE A25 system of any one of EEEs A1-A24, wherein the first network transceiver transmits the data values stored during a preceding time interval at a next transmission time occurring at an end of the preceding time interval if at least one data value stored during the preceding time interval represents a current flow to the motor exceeded 0.0 amperes.

EEE A26 system of any one of EEEs A1-A24, wherein the first network transceiver transmits the data values stored during a most-recent data collection period upon a maximum report-to-report time has elapsed.

EEE A27 system of any one of EEEs A1-A24, wherein the at least one processor postpones the first network transceiver transmitting the data values stored during at least one preceding time interval at a next transmission time occurring at an end of each of the at least one preceding time interval if each data value stored during stored during each of the at least one preceding time interval represents a current flow to the motor was 0.0 amperes, wherein the first network transceiver transmits the data values stored during a next preceding time interval at a next transmission time occurring at an end of the next preceding time interval if at least one data value stored during stored during the next preceding time interval represents a current flow to the motor exceeded 0.0 amperes, and wherein the next preceding time interval occurs immediately after the at least one preceding time interval.

EEE A28 system of any one of EEEs A1-A27, further comprising: the processing system, wherein the processing system comprises at least a second processor, at least a second computer-readable data storage device, and a second network transceiver to receive the data values transmitted by the first network transceiver, wherein the at least the second processor is configured to determine at least one actionable condition of the electrical shop tool based on the data values transmitted by the first network transceiver.

EEE A29 system of EEE A28, wherein the at least the second processor is configured to cause the second network transceiver to transmit notification of the at least one actionable condition to at least one destination associated with the electrical shop tool.

EEE A30 system of EEE A28, wherein the electrical shop tool comprises a vehicle lift, and wherein the at least one actionable condition indicates the vehicle lift has been raised at least a threshold number of times since installation of the vehicle lift or a prior servicing of the vehicle lift.

EEE A31 is the system of EEE A5, wherein the first network transceiver transmits a device identifier and at least one time indicator along with the transmitted data values, wherein the device identifier is associated with at least one of the electrical shop tool and a device including a substrate on which the first current transformer, the at least one processor, and the first network transceiver are mounted, and wherein the at least one time indicator is associated with the transmitted data values.

EEE A32 is the system of any one of EEEs A1-A31, wherein the electrical shop tool comprises at least one electrical motor.

EEE A33 is the system of any one of EEEs A1-A32, wherein the electrical shop tool comprises at least one pump.

EEE A34 is the system of any one of EEEs A1-A32, wherein the electrical shop tool does not include an electrical motor and a pump.

EEE A35 is the system of any one of EEEs A1-A34, wherein the transmitted data values represent use of the electrical shop tool during one or more time periods occurring prior to transmission of the data values.

EEE A36 is the system of EEE A35, wherein the transmitted data values further represent non-use of the electrical shop tool during one or more time periods occurring prior to transmission of the data values.

EEE A37 is a method for reporting data pertaining to an actionable condition of an electrical shop tool, the method comprising: sampling, periodically by at least one processor, a sensor signal generated or output by a sensor pertaining to use of the electrical shop tool; storing, at a non-transitory computer-readable medium, data values based on the sensor signal sampled by the at least one processor; and transmitting, by a transceiver, the data values based on the sensor signal sampled by the at least one processor to a network for transmission to a processing system for determining an actionable condition of the electrical shop tool based on the transmitted data values.

EEE A38 is the method of EEE A37, further comprising: determining, by the at least one processor, a sampled sensor signal value for each periodic sample of the sensor signal, and scaling, by the at least one processor, the sampled sensor signal values using a linear scale to determine the data values based on the sensor signal sampled by the at least one processor or using a non-linear scale to determine the data values based on the sensor signal sampled by the at least one processor.

EEE A39 is the method of EEE A37, further comprising: determining, by the at least one processor, a sampled sensor signal value for each periodic sample of the sensor signal, and scaling, by the at least one processor, the sampled sensor signal values using a non-linear scale to determine the data values based on the sensor signal sampled by the at least one processor.

EEE A40 is the method of EEE A37, wherein the sensor signal represents a detected position, velocity, acceleration, or jerk, wherein the method further comprises: determining, by the at least one processor, a sampled sensor signal value for each periodic sample of the sensor signal, and summarizing the sampled sensor signal values into an array.

EEE A41 is the method of EEE A37, wherein the sensor includes a first current transformer including a first conductive coil with a first transformer lead and a second transformer lead, wherein the first conductive coil is configured with a central passageway through which a conductor carrying alternating current to or from the electrical shop tool can pass, and wherein the sensor signal represents a voltage differential across the first transformer lead and the second transformer lead.

EEE A42 is the method of EEE A41, further comprising: determining, by the at least one processor, an amperage value corresponding to each voltage differential sample, and wherein the stored data values represent the amperage values determined by the at least one processor.

EEE A43 is the method of EEE A41 or A42, wherein the conductor is an alternating current hot wire.

EEE A44 is the method of EEE A41 or A42, wherein the conductor is an alternating current neutral wire.

EEE A45 is the method of any one of EEEs A37-A44, wherein the electrical shop tool comprises a vehicle lift, a wheel balancer, a brake lathe, an air compressor, a tire changer machine, a brake dynamometer, a fluid flushing machine, a battery charger, a vehicle frame straightening machine, an air conditioning service machine, or a vehicle exhaust pipe bending machine.

EEE A46 is the method of any one of EEEs A37-A44, wherein the electrical shop tool comprises a vehicle lift.

EEE A47 is the method of any one of EEEs A37-A44, wherein the electrical shop tool comprises a wheel balancer.

EEE A48 is the method of any one of EEEs A37-A44, wherein the electrical shop tool comprises a brake lathe.

EEE A49 is the method of any one of EEEs A37-A44, wherein the electrical shop tool comprises an air compressor.

EEE A50 is the method of any one of EEEs A37-A44, wherein the electrical shop tool comprises a tire changer machine.

EEE A51 is the method of any one of EEEs A37-A44, wherein the electrical shop tool comprises a brake dynamometer.

EEE A52 is the method of any one of EEEs A37-A44, wherein the electrical shop tool comprises a fluid flushing machine.

EEE A53 is the method of any one of EEEs A37-A44, wherein the electrical shop tool comprises a battery charger.

EEE A54 is the method of any one of EEEs A37-A44, wherein the electrical shop tool comprises a vehicle frame straightening machine.

EEE A55 is the method of any one of EEEs A37-A44, wherein the electrical shop tool comprises an air conditioning service machine.

EEE A56 is the method of any one of EEEs A37-A44, wherein the shop electrical equipment comprises a vehicle exhaust pipe bending machine.

EEE A57 is the method of any one of EEEs A37-A56, wherein a power supply, the at least one processor, and the first network transceiver are connected to each other and mounted on a substrate, wherein the method further comprises: receiving, by the power supply, an alternating current as an input, and outputting, by the power supply, a direct current to the at least one processor and the first network transceiver.

EEE A58 is the method of any one of EEEs A37-A57, further comprising: outputting, by a real-time clock, timing signals for use by the at least one processor to perform at least one of the following functions: (i) determine when to sample the sensor signal, (ii) record a time when each data value indicating a sampled sensor signal was sampled, and (iii) determine when the first network transceiver is to transmit data indicating the sampled sensor signal.

EEE A59 is the method of any one of EEEs A37-A58, wherein the non-transitory computer-readable medium comprises program instructions executable by the at least one processor to cause the first network transceiver to request time information from a remote device comprising a second network transceiver, and to use the time information as a basis to perform at least one of the following functions: (i) determine when to sample the sensor signal, (ii) record a time when each data value indicating a sampled sensor signal was sampled, and (iii) determine when the first network transceiver is to transmit data indicating the sampled sensor signal.

EEE A60 is the method of any one of EEEs A37-A59, further comprising: transmitting, by the first network transceiver, the data values stored during a preceding time interval at a next transmission time occurring at an end of the preceding time interval if at least one data value stored during the preceding time interval represents a current flow to the motor exceeded 0.0 amperes.

EEE A61 is the method of any one of EEEs A37-A59, further comprising: transmitting, by the first network transceiver, the data values stored during a most-recent data collection period upon a maximum report-to-report time has elapsed.

EEE A62 is the method of any one of EEEs A37-A59, wherein the at least one processor postpones the first network transceiver transmitting the data values stored during at least one preceding time interval at a next transmission time occurring at an end of each of the at least one preceding time interval if each data value stored during stored during each of the at least one preceding time interval represents a current flow to the motor was 0.0 amperes, wherein the first network transceiver transmits the data values stored during a next preceding time interval at a next transmission time occurring at an end of the next preceding time interval if at least one data value stored during stored during the next preceding time interval represents a current flow to the motor exceeded 0.0 amperes, and wherein the next preceding time interval occurs immediately after the at least one preceding time interval.

EEE A63 is the method of any one of EEEs A37-A62, wherein the processing system comprises at least one other processor, at least one computer-readable data storage device, and a second network transceiver to receive the data values transmitted by the first network transceiver, the method further comprising: determining, by the at least one other processor, the at least one actionable condition of the electrical shop tool based on the data values transmitted by the first network transceiver.

EEE A64 is the method of EEE A63, further comprising: transmitting, by the second network transceiver, notification of the at least one actionable condition to at least one destination associated with the electrical shop tool.

EEE A65 is the method of EEE A63, wherein the electrical shop tool comprises a vehicle lift, and wherein the at least one actionable condition indicates the vehicle lift has been raised at least a threshold number of times since installation of the vehicle lift or a prior servicing of the vehicle lift.

EEE A66 is the method of EEE A63, further comprising: transmitting, by the first network transceiver, a device identifier and at least one time indicator along with the transmitted data values, wherein the device identifier is associated with at least one of the electrical shop tool and a device including a substrate on which the first current transformer, the at least one processor, and the first network transceiver are mounted, and wherein the at least one time indicator is associated with the transmitted data values.

EEE A67 is the method of any one of EEEs A37-A66, wherein the electrical shop tool comprises at least one electrical motor.

EEE A68 is the method of any one of EEEs A37-A67, wherein the electrical shop tool comprises at least one pump.

EEE A69 is the method of any one of EEEs A37-A67, wherein the electrical shop tool does not include an electrical motor and a pump.

EEE A70 is the method of any one of EEEs A37-A69, wherein the transmitted data values represent use of the electrical shop tool during one or more time periods occurring prior to transmission of the data values.

EEE A71 is the method of EEE A70, wherein the transmitted data values further represent non-use of the electrical shop tool during one or more time periods occurring prior to transmission of the data values.

EEE A72 is a computer readable medium having stored thereon instructions executable by at least one processor to cause a computing system to perform functions comprising: sampling, periodically, a sensor signal generated or output by a sensor pertaining to use of an electrical shop tool; storing data values based on the sensor signal sampled by the at least one processor; and transmitting the data values based on the sensor signal sampled by the at least one processor to a network for transmission to a processing system for determining an actionable condition of the electrical shop tool based on the transmitted data values.

EEE A73 is the computer readable medium of EEE A72, wherein the functions further comprise: determining a sampled sensor signal value for each periodic sample of the sensor signal, and scaling the sampled sensor signal values using a linear scale to determine the data values based on the sampled sensor signal or using a non-linear scale to determine the data values based on the sampled sensor signal.

EEE A74 is the computer readable medium of EEE A72, wherein the functions further comprise determining a sampled sensor signal value for each periodic sample of the sensor signal, and scaling the sampled sensor signal values using a non-linear scale to determine the data values based on the sampled sensor signal.

EEE A75 is the computer readable medium of EEE A72, wherein the sensor signal represents a detected position, velocity, acceleration, or jerk, wherein the functions further comprise: determining a sampled sensor signal value for each periodic sample of the sensor signal, and summarizing the sampled sensor signal values into an array.

EEE A76 is the computer readable medium of EEE A72, wherein the sensor includes a first current transformer including a first conductive coil with a first transformer lead and a second transformer lead, wherein the first conductive coil is configured with a central passageway through which a conductor carrying alternating current to or from the electrical shop tool can pass, and wherein the sensor signal represents a voltage differential across the first transformer lead and the second transformer lead.

EEE A77 is the computer readable medium of EEE A76, wherein the functions further comprise: determining an amperage value corresponding to each voltage differential sample, wherein the stored data values represent the amperage values determined by the at least one processor.

EEE A78 is the computer readable medium of EEE A76 or A77, wherein the conductor is an alternating current hot wire.

EEE A79 is the computer readable medium of EEE A76 or A77, wherein the conductor is an alternating current neutral wire.

EEE A80 is the computer readable medium of any one of EEEs A72-A79, wherein the electrical shop tool comprises a vehicle lift, a wheel balancer, a brake lathe, an air compressor, a tire changer machine, a brake dynamometer, a fluid flushing machine, a battery charger, a vehicle frame straightening machine, an air conditioning service machine, or a vehicle exhaust pipe bending machine.

EEE A81 is the computer readable medium of any one of EEEs A72-A79, wherein the electrical shop tool comprises a vehicle lift.

EEE A82 is the computer readable medium of any one of EEEs A72-A79, wherein the electrical shop tool comprises a wheel balancer.

EEE A83 is the computer readable medium of any one of EEEs A72-A79, wherein the electrical shop tool comprises a brake lathe.

EEE A84 is the computer readable medium of any one of EEEs A72-A79, wherein the electrical shop tool comprises an air compressor.

EEE A86 is the computer readable medium of any one of EEEs A72-A79, wherein the electrical shop tool comprises a tire changer machine.

EEE A86 is the method of any one of EEEs A72-A79, wherein the electrical shop tool comprises a brake dynamometer.

EEE A87 is the computer readable medium of any one of EEEs A72-A79, wherein the electrical shop tool comprises a fluid flushing machine.

EEE A88 is the computer readable medium of any one of EEEs A72-A79, wherein the electrical shop tool comprises a battery charger.

EEE A89 is the computer readable medium of any one of EEEs A72-A79, wherein the electrical shop tool comprises a vehicle frame straightening machine.

EEE A90 is the computer readable medium of any one of EEEs A72-A79, wherein the electrical shop tool comprises an air conditioning service machine.

EEE A91 is the computer readable medium of any one of EEEs A72-A79, wherein the shop electrical equipment comprises a vehicle exhaust pipe bending machine.

EEE A92 is the computer readable medium of any one of EEEs A72-A91, wherein the functions further comprise requesting time information from a remote device comprising a network transceiver, and using the time information as a basis to perform at least one of the following functions: (i) determining when to sample the sensor signal, (ii) recording a time when each data value indicating a sampled sensor signal was sampled, and (iii) determining when to transmit data indicating the sampled sensor signal.

EEE A93 is the computer readable medium of any one of EEEs A72-A92, wherein the functions further comprise: transmitting the data values stored during a preceding time interval at a next transmission time occurring at an end of the preceding time interval if at least one data value stored during the preceding time interval represents a current flow to the motor exceeded 0.0 amperes.

EEE A94 is the computer readable medium of any one of EEEs A72-A92, wherein the functions further comprise: transmitting the data values stored during a most-recent data collection period upon a maximum report-to-report time has elapsed.

EEE A95 is the computer readable medium of any one of EEEs A72-A92, wherein the functions further comprise: postponing transmission of the data values stored during at least one preceding time interval at a next transmission time occurring at an end of each of the at least one preceding time interval if each data value stored during stored during each of the at least one preceding time interval represents a current flow to the motor was 0.0 amperes, wherein transmission of the data values stored during a next preceding time interval at a next transmission time occurring at an end of the next preceding time interval occurs if at least one data value stored during stored during the next preceding time interval represents a current flow to the motor exceeded 0.0 amperes, and wherein the next preceding time interval occurs immediately after the at least one preceding time interval.

EEE A96 is the computer readable medium of EEE A72, wherein the electrical shop tool comprises a vehicle lift, and wherein the at least one actionable condition indicates the vehicle lift has been raised at least a threshold number of times since installation of the vehicle lift or a prior servicing of the vehicle lift.

EEE A97 is the computer readable medium of EEE A72, wherein the functions further comprise: transmitting a device identifier and at least one time indicator along with the transmitted data values, wherein the device identifier is associated with at least one of the electrical shop tool and a device including a circuit board on which the first current transformer, the at least one processor, and the first network transceiver are mounted, and wherein the at least one time indicator is associated with the transmitted data values.

EEE A98 is the computer readable medium of any one of EEEs A72-A97, wherein the electrical shop tool comprises at least one electrical motor.

EEE A99 is the computer readable medium of any one of EEEs A72-A98, wherein the electrical shop tool comprises at least one pump.

EEE A100 is the computer readable medium of any one of EEEs A72-A98, wherein the electrical shop tool does not include an electrical motor and a pump.

EEE A101 is the computer readable medium of any one of EEEs A72-A100, wherein the transmitted data values represent use of the electrical shop tool during one or more time periods occurring prior to transmission of the data values.

EEE A102 is the computer readable medium of EEE A101, wherein the transmitted data values further represent non-use of the electrical shop tool during one or more time periods occurring prior to transmission of the data values.

EEE B1 is a method for providing a notification pertaining to an actionable condition of an electrical shop tool (EST), the method comprising: receiving, by at least one processor, measurement data transmitted by a measurement device connected to the EST; determining, by the at least one processor, the actionable condition of the EST based on the measurement data; determining, by the at least one processor, a notification indicative of the actionable condition; and transmitting, by the at least one processor, the notification to a communication network, wherein the notification is addressed to a destination identifier associated with at least one of the measurement device and the EST.

EEE B2 is the method of EEE B1, wherein the measurement data includes a data value representing one or more digitized values of a voltage differential sampled by the measurement device, and wherein the measurement data includes or accompanies at least one time value pertaining to the sampled voltage differential.

EEE B3 is the method of EEE B2, wherein the at least one time value includes at least one of a start time of a sample period when the one or more digitized values equals a common value, and an end time of the sample period when the one or more digitized values equals the common value.

EEE B4 is the method of EEE B1, wherein the measurement data comprise one or more sets of at least two measurements of a voltage differential associated with one or more electrical circuits connected to one or more sensors, and wherein each of the one or more sets of at least two measurements represents a separate job or machine cycle of the EST.

EEE B5 is the method of any one of EEEs B1-B4, further comprising: receiving, by the at least one processor prior to receiving the measurement data, an identifier indicative of the measurement device, an identifier indicative of the EST, and the destination identifier; registering, by the at least one processor, the measurement device, wherein registering the measurement device comprises storing within a non-transitory memory registration data that associates the identifier indicative of measurement device and the identifier indicative of the EST to each other and that associates the destination identifier with at least one of the measurement device and the EST; determining, by the at least one processor based on the registration data and an identifier received with the measurement data, the destination identifier associated with at least one of the measurement device and the EST, wherein the identifier received with the measurement data comprises at least one of the identifier indicative of measurement device and the identifier indicative of EST; and addressing, by the at least one processor, the notification with the destination identifier associated with at least one of the measurement device and the EST.

EEE B6 is the method of EEE B5, wherein the identifier indicative of the EST comprises or is associated with at least one of an EST type identifier, an EST brand identifier, an EST model identifier, an EST hardware level identifier, and an EST software level identifier.

EEE B7 is the method of EEE B5 or B6, wherein the registration data further comprises a role identifier that indicates a role of a person associated with the measurement device or the EST, and wherein determining the notification comprises determining the notification is associated with the role of the person associated with the measurement device or the EST.

EEE B8 is the method of any one of EEEs B5-B7, wherein the registration data further comprises a location identifier that indicates a location of the measurement device or the EST, the method further comprising: determining, by the at least one processor, the destination identifier for addressing the notification, wherein determining the destination identifier comprises determining the destination identifier is associated with a person associated with the location of the measurement device or the EST.

EEE B9 is the method of any one of EEEs B5-B7, wherein the registration data further comprises a location identifier that indicates a location of the measurement device or the EST, and wherein the registration data further comprises a territory identifier that indicates a territory associated with the person associated with the measurement device or the EST, the method further comprising determining, by the at least one processor, the destination identifier for addressing the notification, wherein determining the destination identifier comprises determining the location of the measurement device or the EST is within the territory associated with the person associated with the measurement device or the EST and determining the destination identifier is associated with the person associated with the measurement device or the EST.

EEE B10 is the method of any one of EEEs B5-B9, further comprising: determining, by the at least one processor, the measurement device is offline the communication network for at least a threshold amount of time, wherein the actionable condition pertains to notifying a person associated with the MD or the EST that the measurement device is offline the communication network for at least the threshold amount of time.

EEE B11 is the method of any one of EEEs B5-B10, further comprising: determining, by the at least one processor, an aggregate of multiple measurement values contained within the received measurement data, wherein the actionable condition is based on the aggregate of multiple measurement values contained within the received measurement data.

EEE B12 is the method of EEE B11, wherein the aggregate of multiple measurement values comprises a count of pairs of measurement values indicating the EST transitioned from an off state to an on state or the on state to the off state during a particular time period.

EEE B13 is the method of EEE B11 or B12, wherein the aggregate of multiple measurement values comprises a value indicating an amount of time the EST operated in an on state during a particular time period.

EEE B14 is the method of any one of EEEs B11-B13, wherein the aggregate of multiple measurement values comprises a value indicating an average time the EST was used on each Sunday, Monday, Tuesday, Wednesday, Thursday, Friday, and Saturday over a time period of one or more weeks.

EEE B15 is the method of any one of EEEs B11-B14, wherein the aggregate of multiple measurement values comprises a first aggregate value indicating an amount of time the EST was used during a first time period and a second aggregate value indicating an amount of time the EST was used during one or more other time periods equal in length to the first time period, and wherein a duration of the first time period is an hour, a day, a week, a month, a quarter of year, or a year.

EEE B16 is the method of any one of EEEs B11-B15, further comprising: determining the aggregate of multiple measurement values contained within the received measurement data breaches a threshold associated with the actionable condition.

EEE B17 is the method of any one of EEEs B11-B16, wherein determining the aggregate of multiple measurement values contained within the received measurement data comprises grouping the received measurement data into data representing multiple jobs or machine cycles.

EEE B18 is the method of any one of EEEs B11-B17, wherein the actionable condition includes a maintenance condition of the EST, a sales phone call, an email of return-on-investment data of the EST, or a warranty issue regarding the EST.

EEE B19 is the method of any one of EEEs B11-B18, wherein the destination identifier comprises an e-mail address, a short message service text message number, a multimedia messaging service number, a mobile identification number, a landline telephone number, or a social media account handle.

EEE B20 is the method of any one of EEEs B11-B19, wherein determining the notification comprises determining the notification is associated with at least one of an EST type associated with the EST, a manufacturer of the EST, a model number of the EST, and a role of a person associated with the measurement device or the EST.

EEE B21 is the method of any one of EEEs B11-B20, wherein the EST comprises a vehicle lift, a wheel balancer, a brake lathe, an air compressor, a tire changer machine, a brake dynamometer, a fluid flushing machine, a battery charger, a vehicle frame straightening machine, an air conditioning service machine, or a vehicle exhaust pipe bending machine.

EEE B22 is the method of any one of EEEs B11-B21, further comprising: servicing the EST based on the determined actionable condition of the EST.

EEE B23 is a computing system comprising: a data storage device comprising a destination identifier associated with at least one of an electrical service tool (EST) and a measurement device connected to the EST; and at least one processor configured to refer to the data storage device and programmed to: receive measurement data transmitted by the measurement device connected to the EST; determine the actionable condition of the EST based on the measurement data; determine a notification indicative of the actionable condition; and transmit the notification to a communication network, wherein the notification is addressed to a destination identifier associated with at least one of the measurement device and the EST.

EEE B24 is the computing system of EEE B23, wherein the measurement data includes a data value representing one or more digitized values of a voltage differential sampled by the measurement device, and wherein the measurement data includes or accompanies at least one time value pertaining to the sampled voltage differential.

EEE B25 is the computing system of EEE B24, wherein the at least one time value includes at least one of a start time of a sample period when the one or more digitized values equals a common value, and an end time of the sample period when the one or more digitized values equals the common value.

EEE B26 is the computing system of EEE B23, wherein the measurement data comprise one or more sets of at least two measurements of a voltage differential associated with one or more electrical circuits connected to one or more sensors, and wherein each of the one or more sets of at least two measurements represents a separate job or machine cycle of the EST.

EEE B27 is the computing system of any one of EEEs B23-B26, wherein the at least one processor is further configured to: receive, prior to receiving the measurement data, an identifier indicative of the measurement device, an identifier indicative of the EST, and the destination identifier; register the measurement device, wherein registering the measurement device comprises storing within a non-transitory memory registration data that associates the identifier indicative of measurement device and the identifier indicative of the EST to each other and that associates the destination identifier with at least one of the measurement device and the EST; determine, based on the registration data and an identifier received with the measurement data, the destination identifier associated with at least one of the measurement device and the EST, wherein the identifier received with the measurement data comprises at least one of the identifier indicative of measurement device and the identifier indicative of EST; and address the notification with the destination identifier associated with at least one of the measurement device and the EST.

EEE B28 is the computing system of EEE B27, wherein the identifier indicative of the EST comprises or is associated with at least one of an EST type identifier, an EST brand identifier, an EST model identifier, an EST hardware level identifier, and an EST software level identifier.

EEE B29 is the computing system of EEE B27 or B28, wherein the registration data further comprises a role identifier that indicates a role of a person associated with the measurement device or the EST, and wherein determining the notification comprises determining the notification is associated with the role of the person associated with the measurement device or the EST.

EEE B30 is the computing system of any one of EEEs B27-B29, wherein the registration data further comprises a location identifier that indicates a location of the measurement device or the EST, wherein the at least one processor is further configured to: determine the destination identifier for addressing the notification, wherein determining the destination identifier comprises determining the destination identifier is associated with a person associated with the location of the measurement device or the EST.

EEE B31 is the computing system of any one of EEEs B27-B29, wherein the registration data further comprises a location identifier that indicates a location of the measurement device or the EST, and wherein the registration data further comprises a territory identifier that indicates a territory associated with the person associated with the measurement device or the EST, wherein the at least one processor is further configured to determine the destination identifier for addressing the notification, wherein determining the destination identifier comprises determining the location of the measurement device or the EST is within the territory associated with the person associated with the measurement device or the EST and determining the destination identifier is associated with the person associated with the measurement device or the EST.

EEE B32 is the computing system of any one of EEEs B27-B31, wherein the at least one processor is further configured to: determine the measurement device is offline the communication network for at least a threshold amount of time, wherein the actionable condition pertains to notifying a person associated with the MD or the EST that the measurement device is offline the communication network for at least the threshold amount of time.

EEE B33 is the computing system of any one of EEEs B27-B32, wherein the at least one processor is further configured to: determine an aggregate of multiple measurement values contained within the received measurement data, wherein the actionable condition is based on the aggregate of multiple measurement values contained within the received measurement data.

EEE B34 is the computing system of EEE B33, wherein the aggregate of multiple measurement values comprises a count of pairs of measurement values indicating the EST transitioned from an off state to an on state or the on state to the off state during a particular time period.

EEE B35 is the computing system of EEE B33 or B34, wherein the aggregate of multiple measurement values comprises a value indicating an amount of time the EST operated in an on state during a particular time period.

EEE B36 is the computing system of any one of EEEs B33-B35, wherein the aggregate of multiple measurement values comprises a value indicating an average time the EST was used on each Sunday, Monday, Tuesday, Wednesday, Thursday, Friday, and Saturday over a time period of one or more weeks.

EEE B37 is the computing system of any one of EEEs B33-B36, wherein the aggregate of multiple measurement values comprises a first aggregate value indicating an amount of time the EST was used during a first time period and a second aggregate value indicating an amount of time the EST was used during one or more other time periods equal in length to the first time period, and wherein a duration of the first time period is an hour, a day, a week, a month, a quarter of year, or a year.

EEE B38 is the computing system of any one of EEEs B33-B37, wherein the at least one processor is further configured to: determine the aggregate of multiple measurement values contained within the received measurement data breaches a threshold associated with the actionable condition.

EEE B39 is the computing system of any one of EEEs B33-B38, wherein determining the aggregate of multiple measurement values contained within the received measurement data comprises grouping the received measurement data into data representing multiple jobs or machine cycles.

EEE B40 is the computing system of any one of EEEs B33-B39, wherein the actionable condition includes a maintenance condition of the EST, a sales phone call, an email of return-on-investment data of the EST, or a warranty issue regarding the EST.

EEE B41 is the computing system of any one of EEEs B33-B40, wherein the destination identifier comprises an e-mail address, a short message service text message number, a multimedia messaging service number, a mobile identification number, a landline telephone number, or a social media account handle.

EEE B42 is the computing system of any one of EEEs B33-B41, wherein determining the notification comprises determining the notification is associated with at least one of an EST type associated with the EST, a manufacturer of the EST, a model number of the EST, and a role of a person associated with the measurement device or the EST.

EEE B43 is the computing system of any one of EEEs B33-B42, wherein the EST comprises a vehicle lift, a wheel balancer, a brake lathe, an air compressor, a tire changer machine, a brake dynamometer, a fluid flushing machine, a battery charger, a vehicle frame straightening machine, an air conditioning service machine, or a vehicle exhaust pipe bending machine.

EEE B44 is the computing system of any one of EEEs B33-B43, wherein the at least one processor is further configured to service the EST based on the determined actionable condition of the EST.

EEE B45 is a computer readable medium having stored thereon instructions executable by at least one processor to cause a computing system to perform functions comprising receiving, by the at least one processor, measurement data transmitted by a measurement device connected to the EST; determining, by the at least one processor, the actionable condition of the EST based on the measurement data; determining, by the at least one processor, a notification indicative of the actionable condition; and transmitting, by the at least one processor, the notification to a communication network, wherein the notification is addressed to a destination identifier associated with at least one of the measurement device and the EST.

EEE B46 is the computer readable medium of EEE B45, wherein the measurement data includes a data value representing one or more digitized values of a voltage differential sampled by the measurement device, and wherein the measurement data includes or accompanies at least one time value pertaining to the sampled voltage differential.

EEE B47 is the computer readable medium of EEE B46, wherein the at least one time value includes at least one of a start time of a sample period when the one or more digitized values equals a common value, and an end time of the sample period when the one or more digitized values equals the common value.

EEE B48 is the computer readable medium of EEE B45, wherein the measurement data comprise one or more sets of at least two measurements of a voltage differential associated with one or more electrical circuits connected to one or more sensors, and wherein each of the one or more sets of at least two measurements represents a separate job or machine cycle of the EST.

EEE B49 is the computer readable medium of any one of EEEs B45-B48, wherein the functions further comprise: receiving, by the at least one processor prior to receiving the measurement data, an identifier indicative of the measurement device, an identifier indicative of the EST, and the destination identifier; registering, by the at least one processor, the measurement device, wherein registering the measurement device comprises storing within a non-transitory memory registration data that associates the identifier indicative of measurement device and the identifier indicative of the EST to each other and that associates the destination identifier with at least one of the measurement device and the EST; determining, by the at least one processor based on the registration data and an identifier received with the measurement data, the destination identifier associated with at least one of the measurement device and the EST, wherein the identifier received with the measurement data comprises at least one of the identifier indicative of measurement device and the identifier indicative of EST; and addressing, by the at least one processor, the notification with the destination identifier associated with at least one of the measurement device and the EST.

EEE B50 is the computer readable medium of EEE B49, wherein the identifier indicative of the EST comprises or is associated with at least one of an EST type identifier, an EST brand identifier, an EST model identifier, an EST hardware level identifier, and an EST software level identifier.

EEE B51 is the computer readable medium of EEE B49 or B50, wherein the registration data further comprises a role identifier that indicates a role of a person associated with the measurement device or the EST, and wherein determining the notification comprises determining the notification is associated with the role of the person associated with the measurement device or the EST.

EEE B52 is the computer readable medium of any one of EEEs B49-B51, wherein the registration data further comprises a location identifier that indicates a location of the measurement device or the EST, wherein the functions further comprise: determining, by the at least one processor, the destination identifier for addressing the notification, wherein determining the destination identifier comprises determining the destination identifier is associated with a person associated with the location of the measurement device or the EST.

EEE B53 is the computer readable medium of any one of EEEs B49-B52, wherein the registration data further comprises a location identifier that indicates a location of the measurement device or the EST, and wherein the registration data further comprises a territory identifier that indicates a territory associated with the person associated with the measurement device or the EST, wherein the functions further comprise determining, by the at least one processor, the destination identifier for addressing the notification, wherein determining the destination identifier comprises determining the location of the measurement device or the EST is within the territory associated with the person associated with the measurement device or the EST and determining the destination identifier is associated with the person associated with the measurement device or the EST.

EEE B54 is the computer readable medium of any one of EEEs B49-B53, wherein the functions further comprise: determining, by the at least one processor, the measurement device is offline the communication network for at least a threshold amount of time, wherein the actionable condition pertains to notifying a person associated with the MD or the EST that the measurement device is offline the communication network for at least the threshold amount of time.

EEE B55 is the computer readable medium of any one of EEEs B49-B54, wherein the functions further comprise: determining, by the at least one processor, an aggregate of multiple measurement values contained within the received measurement data, wherein the actionable condition is based on the aggregate of multiple measurement values contained within the received measurement data.

EEE B56 is the computer readable medium of EEE B55, wherein the aggregate of multiple measurement values comprises a count of pairs of measurement values indicating the EST transitioned from an off state to an on state or the on state to the off state during a particular time period.

EEE B57 is the computer readable medium of EEE B55 or B56, wherein the aggregate of multiple measurement values comprises a value indicating an amount of time the EST operated in an on state during a particular time period.

EEE B58 is the computer readable medium of any one of EEEs B55-B57, wherein the aggregate of multiple measurement values comprises a value indicating an average time the EST was used on each Sunday, Monday, Tuesday, Wednesday, Thursday, Friday, and Saturday over a time period of one or more weeks.

EEE B59 is the computer readable medium of any one of EEEs B55-B58, wherein the aggregate of multiple measurement values comprises a first aggregate value indicating an amount of time the EST was used during a first time period and a second aggregate value indicating an amount of time the EST was used during one or more other time periods equal in length to the first time period, and wherein a duration of the first time period is an hour, a day, a week, a month, a quarter of year, or a year.

EEE B60 is the computer readable medium of any one of EEEs B55-B59, wherein the functions further comprise: determining the aggregate of multiple measurement values contained within the received measurement data breaches a threshold associated with the actionable condition.

EEE B61 is the computer readable medium of any one of EEEs B55-B60, wherein determining the aggregate of multiple measurement values contained within the received measurement data comprises grouping the received measurement data into data representing multiple jobs or machine cycles.

EEE B62 is the computer readable medium of any one of EEEs B55-B61, wherein the actionable condition includes a maintenance condition of the EST, a sales phone call, an email of return-on-investment data of the EST, or a warranty issue regarding the EST.

EEE B63 is the computer readable medium of any one of EEEs B55-B62, wherein the destination identifier comprises an e-mail address, a short message service text message number, a multimedia messaging service number, a mobile identification number, a landline telephone number, or a social media account handle.

EEE B64 is the computer readable medium of any one of EEEs B55-B63, wherein determining the notification comprises determining the notification is associated with at least one of an EST type associated with the EST, a manufacturer of the EST, a model number of the EST, and a role of a person associated with the measurement device or the EST.

EEE B65 is the computer readable medium of any one of EEEs B55-B64, wherein the EST comprises a vehicle lift, a wheel balancer, a brake lathe, an air compressor, a tire changer machine, a brake dynamometer, a fluid flushing machine, a battery charger, a vehicle frame straightening machine, an air conditioning service machine, or a vehicle exhaust pipe bending machine.

EEE B66 is the computer readable medium of any one of EEEs B55-B65, wherein the functions further comprise: servicing the EST based on the determined actionable condition of the EST.

EEE C1 is a method comprising: receiving, by at least one processor of a display device, an input to request registration of a measurement device by a remote processing system; determining, by the at least one processor, a registration input to associate with the measurement device; determining, by the at least one processor, a measurement device identifier of the measurement device; and outputting, by the at least one processor, a registration request for the measurement device to be registered at the remote processing system, the registration request comprising the registration input and the measurement device identifier.

EEE C2 is the method of EEE C1, wherein the registration input comprises an identifier of an electrical shop tool connected or connectable to the measurement device.

EEE C3 is the method of EEE C2, wherein the registration input comprises an identifier of a second display device configured to receive a notification from the remote processing system with respect to the electrical shop tool.

EEE C4 is the method of EEE C3, wherein the notification indicates an actionable condition of the electrical shop tool.

EEE C5 is the method of any one of EEEs C1-C4, wherein the registration input comprises an identifier of a person affiliated with a repair shop at which the measurement device and the electrical shop tool are located.

EEE C6 is the method of any one of EEEs C1-05, further comprising: capturing, by the at least one processor, an image of a visible identifier of the measurement device, wherein determining the measurement device identifier comprises determining the measurement device identifier from the captured image of the visible identifier.

EEE C7 is the method of EEE C6, wherein the visible identifier comprises a multi-dimensional code that encodes the measurement device identifier.

EEE C8 is the method of EEE C6, wherein the visible identifier comprises an alpha-numeric measurement device identifier.

EEE C9 is the method of any one of EEEs C1-C8, further comprising: displaying, by a display connected to the at least one processor, a first graphical user interface with a menu selector; determining, by the at least one processor, the menu selector has been selected; and displaying, by the display, a second graphical user interface with one or more data fields for displaying the registration input.

EEE C10 is the method of any one of EEEs C1-C9, further comprising: receiving, by a transceiver connected to the at least one processor, a registration application executable by the at least one processor to perform the method of EEE C1; and storing, by the computer-readable medium, the registration application.

EEE C11 is the method of any one of EEEs C1-C10, further comprising: receiving, by the at least one processor, a notification indicating the measurement device has been registered by the remote processing system; and displaying, by the display device, the notification.

EEE C12 is the method of any one of EEEs C1-C11, wherein receiving the input to request registration of the measurement device includes receiving an input to select a registration application to be opened by the display device.

EEE C13 is the method of any one of EEEs C1-C12, further comprising: displaying, by the display device, a graphical user interface, the graphical user interface including a data field at which the registration input is entered or displayed.

EEE C14 is the method of EEE C13, wherein the input to select the registration application to be opened by the display device comprises a request for a web page served by the remote processing system.

EEE C15 is a computing system comprising: a display; a computer-readable medium; and at least one processor programmed to: receive an input to request registration of a measurement device by a remote processing system; determine a registration input to associate with the measurement device; determine a measurement device identifier of the measurement device; and output a registration request for the measurement device to be registered at the remote processing system, the registration request comprising the registration input and the measurement device identifier.

EEE C16 is the computing system of EEE C15, wherein the registration input comprises an identifier of an electrical shop tool connected to or connectable to the measurement device.

EEE C17 is the computing system of EEE C16, wherein the registration input comprises an identifier of a second computing system configured to receive notifications from the remote processing system with respect to the electrical shop tool.

EEE C18 is the computing system of EEE C17, wherein the notifications indicate an actionable condition of the electrical shop tool.

EEE C19 is the computing system of any one of EEEs C15-C18, wherein the registration input comprises an identifier of a person affiliated with a repair shop at which the measurement device and the electrical shop tool are located.

EEE C20 is the computing system of any one of EEEs C15-C19, wherein the at least one processor is programmed to capture an image of a visible identifier of the measurement device, and wherein determining the measurement device identifier comprises determining the measurement device identifier from the captured image of the visible identifier.

EEE C21 is the computing system of EEE C20, wherein the visible identifier comprises a multi-dimensional code that encodes the measurement device identifier.

EEE C22 is the computing system of EEE C20, wherein the visible identifier comprises an alpha-numeric measurement device identifier.

EEE C23 is the computing system of any one of EEEs C15-C22, wherein the computer-readable medium comprises a registration application, and wherein the at least one processor is programmed to execute the registration application to (i) receive the input to request registration of the measurement device by the remote processing system, (ii) determine the registration input to associate with the measurement device, (iii) determine the measurement device identifier of the measurement device, and (iv) output the registration request for the measurement device to be registered at the remote processing system.

EEE C24 is the computing system of EEE C23, wherein the at least one processor is programmed via the registration application to: output to the display connected a first graphical user interface with a menu selector, determine the menu selector has been selected; and output to the display a second graphical user interface with one or more data fields for displaying the registration input.

EEE C25 is the computing system of any one of EEEs C23-C24, further comprising: a transceiver connected to the at least one processor, wherein the transceiver is configured to receive the registration application.

EEE C26 is the computing system of any one of EEEs C15-C24, wherein the at least one processor is programmed to: receive a notification indicating the measurement device has been registered by the remote processing system; and output to the display the notification.

EEE C27 is the computing system of EEE C23, wherein the at least one processor is programmed via the registration application to: cause the display to display a first graphical user interface with a menu selector, determine the menu selector has been selected; and output to the display a second graphical user interface with one or more data fields for displaying the registration input.

EEE C28 is the computing system of EEE C15, wherein the computer-readable medium comprises a web browser application, wherein the at least one processor is programmed to (i) receive the input to request registration of the measurement device by the remote processing system, (ii) determine the registration input to associate with the measurement device, (iii) determine the measurement device identifier of the measurement device, and output the registration request for the measurement device to be registered at the remote processing system via a web page from the remote processing server, and wherein execution of the web browser application comprises requesting the web page from the remote processing server.

We claim:

1. A system comprising:
    a sensor to output and/or generate a sensor signal pertaining to use of an electrical shop tool, wherein the electrical shop tool includes a vehicle lift, a wheel balancer, a brake lathe or a tire changer machine;
    one or more processors configured to sample the sensor signal periodically during one or more preceding time intervals and to sample the sensor signal periodically during a next preceding time interval, wherein the next preceding time interval occurs after the one or more preceding time intervals;
    a non-transitory computer-readable medium to store first data values based on the one or more processors sampling the sensor signal periodically during the one or more preceding time intervals and second data values based on sampling the sensor signal periodically during the next preceding time interval, wherein the first data values are not transmitted to a processing system before a transmission time occurring after the next preceding time interval ends if each data value of the first data values represents a current flow to the electrical shop tool was below a threshold amperage; and
    a first network transceiver configured to transmit, to a network for transmission to the processing system for determining an actionable condition of the electrical shop tool, the second data values at the transmission time occurring after the next preceding time interval ends if at least one data value of the second data values represents a current flow to the electrical shop tool exceeds the threshold amperage.

2. The system of claim 1,
wherein the one or more processors is configured to determine a sampled sensor signal value for each periodic sample of the sensor signal, and
wherein the one or more processors is configured to scale the sampled sensor signal values using a linear scale to determine data values based on the sensor signal sampled by the one or more processors or using a non-linear scale to determine data values based on the sensor signal sampled by the one or more processors.

3. The system of claim 1,
wherein the sensor signal represents a detected position, velocity, acceleration, or jerk,
wherein the one or more processors is configured to determine a sampled sensor signal value for each periodic sample of the sensor signal, and
wherein the one or more processors is configured to summarize the sampled sensor signal values into an array.

4. The system of claim 1,
wherein the sensor includes a first current transformer including a first conductive coil with a first transformer lead and a second transformer lead, wherein the first conductive coil is configured with a central passageway through which a conductor carrying alternating current to or from the electrical shop tool can pass, and
wherein the sensor signal represents a voltage differential across the first transformer lead and the second transformer lead.

5. The system of claim 4,
wherein the one or more processors determines an amperage value corresponding to each voltage differential sample, and
wherein the first data values and the second data values represent the amperage values determined by the one or more processors.

6. The system of claim 1, further comprising:
a real-time clock to output timing signals for use by the one or more processors to perform at least one of: (i) determine when to sample the sensor signal, (ii) record a time when each data value indicating a sampled sensor signal was sampled, and (iii) determine when the first network transceiver is to transmit data indicating the sampled sensor signal.

7. The system of claim 1,
wherein the first network transceiver transmits the second data values at the transmission time occurring after the next preceding time interval ends if at least one data value stored during the next preceding time interval represents a current flow to a motor exceeded 0.0 amperes, or transmits the second data values stored during a most-recent data collection period upon a maximum report-to-report time elapsing.

8. The system of claim 1,
wherein the threshold amperage is 0.0 amperes.

9. The system of claim 1, further comprising:
the processing system,
wherein the processing system comprises one or more additional processors, at least one computer-readable data storage device, and a second network transceiver to receive the second data values transmitted by the first network transceiver, wherein the one or more processors are configured to determine at least one actionable condition of the electrical shop tool based on, at least in part, the second data values transmitted by the first network transceiver.

10. The system of claim 9, wherein the one or more additional processors are configured to cause the second network transceiver to transmit a notification of the at least one actionable condition to at least one destination associated with the electrical shop tool.

11. The system of claim 1, wherein the sensor signal includes an electrical signal.

12. The system of claim 1, further comprising:
one or more connectors configured to connect to one or more circuits extending between the sensor and the electrical shop tool and one or more circuits leading to an AC electrical supply.

13. A method comprising:
outputting and/or generating, by a sensor, a sensor signal pertaining to use of an electrical shop tool, wherein the electrical shop tool includes a vehicle lift, a wheel balancer, a brake lathe or a tire changer machine;
sampling, by one or more processors, the sensor signal periodically during one or more preceding time intervals and the sensor signal periodically during a next preceding time interval, wherein the next preceding time interval occurs after the one or more preceding time intervals;
storing, at a non-transitory computer-readable medium, first data values based on the sampling the sensor signal periodically during one or more preceding time intervals and second data values based on the sampling the sensor signal periodically during the next preceding time interval, wherein the first data values are not transmitted to a processing system before a transmission time occurring after the next preceding time interval ends if each data value of the first data values represents a current flow to the electrical shop tool was below a threshold amperage; and
transmitting, by a first network transceiver to a network for transmission to the processing system for determining an actionable condition of the electrical shop tool, the second data values at the transmission time occurring after the next preceding time interval ends if at least one data value of the second data values represents a current flow to the electrical shop tool exceeds the threshold amperage.

14. The method of claim 13, further comprising:
determining, by the one or more processors, a sampled sensor signal value for each periodic sample of the sensor signal, and
scaling, by the one or more processors, the sampled sensor signal values using a linear scale to determine the second data values based on the sensor signal sampled by the one or more processors or using a non-linear scale to determine the second data values based on the sensor signal sampled by the one or more processors.

15. The method of claim 13,
wherein the sensor signal represents a detected position, velocity, acceleration, or jerk,
wherein the method further comprises:
determining, by the one or more processors, a sampled sensor signal value for each periodic sample of the sensor signal, and
summarizing the sampled sensor signal values into an array.

16. The method of claim 14,
wherein the sensor includes a first current transformer including a first conductive coil with a first transformer lead and a second transformer lead, wherein the first conductive coil is configured with a central passageway through which a conductor carrying alternating current to or from the electrical shop tool can pass, and
wherein the sensor signal represents a voltage differential across the first transformer lead and the second transformer lead.

17. The method of claim 13, further comprising:
determining, by the one or more processors, an amperage value corresponding to each voltage differential sample, and
wherein the second data values represent the amperage values determined by the one or more processors.

18. The method of claim 13, further comprising:
outputting, by a real-time clock, timing signals for use by the one or more processors to perform at least one of: (i) determining when to sample the sensor signal, (ii) recording a time when each data value indicating a sampled sensor signal was sampled, and (iii) determining when the first network transceiver is to transmit data indicating the sampled sensor signal.

19. The method of claim 13, further comprising:
transmitting, by the first network transceiver, the second data values at the transmission time occurring after the next preceding time interval ends if at least one data value stored during the next preceding time interval represents a current flow to a motor exceeded 0.0 amperes.

20. The method of claim 13,
wherein the threshold amperage is 0.0 amperes.

21. The method of claim 13,
wherein the processing system comprises at least one other processor, at least one computer-readable data storage device, and a second network transceiver to receive the second data values transmitted by the first network transceiver,
the method further comprising:
determining, by the at least one other processor, the actionable condition of the electrical shop tool based on, at least in part, the second data values transmitted by the first network transceiver.

22. The method of claim 21, further comprising:
transmitting, by the second network transceiver, notification of the actionable condition to at least one destination associated with the electrical shop tool.

23. A system for reporting data pertaining to an actionable condition of an electrical shop tool, the system comprising:
a sensor to output and/or generate a sensor signal pertaining to use of the electrical shop tool, wherein the electrical shop tool includes a vehicle lift, a wheel balancer, a brake lathe or a tire changer machine;
one or more processors configured to periodically sample the sensor signal;
a non-transitory computer-readable medium to store data values based on the sensor signal sampled by the one or more processors; and
a first network transceiver to transmit the data values based on the sensor signal sampled by the one or more processors to a network for transmission to a processing system for determining an actionable condition of the electrical shop tool based on the data values,
wherein the non-transitory computer-readable medium comprises program instructions executable by the one or more processors to cause the first network transceiver to request time information from a remote device comprising a second network transceiver, and to use the time information as a basis to perform at least one of: (i) determine when to sample the sensor signal, (ii) record a time when each data value indicating a sampled sensor signal was sampled, and (iii) determine when the first network transceiver is to transmit data indicating the sampled sensor signal.

24. A method for reporting data pertaining to an actionable condition of an electrical shop tool, the method comprising:

outputting and/or generating, by a sensor, a sensor signal pertaining to use of an electrical shop tool, wherein the electrical shop tool includes a vehicle lift, a wheel balancer, a brake lathe or a tire changer machine;

sampling, periodically by one or more processors, the sensor signal;

storing, at a non-transitory computer-readable medium, data values based on the sensor signal sampled by the one or more processors; and transmitting, by a first network transceiver, the data values to a network for transmission to a processing system for determining an actionable condition of the electrical shop tool based on the data values, wherein the non-transitory computer-readable medium comprises program instructions executable by the one or more processors to cause the first network transceiver to request time information from a remote device comprising a second network transceiver, and to use the time information as a basis to perform at least one of: (i) determining when to sample the sensor signal, (ii) recording a time when each data value indicating a sampled sensor signal was sampled, and (iii) determining when the first network transceiver is to transmit data indicating the sampled sensor signal.

25. A non-transitory computer-readable medium having stored thereon instructions executable by one or more processors to cause a computing system to perform functions comprising:

sampling, periodically, a sensor signal periodically during one or more preceding time intervals and the sensor signal periodically during a next preceding time interval, wherein the next preceding time interval occurs after the one or more preceding time intervals, and wherein the sensor signal is generated or output by a sensor pertaining to use of an electrical shop tool, wherein the electrical shop tool includes a vehicle lift, a wheel balancer, a brake lathe or a tire changer machine;

storing first data values based on the sampling the sensor signal periodically during the one ore more preceding time intervals and second data values based on the sampling the sensor signal periodically during the next preceding time interval, wherein the first data values are not transmitted to a processing system before a transmission time occurring after the next preceding time interval ends if each data value of the first data values represents a current flow to the electrical shop tool was below a threshold amperage;

transmitting, to a network for transmission to the processing system for determining an actionable condition of the electrical shop tool, the second data values at the transmission time occurring after the next preceding time interval ends if at least one data value of the second data values represents a current flow to the electrical shop tool exceeds the threshold amperage.

26. A system for reporting data pertaining to an actionable condition of an electrical shop tool, the system comprising:

a current sensor to output and/or generate a sensor signal pertaining to use of the electrical shop tool, wherein the electrical shop tool includes a vehicle lift, a wheel balancer, a brake lathe or a tire changer machine, and wherein the current sensor includes a current transformer or a Hall sensor;

one or more processors configured to periodically sample the sensor signal;

a non-transitory computer-readable medium to store data values based on the sensor signal sampled by the one or more processors; and a first network transceiver to transmit the data values based on the sensor signal sampled by the one or more processors to a network for transmission to a processing system for determining an actionable condition of the electrical shop tool based on the data values.

27. The system of claim 26, wherein the current transformer includes a first conductive coil with a first transformer lead and a second transformer lead, wherein the first conductive coil is configured with a central passageway through which a conductor carrying alternating current to or from the electrical shop tool can pass, and wherein the sensor signal represents a voltage differential across the first transformer lead and the second transformer lead.

28. A method for reporting data pertaining to an actionable condition of an electrical shop tool, the method comprising:

outputting and/or generating, by a current sensor, a sensor signal pertaining to use of an electrical shop tool, wherein the electrical shop tool includes a vehicle lift, a wheel balancer, a brake lathe or a tire changer machine, and wherein the current sensor includes a current transformer or a Hall sensor;

sampling, periodically by one or more processors, the sensor signal;

storing, at a non-transitory computer-readable medium, data values based on the sensor signal sampled by the one or more processors; and transmitting, by a first network transceiver, the data values to a network for transmission to a processing system for determining an actionable condition of the electrical shop tool based on the data values.

29. The method of claim 28, wherein the current transformer includes a first conductive coil with a first transformer lead and a second transformer lead, wherein the first conductive coil is configured with a central passageway through which a conductor carrying alternating current to or from the electrical shop tool can pass, and wherein the sensor signal represents a voltage differential across the first transformer lead and the second transformer lead.

30. A non-transitory computer-readable medium having stored thereon instructions executable by one or more processors to cause a computing system to perform functions comprising:

sampling, periodically, a sensor signal generated or output by a sensor pertaining to use of an electrical shop tool, wherein the electrical shop tool includes a vehicle lift, a wheel balancer, a brake lathe or a tire changer machine;

storing data values based on the sensor signal sampled periodically;

requesting and receiving time information from a remote device; and transmitting the data values based on the sensor signal sampled periodically to a network for transmission to a processing system for determining an actionable condition of the electrical shop tool based on the data values, wherein the time information from the remote device is used to (i) determine when to sample the sensor signal periodically, (ii) record a time when each data value indicating the sensor signal was sampled, and/or (iii) determine when to transmit the data values based on sensor signal sampled periodically.

31. A non-transitory computer-readable medium having stored thereon instructions executable by one or more processors to cause a computing system to perform functions comprising:

sampling, periodically, a sensor signal generated or output by a current sensor pertaining to use of an electrical shop tool, wherein the electrical shop tool includes a vehicle lift, a wheel balancer, a brake lathe or a tire changer machine, and wherein the current sensor includes a current transformer or a Hall sensor;

storing data values based on the sensor signal sampled by the one or more processors; and transmitting the data values based on the sensor signal sampled by the one or more processors to a network for transmission to a processing system for determining an actionable condition of the electrical shop tool based on the data values.

32. The non-transitory computer-readable medium of claim 31, wherein the current transformer includes a first conductive coil with a first transformer lead and a second transformer lead, wherein the first conductive coil is configured with a central passageway through which a conductor carrying alternating current to or from the electrical shop tool can pass, and wherein the sensor signal represents a voltage differential across the first transformer lead and the second transformer lead.

* * * * *